US007061538B2

(12) United States Patent
Kondo et al.

(10) Patent No.: US 7,061,538 B2
(45) Date of Patent: Jun. 13, 2006

(54) IMAGE-INFORMATION CONVERTING APPARATUS AND METHOD, IMAGE DISPLAYING APPARATUS AND METHOD, COEFFICIENT CALCULATING APPARATUS AND METHOD, COEFFICIENT-DATA STORING APPARATUS, APPARATUS AND METHOD FOR DETECTING PART WHERE PICTURE QUALITY IS DEGRADED, RECORDING MEDIUM, AND PROGRAM

(75) Inventors: Tetsujiro Kondo, Tokyo (JP); Shizuo Chikaoka, Tokyo (JP); Toru Miyake, Tokyo (JP); Shinsuke Araya, Tokyo (JP)

(73) Assignee: Sony Corporation, Tokyo (JP)

( * ) Notice: Subject to any disclaimer, the term of this patent is extended or adjusted under 35 U.S.C. 154(b) by 519 days.

(21) Appl. No.: 10/420,193

(22) Filed: Apr. 22, 2003

(65) Prior Publication Data

US 2004/0017509 A1    Jan. 29, 2004

(30) Foreign Application Priority Data

Apr. 23, 2002 (JP) .............................. 2002-120568

(51) Int. Cl.
*H04N 7/01* (2006.01)
(52) U.S. Cl. ...................... 348/453; 348/581; 348/782; 345/603; 382/225; 382/254
(58) Field of Classification Search ........ 348/453–455, 348/581, 702; 382/225, 264; 345/603; H04N 7/01
See application file for complete search history.

(56) References Cited

U.S. PATENT DOCUMENTS

| 5,852,470 | A | * | 12/1998 | Kondo et al. ............... 348/448 |
| 5,903,481 | A | * | 5/1999 | Kondo et al. ............... 708/313 |
| 6,057,885 | A | * | 5/2000 | Horishi et al. .............. 348/450 |
| 6,297,855 | B1 | * | 10/2001 | Kondo et al. ............... 348/663 |
| 6,418,548 | B1 | * | 7/2002 | Kondo et al. ............... 714/764 |
| 6,515,710 | B1 | * | 2/2003 | Koshimuta .................. 348/557 |

(Continued)

OTHER PUBLICATIONS

Patent Abstracts of Japan 2000-152273 published May 30, 2000.

(Continued)

*Primary Examiner*—Brian P. Yenke
(74) *Attorney, Agent, or Firm*—Frommer Lawrence & Haug LLP; William S. Frommer

(57) ABSTRACT

The absolute value of the difference between each of the pairs of pixel values of a target pixel and an upper pixel with respect to the target pixel, a pixel that is left-adjacent to the target pixel and an upper pixel with respect to the left-adjacent pixel, the left-adjacent pixel and a lower pixel with respect to the left-adjacent pixel, a pixel that is right-adjacent to the target pixel and an upper pixel with respect to the right-adjacent pixel, and the right-adjacent pixel and a lower pixel with respect to the right-adjacent pixel is obtained. A "1" is assigned if the absolute value of the difference is greater than or equal to a predetermined threshold value whereas a "0" is assigned if the absolute value of the difference is smaller than the predetermined threshold value, forming a pattern having six bits in total.

31 Claims, 49 Drawing Sheets

U.S. PATENT DOCUMENTS

| | | | |
|---|---|---|---|
| 6,516,088 B1 * | 2/2003 | Kondo et al. | 382/162 |
| 6,621,526 B1 * | 9/2003 | Yamagishi | 348/659 |
| 2002/0054237 A1 * | 5/2002 | Nichogi | 348/453 |
| 2003/0030749 A1 * | 2/2003 | Kondo et al. | 348/458 |
| 2004/0218096 A1 * | 11/2004 | Kondo et al. | 348/555 |
| 2005/0201631 A1 * | 9/2005 | Kondo et al. | 382/254 |

OTHER PUBLICATIONS

Patent Abstracts of Japan 2000-209612 published Jul. 28, 2000.

Patent Abstracts of Japan 2003-274430 published Sep. 26, 2003.

* cited by examiner

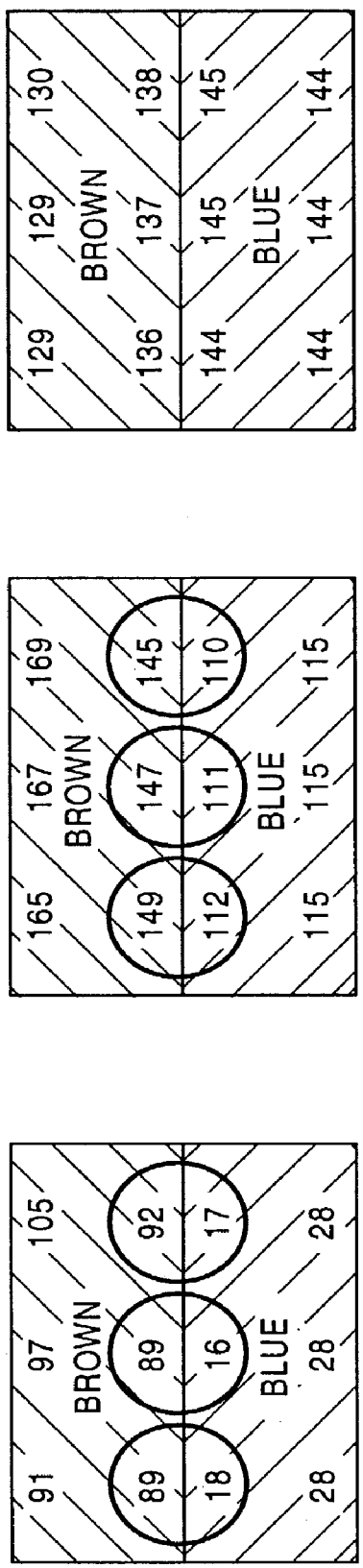

FIG. 18

| 183 | 182 | 182 | 183 | 184 | 183 | 184 | 185 | 186 | 185 | 185 | 184 | 183 | 183 | 183 | 181 | 181 |
| --- | --- | --- | --- | --- | --- | --- | --- | --- | --- | --- | --- | --- | --- | --- | --- | --- |
| 181 | 181 | 182 | 182 | 183 | 183 | 183 | 184 | 185 | 185 | 185 | 185 | 184 | 180 | 177 | 174 | 168 |
| 185 | 184 | 183 | 181 | 178 | 177 | 175 | 174 | 174 | 173 | 170 | 169 | 165 | 160 | 151 | 142 | 135 |
| 124 | 123 | 124 | 127 | 128 | 132 | 138 | 145 | 151 | 156 | 157 | 158 | 155 | 151 | 148 | 143 | 136 |
| 82 | 82 | 82 | 90 | 103 | 114 | 126 | 139 | 148 | 154 | 158 | 160 | 161 | 158 | 156 | 152 | 146 |
| 90 | 92 | 92 | 99 | 109 | 118 | 125 | 133 | 137 | 143 | 148 | 150 | 154 | 153 | 152 | 150 | 148 |
| 104 | 106 | 108 | 108 | 111 | 115 | 114 | 115 | 116 | 117 | 119 | 117 | 121 | 123 | 121 | 121 | 122 |
| 113 | 113 | 113 | 114 | 113 | 116 | 117 | 115 | 115 | 116 | 116 | 117 | 117 | 117 | 117 | 118 | 118 |
| 116 | 116 | 115 | 114 | 115 | 117 | 115 | 115 | 114 | 115 | 114 | 113 | 113 | 113 | 116 | 116 | 115 |
| 121 | 122 | 123 | 124 | 122 | 119 | 117 | 118 | 116 | 116 | 113 | 114 | 115 | 115 | 117 | 118 | 119 |
| 123 | 124 | 125 | 125 | 124 | 125 | 123 | 121 | 118 | 121 | 119 | 116 | 116 | 118 | 120 | 123 | 123 |
| 127 | 127 | 126 | 125 | 125 | 127 | 125 | 123 | 122 | 121 | 119 | 120 | 121 | 122 | 124 | 125 | 123 |
| 127 | 127 | 127 | 126 | 127 | 123 | 121 | 122 | 121 | 121 | 122 | 121 | 122 | 125 | 124 | 122 | 122 |
| 129 | | 125 | | | | | | | | | | | | | | |

FIG. 19

| 177 | 177 | 177 | 177 | 177 | 177 | 177 | 177 | 176 | 176 | 175 | 175 | 175 | 175 | 174 | 174 | 174 |
|---|---|---|---|---|---|---|---|---|---|---|---|---|---|---|---|---|
| 176 | 176 | 176 | 176 | 176 | 176 | 176 | 176 | 175 | 175 | 175 | 174 | 174 | 174 | 174 | 174 | 174 |
| 175 | 176 | 176 | 176 | 175 | 175 | 175 | 175 | 174 | 174 | 174 | 173 | 173 | 173 | 173 | 173 | 173 |
| 171 | 172 | 172 | 173 | 174 | 174 | 175 | 175 | 175 | 175 | 175 | 175 | 175 | 175 | 175 | 174 | 175 |
| 165 | 165 | 166 | 168 | 170 | 172 | 173 | 175 | 176 | 177 | 177 | 177 | 177 | 177 | 177 | 176 | 177 |
| 164 | 165 | 166 | 167 | 168 | 169 | 171 | 173 | 174 | 174 | 174 | 174 | 174 | 174 | 174 | 174 | 174 |
| 165 | 165 | 166 | 166 | 166 | 166 | 166 | 166 | 166 | 166 | 165 | 165 | 165 | 165 | 165 | 165 | 165 |
| 168 | 167 | 167 | 166 | 165 | 165 | 165 | 165 | 165 | 165 | 165 | 165 | 165 | 165 | 165 | 165 | 165 |
| 167 | 166 | 166 | 166 | 166 | 165 | 165 | 165 | 166 | 166 | 166 | 167 | 167 | 167 | 166 | 166 | 166 |
| 166 | 166 | 166 | 166 | 165 | 165 | 165 | 165 | 165 | 165 | 165 | 165 | 165 | 165 | 165 | 164 | 164 |
| 166 | 166 | 165 | 165 | 165 | 164 | 164 | 165 | 165 | 165 | 165 | 165 | 165 | 165 | 165 | 165 | 165 |
| 165 | 165 | 165 | 165 | 164 | 164 | 164 | 164 | 164 | 164 | 164 | 165 | 165 | 165 | 165 | 165 | 165 |
| 163 | 163 | 163 | 163 | 163 | 164 | 164 | 164 | 164 | 164 | 164 | 164 | 165 | 165 | 165 | 165 | 165 |

FIG. 20

| 107 | 107 | 107 | 107 | 107 | 107 | 107 | 107 | 107 | 107 | 108 | 107 | 109 | 109 | 109 | 110 | 112 | 113 |
| --- | --- | --- | --- | --- | --- | --- | --- | --- | --- | --- | --- | --- | --- | --- | --- | --- | --- |
| 107 | 107 | 107 | 107 | 107 | 107 | 107 | 107 | 107 | 108 | 109 | 108 | 111 | 109 | 113 | 114 | 116 | 119 |
| 109 | 109 | 110 | 110 | 110 | 111 | 111 | 112 | 113 | 114 | 116 | 118 | 119 | 119 | 122 | 124 | 127 | 129 |
| 123 | 122 | 121 | 121 | 120 | 121 | 120 | 119 | 119 | 119 | 119 | 120 | 121 | 121 | 122 | 123 | 126 | 128 |
| 129 | 128 | 127 | 126 | 124 | 123 | 122 | 120 | 118 | 118 | 117 | 117 | 118 | 118 | 120 | 120 | 121 | 124 |
| 129 | 129 | 129 | 128 | 127 | 127 | 126 | 125 | 124 | 123 | 122 | 122 | 122 | 122 | 123 | 122 | 124 | 125 |
| 145 | 146 | 147 | 148 | 148 | 149 | 149 | 149 | 149 | 149 | 149 | 149 | 149 | 149 | 149 | 149 | 149 | 149 |
| 156 | 156 | 156 | 156 | 156 | 156 | 156 | 156 | 155 | 155 | 155 | 155 | 155 | 155 | 155 | 155 | 155 | 155 |
| 155 | 155 | 155 | 155 | 155 | 155 | 155 | 155 | 155 | 155 | 155 | 155 | 155 | 155 | 155 | 155 | 155 | 155 |
| 155 | 155 | 155 | 155 | 155 | 155 | 155 | 155 | 155 | 155 | 155 | 155 | 155 | 155 | 155 | 155 | 155 | 155 |
| 155 | 155 | 155 | 155 | 155 | 155 | 155 | 155 | 155 | 155 | 155 | 155 | 155 | 155 | 155 | 155 | 155 | 155 |
| 155 | 155 | 155 | 155 | 155 | 155 | 155 | 155 | 155 | 155 | 155 | 155 | 155 | 155 | 155 | 155 | 155 | 155 |
| 154 | 155 | 155 | 155 | 155 | 155 | 155 | 155 | 155 | 155 | 155 | 155 | 155 | 155 | 155 | 155 | 155 | 156 |

FIG. 22

| 65 | 69 | 77 | 84 | 87 | 94 | 96 | 94 | 95 | 89 | 84 | 77 | 67 | 67 | 66 | 64 | 70 |
|---|---|---|---|---|---|---|---|---|---|---|---|---|---|---|---|---|
| 82 | 90 | 97 | 97 | 98 | 98 | 96 | 93 | 93 | 90 | 90 | 86 | 81 | 81 | 75 | 67 | 62 |
| 91 | 94 | 97 | 97 | 92 | 93 | 94 | 91 | 90 | 92 | 91 | 92 | 97 | 91 | 87 | 86 | 81 |
| 94 | 94 | 95 | 96 | 95 | 95 | 95 | 95 | 95 | 93 | 90 | 92 | 92 | 93 | 93 | 91 | 89 |
| 95 | 95 | 96 | 95 | 95 | 96 | 93 | 94 | 95 | 90 | 92 | 92 | 91 | 92 | 93 | 93 | 91 |
| 89 | 90 | 92 | 96 | 96 | 96 | 97 | 99 | 92 | 91 | 98 | 93 | 93 | 95 | 93 | 92 | 93 |
| 102 | 100 | 98 | 93 | 91 | 88 | 90 | 88 | 87 | 88 | 90 | 89 | 92 | 95 | 96 | 95 | 91 |
| 158 | 152 | 143 | 134 | 123 | 113 | 106 | 106 | 107 | 108 | 112 | 119 | 126 | 128 | 130 | 129 | 125 |
| 172 | 167 | 163 | 158 | 152 | 148 | 147 | 150 | 154 | 156 | 160 | 160 | 161 | 164 | 166 | 167 | 168 |
| 178 | 178 | 176 | 175 | 175 | 176 | 176 | 176 | 178 | 177 | 176 | 177 | 177 | 176 | 176 | 175 | 172 |
| 180 | 182 | 182 | 182 | 183 | 184 | 183 | 185 | 185 | 183 | 182 | 181 | 179 | 175 | 173 | 169 | 166 |
| 184 | 184 | 186 | 185 | 184 | 185 | 184 | 183 | 183 | 183 | 182 | 180 | 177 | 172 | 170 | 169 | 168 |
| 186 | 185 | 185 | 184 | 184 | 185 | 184 | 185 | 182 | 181 | 179 | 179 | 177 | 176 | 176 | 177 | 178 |

FIG. 23

| 171 | 174 | 176 | 178 | 179 | 180 | 181 | 181 | 180 | 179 | 178 | 175 | 172 | 169 | 166 | 163 | 160 |
|---|---|---|---|---|---|---|---|---|---|---|---|---|---|---|---|---|
| 176 | 178 | 179 | 180 | 180 | 181 | 182 | 182 | 182 | 181 | 180 | 179 | 178 | 176 | 174 | 172 | 169 |
| 182 | 183 | 183 | 183 | 183 | 183 | 182 | 182 | 182 | 182 | 181 | 181 | 180 | 180 | 179 | 177 | 175 |
| 182 | 181 | 181 | 181 | 181 | 180 | 180 | 180 | 180 | 180 | 180 | 180 | 180 | 179 | 178 | 178 | 177 |
| 180 | 180 | 180 | 180 | 180 | 180 | 180 | 180 | 179 | 179 | 179 | 180 | 180 | 180 | 180 | 180 | 179 |
| 179 | 179 | 179 | 179 | 179 | 178 | 178 | 177 | 177 | 177 | 177 | 178 | 178 | 179 | 179 | 179 | 179 |
| 173 | 173 | 173 | 174 | 175 | 176 | 177 | 178 | 179 | 179 | 179 | 179 | 178 | 177 | 176 | 176 | 175 |
| 171 | 170 | 170 | 170 | 170 | 170 | 170 | 171 | 171 | 171 | 171 | 170 | 169 | 169 | 168 | 167 | 167 |
| 174 | 173 | 173 | 173 | 172 | 172 | 171 | 169 | 169 | 169 | 170 | 170 | 171 | 172 | 173 | 174 | 173 |
| 166 | 166 | 167 | 167 | 167 | 168 | 169 | 170 | 170 | 171 | 171 | 171 | 172 | 173 | 174 | 174 | 174 |
| 170 | 171 | 172 | 172 | 173 | 173 | 174 | 174 | 174 | 174 | 174 | 174 | 174 | 174 | 174 | 173 | 173 |
| 174 | 175 | 175 | 175 | 175 | 175 | 175 | 175 | 175 | 175 | 175 | 175 | 175 | 175 | 175 | 176 | 176 |
| 175 | 175 | 175 | 175 | 175 | 176 | 176 | 176 | 176 | 176 | 176 | 176 | 176 | 176 | 176 | 177 | 177 |

FIG. 24

| 148 | 149 | 150 | 150 | 151 | 151 | 152 | 152 | 151 | 151 | 150 | 148 | 147 | 145 | 144 | 142 | 140 |
| 150 | 151 | 152 | 152 | 153 | 153 | 154 | 154 | 154 | 153 | 153 | 152 | 152 | 151 | 149 | 148 | 146 |
| 154 | 154 | 155 | 155 | 155 | 155 | 155 | 154 | 155 | 155 | 154 | 154 | 153 | 153 | 152 | 151 | 150 |
| 155 | 155 | 155 | 155 | 155 | 155 | 155 | 155 | 155 | 155 | 155 | 155 | 154 | 154 | 153 | 153 | 152 |
| 155 | 155 | 155 | 155 | 155 | 155 | 155 | 155 | 155 | 155 | 155 | 155 | 155 | 155 | 154 | 154 | 153 |
| 155 | 155 | 155 | 155 | 154 | 154 | 154 | 154 | 154 | 154 | 154 | 154 | 154 | 154 | 154 | 154 | 153 |
| 150 | 151 | 151 | 152 | 153 | 153 | 154 | 154 | 155 | 155 | 155 | 155 | 155 | 155 | 155 | 155 | 155 |
| 123 | 124 | 126 | 127 | 129 | 130 | 132 | 133 | 134 | 134 | 134 | 135 | 135 | 135 | 136 | 136 | 137 |
| 110 | 111 | 111 | 111 | 111 | 112 | 112 | 112 | 112 | 112 | 112 | 112 | 112 | 113 | 113 | 114 | 115 |
| 113 | 113 | 113 | 113 | 113 | 112 | 112 | 111 | 111 | 111 | 110 | 110 | 110 | 110 | 110 | 110 | 110 |
| 109 | 108 | 108 | 107 | 107 | 106 | 106 | 105 | 105 | 105 | 105 | 106 | 106 | 106 | 107 | 107 | 108 |
| 104 | 103 | 103 | 103 | 103 | 102 | 103 | 105 | 103 | 104 | 104 | 104 | 105 | 105 | 105 | 105 | 105 |
| 102 | 102 | 102 | 102 | 102 | 102 | 102 | 103 | 103 | 103 | 103 | 103 | 103 | 103 | 103 | 103 | 103 |

| 130 | 130 | 129 | 130 | 130 | 130 | 130 | 131 | 131 | 131 | 131 | 131 | 131 | 131 | 131 | 131 |
|---|---|---|---|---|---|---|---|---|---|---|---|---|---|---|---|
| 130 | 130 | 130 | 131 | 130 | 130 | 131 | 131 | 131 | 131 | 131 | 131 | 131 | 130 | 129 | 130 |
| 132 | 132 | 132 | 132 | 132 | 132 | 132 | 132 | 132 | 132 | 132 | 132 | 131 | 131 | 131 | 131 |
| 132 | 132 | 132 | 131 | 131 | 131 | 131 | 131 | 131 | 131 | 131 | 131 | 132 | 132 | 132 | 127 |
| 131 | 130 | 127 | 125 | 125 | 125 | 125 | 125 | 124 | 124 | 125 | 127 | 127 | 127 | 127 | 128 |
| 128 | 127 | 127 | 127 | 127 | 127 | 127 | 126 | 127 | 128 | 128 | 128 | 128 | 128 | 128 | 128 |
| 124 | 124 | 125 | 125 | 125 | 125 | 124 | 124 | 124 | 125 | 125 | 126 | 126 | 126 | 125 | 124 |
| 108 | 107 | 107 | 107 | 107 | 107 | 107 | 107 | 107 | 108 | 108 | 108 | 108 | 108 | 108 | 108 |
| 111 | 111 | 111 | 112 | 112 | 112 | 112 | 112 | 112 | 112 | 111 | 111 | 111 | 111 | 111 | 111 |
| 127 | 127 | 128 | 129 | 129 | 129 | 129 | 128 | 128 | 128 | 128 | 128 | 128 | 129 | 129 | 129 |
| 132 | 132 | 132 | 132 | 132 | 132 | 132 | 131 | 131 | 131 | 131 | 132 | 132 | 132 | 132 | 132 |
| 132 | 132 | 132 | 131 | 131 | 131 | 131 | 131 | 131 | 131 | 131 | 131 | 131 | 131 | 131 | 130 |
| 132 | 132 | 132 | 131 | 131 | 131 | 132 | 132 | 133 | 133 | 133 | 132 | 132 | 132 | 132 | 132 |

FIG. 28

| 129 | 129 | 129 | 129 | 129 | 129 | 129 | 129 | 129 | 129 | 129 | 129 | 129 | 129 | 129 | 129 |
| 129 | 129 | 129 | 129 | 129 | 129 | 129 | 129 | 129 | 129 | 129 | 129 | 129 | 129 | 129 | 129 |
| 128 | 129 | 129 | 129 | 129 | 129 | 129 | 129 | 129 | 129 | 129 | 129 | 129 | 129 | 129 | 129 |
| 129 | 129 | 129 | 129 | 129 | 129 | 129 | 129 | 129 | 129 | 129 | 129 | 129 | 129 | 129 | 129 |
| 129 | 129 | 129 | 129 | 129 | 129 | 129 | 129 | 129 | 129 | 129 | 129 | 129 | 129 | 129 | 129 |
| 129 | 129 | 129 | 129 | 129 | 129 | 129 | 129 | 129 | 129 | 129 | 129 | 129 | 129 | 129 | 129 |
| 130 | 130 | 130 | 130 | 130 | 130 | 130 | 130 | 130 | 130 | 130 | 129 | 129 | 131 | 131 | 131 |
| 134 | 134 | 134 | 134 | 134 | 134 | 134 | 134 | 134 | 134 | 134 | 134 | 134 | 134 | 134 | 134 |
| 134 | 134 | 134 | 134 | 134 | 134 | 134 | 134 | 134 | 134 | 134 | 134 | 134 | 133 | 133 | 133 |
| 129 | 129 | 129 | 128 | 128 | 128 | 128 | 128 | 128 | 128 | 128 | 128 | 128 | 127 | 127 | 127 |
| 127 | 127 | 127 | 128 | 128 | 128 | 128 | 128 | 128 | 128 | 128 | 128 | 128 | 129 | 128 | 128 |
| 127 | 127 | 128 | 128 | 128 | 128 | 128 | 128 | 128 | 128 | 129 | 129 | 129 | 129 | 129 | 129 |
| 128 | 128 | 128 | 128 | 128 | 128 | 128 | 128 | 128 | 128 | 128 | 128 | 128 | 128 | 128 | 128 |

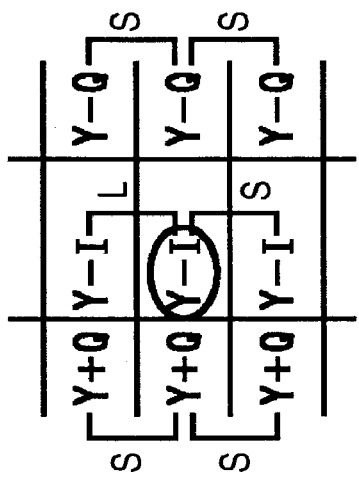
FIG. 29D
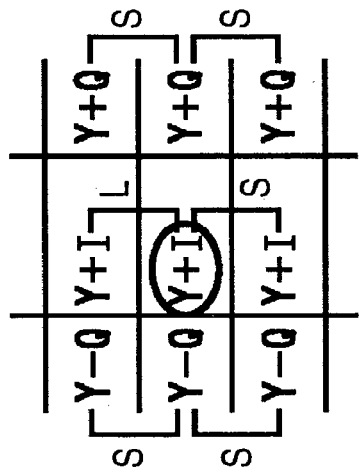
FIG. 29C
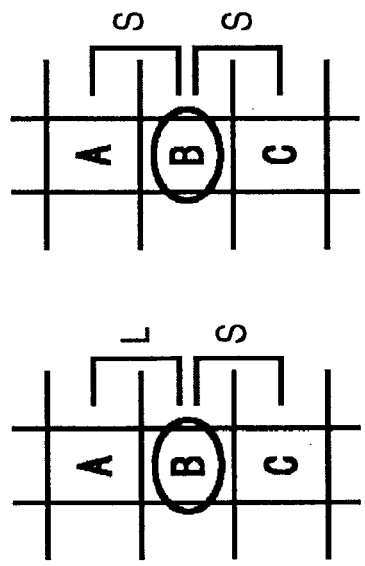
FIG. 29B
FIG. 29A

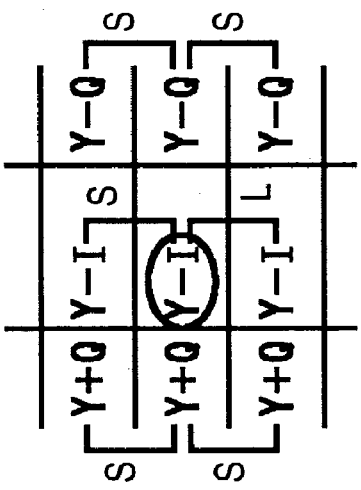
FIG. 30D
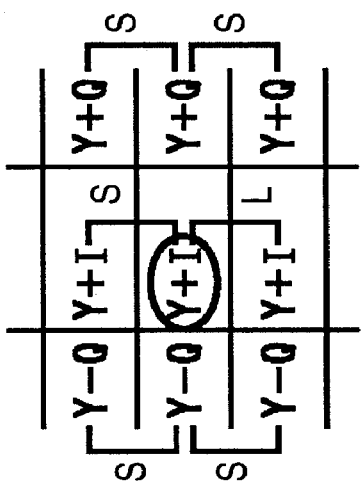
FIG. 30C
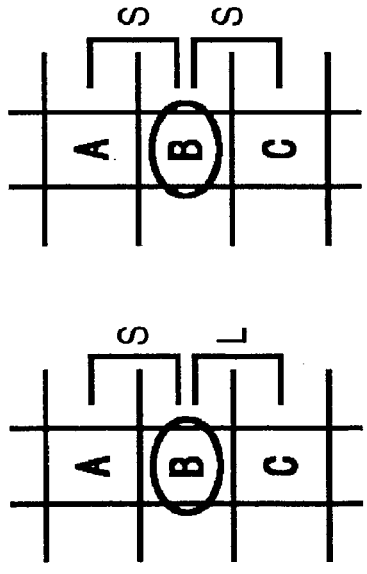
FIG. 30B
FIG. 30A

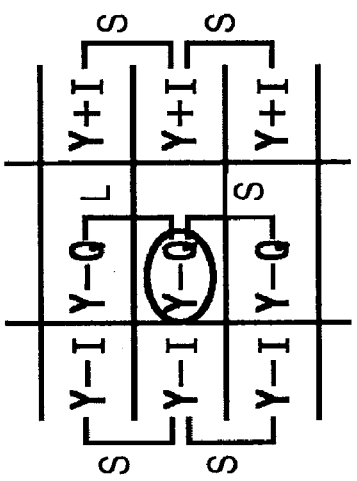
FIG. 31D
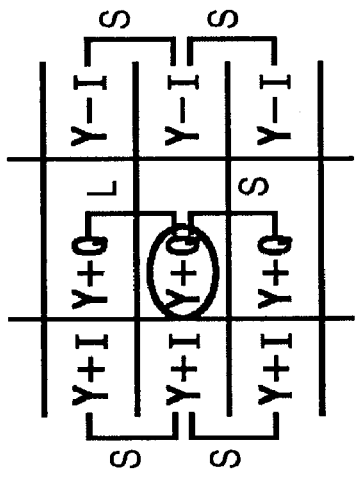
FIG. 31C
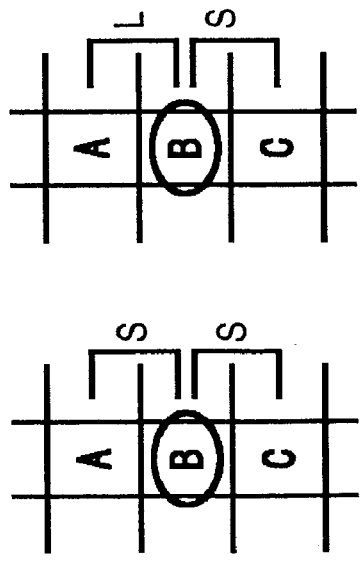
FIG. 31B
FIG. 31A

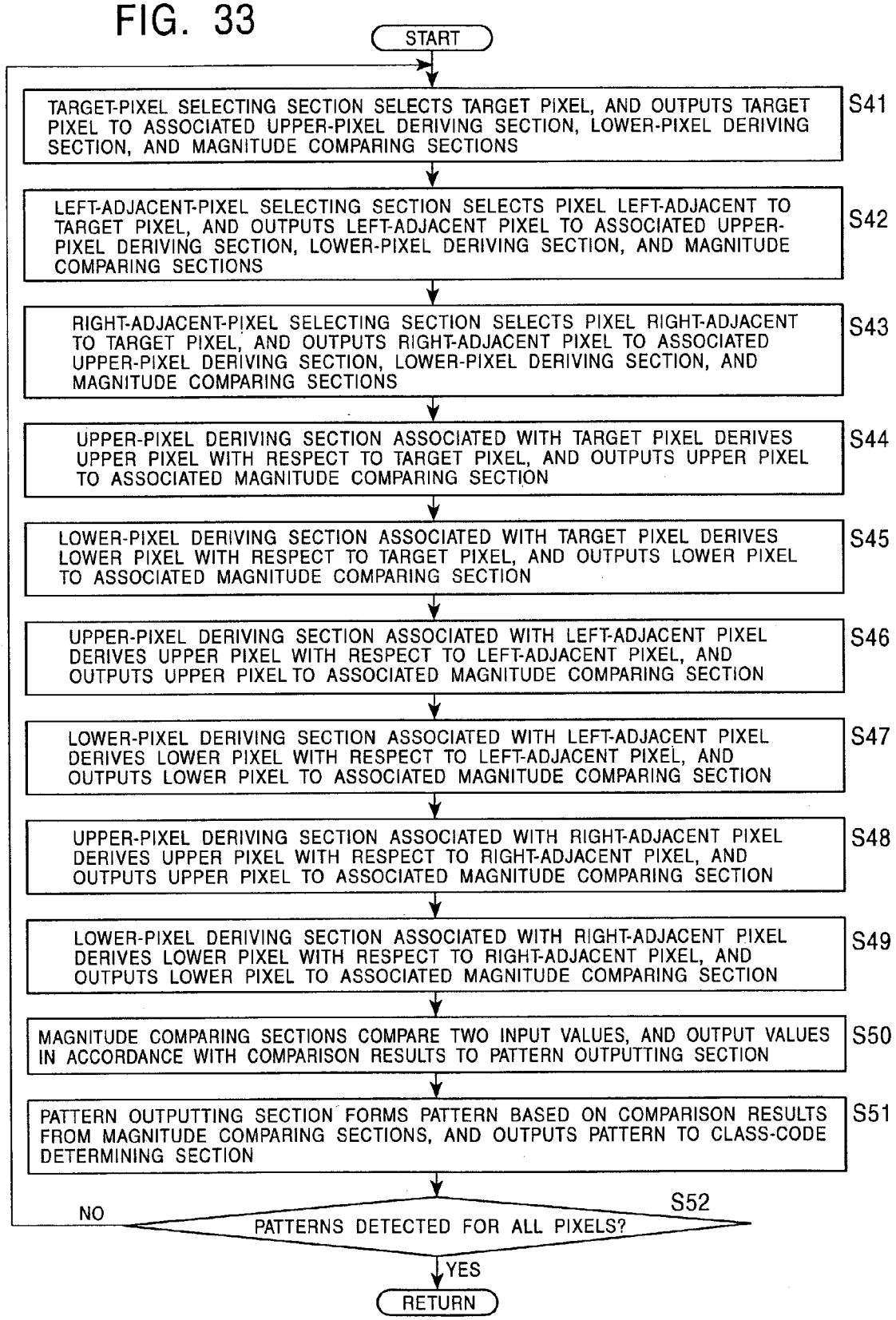

| 0 | 1 | 0 |
|---|---|---|
| 0 | 0 | 0 |

FIG. 40

| Y+I | Y+Q | Y−I | Y−Q | Y+I |
|---|---|---|---|---|
| P92—(Y−I) | Y−Q | (Y+I) | Y+Q | (Y−I)—P93 |
| Y+I | Y+Q | Y−I | Y−Q | Y+I |

| I | Q | I | Q | I |
|---|---|---|---|---|
| I | Q | (I) | Q | I |
| I | Q | I | Q | I |

P101

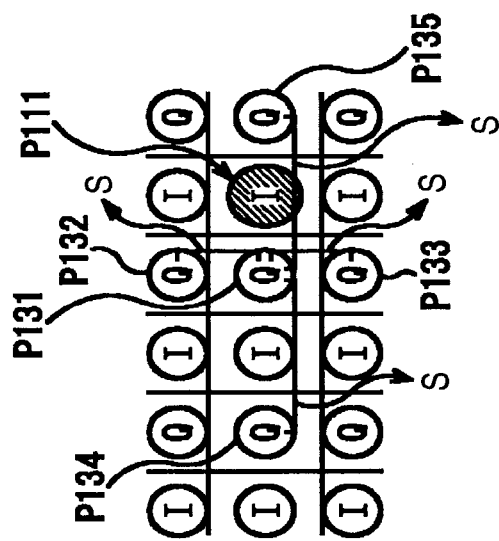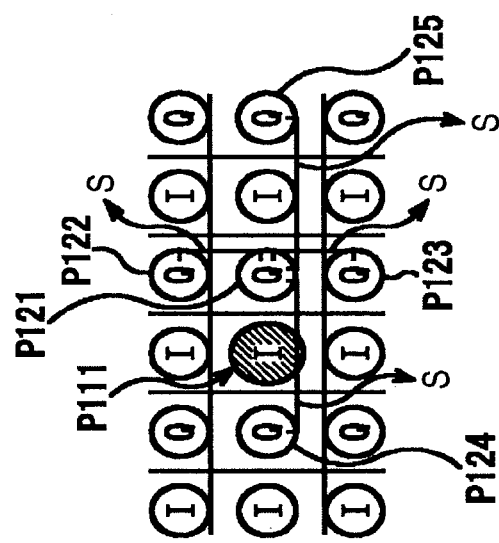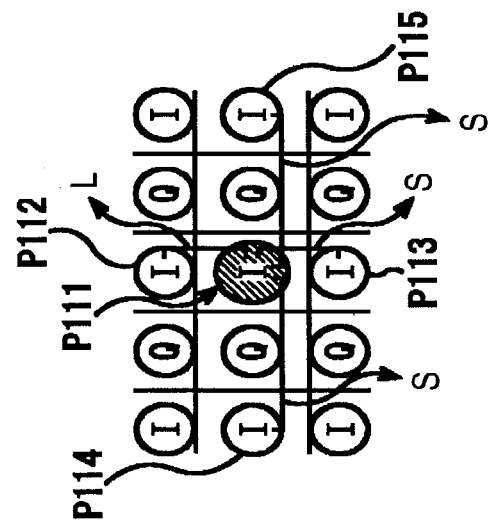

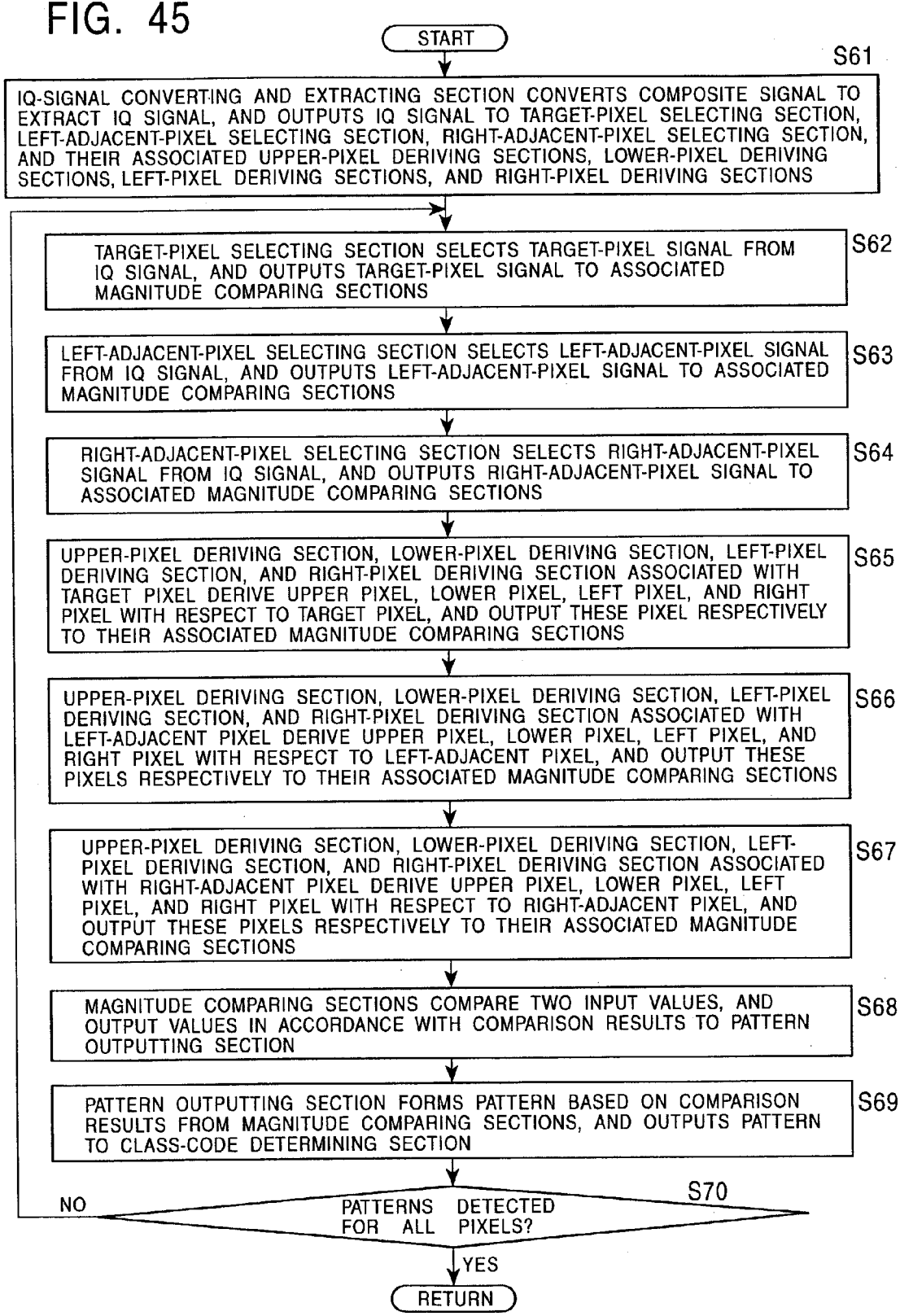

| 0 | 1 | 0 |
|---|---|---|
| 1 | 1 | 1 |

IMAGE-INFORMATION CONVERTING APPARATUS AND METHOD, IMAGE DISPLAYING APPARATUS AND METHOD, COEFFICIENT CALCULATING APPARATUS AND METHOD, COEFFICIENT-DATA STORING APPARATUS, APPARATUS AND METHOD FOR DETECTING PART WHERE PICTURE QUALITY IS DEGRADED, RECORDING MEDIUM, AND PROGRAM

BACKGROUND OF THE INVENTION

1. Field of the Invention

The present invention relates to image-information converting apparatuses and methods, image displaying apparatuses and methods, coefficient calculating apparatuses and methods, coefficient-data storing apparatuses and methods, apparatuses and methods for detecting a part where picture quality is degraded, recording media, and programs. More specifically, the present invention relates to an image-information converting apparatus and method, an image displaying apparatus and method, a coefficient calculating apparatus and method, a coefficient-data storing apparatus and method, and an apparatus and method for detecting a part where picture quality is degraded, a recording medium, and a program.

2. Description of the Related Art

Techniques of converting a composite video signal into a component video signal are becoming widespread. As an example of video signals, NTSC (National Television Standards Committee) video signals are widely used.

FIG. 1 is an example configuration of a television receiver that is relevant to the present invention. Referring to FIG. 1, a tuner 2 demodulates a signal received by an antenna 1, and outputs a demodulated signal to a video intermediate-frequency processing circuit (VIF circuit) 3. A composite video signal processed in and output from the VIF circuit 3 is input to a Y/C (Y: luminance signal, C: chroma signal) separation circuit 4. The Y/C separation circuit 4 separates the composite video signal input thereto into a luminance signal Y and a chroma signal C, outputting these signals to a matrix circuit 6 and a chroma demodulation circuit 5, respectively. The chroma demodulation circuit demodulates the chroma signal C input thereto, generating color-difference signals R-Y and B-Y, which are fed to the matrix circuit 6. The matrix circuit 6 generates RGB primary-color signals from the luminance signal Y, and the color-difference signals R-Y and B-Y input thereto, and outputs the RGB signals to a display device 7 for display.

Now, the operation of the television receiver will be described. The tuner 2 receives, via the antenna 1, an electromagnetic wave of a broadcasting station of a channel specified by a user, and outputs a demodulated signal to the VIF circuit 3. The VIF circuit 3 processes the signal output from the tuner 2, and outputs, for example, an NTSC composite video signal to the Y/C separation circuit 4. The Y/C separation circuit 4 separates the composite video signal into a luminance signal Y and a chroma signal C, outputting the luminance signal Y and the chroma signal C to the matrix circuit 6 and the chroma demodulation circuit 5, respectively.

The chroma demodulation circuit 5 demodulates the chroma signal C input from the Y/C separation circuit 4, thereby generating color-difference signals R-Y and B-Y. The matrix circuit 6 combines the luminance signal Y fed from the Y/C separating circuit 4 and the color-difference signals R-Y and B-Y fed from the chroma demodulation circuit 5 to generate RGB primary-color signals, which are output to the display device 7 for display.

FIG. 2 shows another example configuration of a television receiver that is relevant to the present invention. Although the basic configuration is the same as that of the television receiver shown n FIG. 1, in FIG. 2, a resolution converter circuit 11 is provided. The resolution converter circuit 11 changes the resolution based on the luminance signal Y fed from the Y/C separation circuit 4 and the color-difference signals R-Y and B-Y fed from the chroma demodulation circuit 5, and executes so-called IP conversion (Interlace/Progressive conversion), and so forth, outputting the results to the matrix circuit 6. The operation of the television receiver shown in FIG. 2 additionally includes conversion of resolution and IP conversion executed by the resolution converter circuit 11 as compared with the operation of the television receiver shown in FIG. 1.

As described above, in the television receivers relevant to the present invention, a composite video signal is first separated into a luminance signal Y and a chroma signal C in the Y/C separation circuit 4, and the chroma signal C is then demodulated to form a component signal including a baseband luminance signal Y and color-difference signals R-Y and B-Y. The component signal is then converted into RGB primary-color signals by the matrix circuit 6. Thus, the circuitry is complex and large in size, resulting in high cost.

Although filters including two-dimensional Y/C separation circuit and three-dimensional Y/C separation circuits have been proposed in order to solve the problems described above, the filters are susceptible to degradation in picture quality due to error in Y/C separation, such as dot interference or cross color.

SUMMARY OF THE INVENTION

The present invention has been made in view of the situation described above, and it is an object of the present invention to provide simple and small circuitry in which degradation in picture quality that is caused by conversion of a composite signal into a component signal is suppressed.

The present invention, in one aspect thereof, provides an image-information converting apparatus including a first extracting unit for extracting pixel signals of a plurality of first pixels associated with a target pixel from a composite signal; a first relational-information generating unit for generating first relational information regarding a color component between the plurality of first pixels and the target pixel; a first classification unit for classifying the target pixel into a first class based on the first relational information regarding the color component; a second extracting unit for extracting pixel signals of a plurality of second pixels associated with the target pixel from the composite signal; and a target-pixel-signal converting unit for converting a pixel signal of the target pixel by processing the pixel signals of the plurality of second pixels using predetermined coefficients associated with the first class.

The image-information converting apparatus may further include a virtual-pixel-signal generating unit for generating a pixel signal of a virtual signal associated with the target pixel, using the pixel signals of the plurality of first pixels; and a difference calculating unit for calculating a difference in a color component between the pixel signal of the virtual pixel and the pixel signal of the target pixel; wherein the first relational-information generating unit generates first relational information regarding the color component between the plurality of first pixels and the target pixel based on the difference in the color component.

In the image-information converting apparatus, the virtual-pixel-signal generating unit may generate a pixel signal of a virtual pixel associated with the target pixel by linear interpolation using the pixel signals of the plurality of first pixels.

The image-information converting apparatus may further include a third extracting unit for extracting pixel signals of a plurality of third pixels associated with the virtual pixel from the composite signal; a second relational-information generating unit for generating second relational information, different from the first relational information regarding the color component, between the plurality of first pixels and the virtual pixel; and a second classification unit for classifying the virtual pixel into a second class that is different from the first class, based on the second relational information; wherein the virtual-pixel-signal generating unit processes the pixel signals of the plurality of third pixels using predetermined coefficients associated with the second class to generate a pixel signal of the virtual pixel.

In the image-information converting apparatus, the first relational-information generating unit may further include a comparing unit for comparing the first relational information regarding the color component with a predetermined threshold value, and the first classification unit may classify the target pixel into the first class based on a result of the comparison by the comparing unit.

In the image-information converting apparatus, the color component may include a first color component and a second color component, and the image-information converting apparatus may further include a first color-component-pixel-signal extracting unit for extracting a pixel signal of a first color-component pixel that includes the first color component of the target pixel from the plurality of first pixels; a second color-component-pixel-signal extracting unit for extracting a pixel signal of a second color-component pixel that includes the second color component of an adjacent pixel that is adjacent to the target pixel from the plurality of first pixels; a first virtual-pixel-signal generating unit for generating a pixel signal of a first virtual pixel associated with the target pixel, by using, of the pixel signals of the plurality of first pixels, a pixel signal of a pixel that is at a predetermined position relative to the target pixel and that includes the first color component; and a second virtual-pixel-signal generating unit for generating a pixel signal of a second virtual pixel associated with the adjacent pixel, by using, of the pixel signals of the plurality of first pixels, a pixel signal of a pixel that is at a predetermined position relative to the adjacent pixel and that includes the second color component; and the first relational-information generating unit may generate first relational information regarding the color component between the plurality of first pixels and the target pixel based on first correlation information between the pixel signal of the first virtual pixel and the pixel signal of the target pixel and based on second correlation information between the pixel signal of the second virtual pixel and the pixel signal of the adjacent pixel.

The present invention, in another aspect thereof, provides an image-information converting method including a first extracting step of extracting pixel signals of a plurality of first pixels associated with a target pixel from a composite signal; a relational-information generating step of generating relational information regarding a color component between the plurality of first pixels and the target pixel; a classification step of classifying the target pixel into a class based on the relational information regarding the color component; a second extracting step of extracting pixel signals of a plurality of second pixels associated with the target pixel from the composite signal; and a target-pixel-signal converting step of converting a pixel signal of the target pixel by processing the pixel signals of the plurality of second pixels using predetermined coefficients associated with the class.

The present invention, in another aspect thereof, provides a first recording medium having recorded thereon a computer-readable program including a first extracting-control step of controlling extraction of pixel signals of a plurality of first pixels associated with a target pixel from a composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; and a target-pixel-signal converting-control step of controlling conversion of a pixel signal of the target pixel by controlling processing of the pixel signals of the plurality of second pixels using predetermined coefficients associated with the class.

The present invention, in another aspect thereof, provides a first program that is executed by a computer, the program including a first extracting-control step of controlling extraction of pixel signals of a plurality of first pixels associated with a target pixel from a composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; and a target-pixel-signal converting-control step of controlling conversion of a pixel signal of the target pixel by controlling processing of the pixel signals of the plurality of second pixels using predetermined coefficients associated with the class.

The present invention, in another aspect thereof, provides an image displaying apparatus including a first extracting unit for extracting pixel signals of a plurality of first pixels associated with a target pixel from a composite signal; a relational-information generating unit for generating relational information regarding a color component between the plurality of first pixels and the target pixel; a classification unit for classifying the target pixel into a class based on the relational information regarding the color component; a second extracting unit for extracting pixel signals of a plurality of second pixels associated with the target pixel from the composite signal; a target-pixel-signal converting unit for converting a pixel signal of the target pixel into a component signal by processing the pixel signals of the plurality of second pixels using predetermined coefficients associated with the class; and a display unit for displaying the pixel signal of the target pixel, having been converted into the component signal.

The present invention, in another aspect thereof, provides an image displaying method including a first extracting step of extracting pixel signals of a plurality of first pixels associated with a target pixel from a composite signal; a relational-information generating step of generating relational information regarding a color component between the plurality of first pixels and the target pixel; a classification step of classifying the target pixel into a class based on the relational information regarding the color component; a second extracting step of extracting pixel signals of a plurality of second pixels associated with the target pixel from the composite signal; a target-pixel-signal converting step of converting a pixel signal of the target pixel into a component signal by processing the pixel signals of the plurality of second pixels using predetermined coefficients associated with the class; and a display step of displaying the pixel signal of the target pixel, having been converted into the component signal.

The present invention, in another aspect thereof, provides a second recording medium having recorded thereon a computer-readable program including a first extracting-control step of controlling extraction of pixel signals of a plurality of first pixels associated with a target pixel from a composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; a target-pixel-signal converting-control step of controlling conversion of a pixel signal of the target pixel into a component signal by controlling processing of the pixel signals of the plurality of second pixels using predetermined coefficients associated with the class; and a display-control step of controlling display of the pixel signal of the target pixel, having been converted into the component signal.

The present invention, in another aspect thereof, provides a second program that is executed by a computer, the program including a first extracting-control step of controlling extraction of pixel signals of a plurality of first pixels associated with a target pixel from a composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; a target-pixel-signal converting-control step of controlling conversion of a pixel signal of the target pixel into a component signal by controlling processing of the pixel signals of the plurality of second pixels using predetermined coefficients associated with the class; and a display-control step of controlling display of the pixel signal of the target pixel, having been converted into the component signal.

The present invention, in another aspect thereof, provides a coefficient calculating apparatus including a composite-signal generating unit for generating a composite signal from an input image signal; a first extracting unit for extracting pixel signals of a plurality of first pixels associated with a target pixel from the composite signal; a relational-information generating unit for generating relational information regarding a color component between the plurality of first pixels and the target pixel; a classification unit for classifying the target pixel into a class based on the relational information regarding the color component; a second extracting unit for extracting pixel signals of a plurality of second pixels associated with the target pixel from the composite signal; and a calculating unit for calculating coefficients associated with the class, based on the pixel signals of the plurality of second pixels and the input image signal.

The coefficient calculating apparatus may further include a coefficient-data storing unit for storing coefficient data including coefficients that have been calculated.

The present invention, in another aspect thereof, provides a coefficient calculating method including a composite-signal generating step of generating a composite signal from an input image signal; a first extracting step of extracting pixel signals of a plurality of first pixels associated with a target pixel from the composite signal; a relational-information generating step of generating relational information regarding a color component between the plurality of first pixels and the target pixel; a classification step of classifying the target pixel into a class based on the relational information regarding the color component; a second extracting step of extracting pixel signals of a plurality of second pixels associated with the target pixel from the composite signal; and a calculating step of calculating coefficients associated with the class, based on the pixel signals of the plurality of second pixels and the input image signal.

The present invention, in another aspect thereof, provides a third recording medium having recorded thereon a computer-readable program including a composite-signal generating-control step of controlling generation of a composite signal from an input image signal; a first extracting-control step of controlling extraction of pixel signals of a plurality of first pixels associated with a target pixel from the composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; and a calculating-control step of controlling calculation of coefficients associated with the class, based on the pixel signals of the plurality of second pixels and the input image signal.

The present invention, in another aspect thereof, provides a third program that is executed by a computer, the computer including a composite-signal generating-control step of controlling generation of a composite signal from an input image signal; a first extracting-control step of controlling extraction of pixel signals of a plurality of first pixels associated with a target pixel from the composite signal; a relational-information generating-control step of controlling generation of relational information regarding a color component between the plurality of first pixels and the target pixel; a classification-control step of controlling classification of the target pixel into a class based on the relational information regarding the color component; a second extracting-control step of controlling extraction of pixel signals of a plurality of second pixels associated with the target pixel from the composite signal; and a calculating-control step of controlling calculation of coefficients associated with the class, based on the pixel signals of the plurality of second pixels and the input image signal.

The present invention, in another aspect thereof, provides a first apparatus for detecting a part where picture quality is degraded, the apparatus including a first color-component-pixel-signal extracting unit for extracting a pixel signal of a first color-component pixel that includes a first color component of a target pixel from a composite signal; a second color-component-pixel-signal extracting unit for extracting a pixel signal of a second color-component pixel that includes a second color component of an adjacent pixel that is adjacent to the target pixel from the composite signal; a first correlation-information generating unit for generating first correlation information between the pixel signal of the first color-component pixel and a pixel signal of the target pixel; a second correlation-information generating unit for generating second correlation information between the pixel signal of the second color-component pixel and a pixel signal of the adjacent pixel; a relational-information generating unit for generating relational information regarding a color component between a plurality of pixels and the target pixel; and a determining unit for determining whether degradation in picture quality occurs at the target pixel or in a predetermined region including the target pixel, based on the relational information regarding the color component.

The apparatus may further include a comparing unit for comparing the first correlation information and the second correlation information with predetermined threshold values that are set for the first correlation information and the second correlation information, respectively, wherein the determining unit determines that degradation in picture quality occurs at the target pixel or in the predetermined region including the target pixel if, in results of the comparisons by the comparing unit, at least one of the first correlation information and the second correlation information is larger than the associated one of the predetermined threshold values respectively set for the first correlation information and the second correlation information.

The present invention, in another aspect thereof, provides a first method for detecting a part where picture quality is degraded, the method including a first color-component-pixel-signal extracting step of extracting a pixel signal of a first color-component pixel that includes a first color component of a target pixel from a composite signal; a second color-component-pixel-signal extracting step of extracting a pixel signal of a second color-component pixel that includes a second color component of an adjacent pixel that is adjacent to the target pixel from the composite signal; a first correlation-information generating step of generating first correlation information between the pixel signal of the first color-component pixel and a pixel signal of the target pixel; a second correlation-information generating step of generating second correlation information between the pixel signal of the second color-component pixel and a pixel signal of the adjacent pixel; a relational-information generating step of generating relational information regarding a color component between a plurality of pixels and the target pixel; and a determining step of determining whether degradation in picture quality occurs at the target pixel or in a predetermined region including the target pixel, based on the relational information regarding the color component.

The present invention, in another aspect thereof, provides a fourth recording medium having recorded thereon a computer-readable program including a first color-component-pixel-signal extracting-control step of controlling extraction of a pixel signal of a first color-component pixel that includes a first color component of a target pixel from a composite signal; a second color-component-pixel-signal extracting-control step of controlling extraction of a pixel signal of a second color-component pixel that includes a second color component of an adjacent pixel that is adjacent to the-target pixel from the composite signal; a first correlation-information generating-control step of controlling generation of first correlation information between the pixel signal of the first color-component pixel and a-pixel signal of the target pixel; a second correlation-information generating-control step of controlling generation of second correlation information between the pixel signal of the second color-component pixel and a pixel signal of the adjacent pixel; a relational-information generating-control step of controlling generation of relational information regarding a color component between a plurality of pixels and the target pixel; and a determining-control step of controlling determination as to whether degradation in picture quality occurs at the target pixel or in a predetermined region including the target pixel, based on the relational information regarding the color component.

The present invention, in another aspect thereof, provides a fourth program that is executed by a computer, the program including a first color-component-pixel-signal extracting-control step of controlling extraction of a pixel signal of a first color-component pixel that includes a first color component of a target pixel from a composite signal; a second color-component-pixel-signal extracting-control step of controlling extraction of a pixel signal of a second color-component pixel that includes a second color component of an adjacent pixel that is adjacent to the target pixel from the composite signal; a first correlation-information generating-control step of controlling generation of first correlation information between the pixel signal of the first color-component pixel and a pixel signal of the target pixel; a second correlation-information generating-control step of controlling generation of second correlation information between the pixel signal of the second color-component pixel and a pixel signal of the adjacent pixel; a relational-information generating-control step of controlling generation of relational information regarding a color component between a plurality of pixels and the target pixel; and a determining-control step of controlling determination as to whether degradation in picture quality occurs at the target pixel or in a predetermined region including the target pixel, based on the relational information regarding the color component.

The present invention, in another aspect thereof, provides a second apparatus for detecting a part where picture quality is degraded, the apparatus including a first color-component-pixel-signal extracting unit for extracting a pixel signal of a first color-component pixel that includes a first color component of a target pixel from a composite signal; a second color-component-pixel-signal extracting unit for extracting a pixel signal of a second color-component pixel that includes a second color component of an adjacent pixel that is adjacent to the target pixel from the composite signal; a first virtual-pixel-signal generating unit for generating a pixel signal of a first virtual pixel associated with the target pixel, by using the pixel signal of the first color-component pixel that is at a predetermined position relative to the target pixel; a second virtual-pixel-signal generating unit for generating a pixel signal of a second virtual pixel associated with the adjacent pixel, by using the pixel signal of the second color-component pixel that is at a predetermined position relative to the adjacent pixel; a first correlation-information generating unit for generating first correlation information between the pixel signal of the first virtual pixel and a pixel signal of the target pixel; a second correlation-information generating unit for generating second correlation information between the pixel signal of the second virtual pixel and a pixel signal of the adjacent pixel; a relational-information generating unit for generating relational information regarding a color component between a plurality of pixels and the target pixel, based on the first correlation information and the second correlation information; and a determining unit for determining whether degradation in picture quality occurs at the target pixel or in a predetermined region including the target pixel, based on the relational information regarding the color component.

The first virtual-pixel-signal generating unit may generate the pixel signal of the first virtual pixel associated with the target pixel by using the pixel signal of the first color-component pixel that is at a predetermined position relative to the target pixel and that is in phase with or in opposite phase with the pixel signal of the target pixel.

The apparatus may further include a comparing unit for comparing the first correlation information and the second correlation information with predetermined threshold values that are set for the first correlation information and the second correlation information, respectively, wherein the determining unit determines that degradation in picture quality occurs at the target pixel or in the predetermined region including the target pixel if, in results of the comparisons by the comparing unit, at least one of the first correlation information and the second correlation information is larger than the associated one of the predetermined threshold values respectively set for the first correlation information and the second correlation information in results of comparison by the comparing unit.

The first virtual-pixel-signal generating unit may generate the pixel signal of the first virtual pixel associated with the target pixel by linear interpolation using the pixel signal of the first color-component pixel that is at a predetermined position relative to the target pixel, and the second virtual-pixel-signal generating unit may generate the pixel signal of the second virtual pixel associated with the adjacent pixel by linear interpolation using the pixel signal of the second color-component pixel that is at a predetermined position relative to the adjacent pixel.

In the apparatus, the first virtual-pixel-signal generating unit may include a third extracting unit for extracting pixel signals of a plurality of third pixels associated with the first virtual pixel from the composite signal; a third correlation-information generating unit for generating third correlation information between the first color-component pixel and the first virtual pixel; and a first classification unit for classifying the first virtual pixel into a first class based on the third correlation information; the first virtual-pixel-signal generating unit generating the pixel signal of the first virtual pixel by processing the pixel signals of the plurality of third pixels using predetermined coefficients associated with the first class, and the second virtual-pixel-signal generating unit may include a fourth extracting unit for extracting pixel signals of a plurality of fourth pixels associated with the second virtual pixel from the composite signal; a fourth correlation-information generating unit for generating fourth correlation information between the second color-component pixel and the second virtual pixel; and a second classification unit for classifying the second virtual pixel into a second class based on the fourth correlation information; the second virtual-pixel-signal generating unit generating the pixel signal of the second virtual pixel by processing the pixel signals of the plurality of fourth pixels using predetermined coefficients associated with the second class.

The present invention, in another aspect thereof, provides a second method for detecting a part where picture quality is degraded, the method including a first color-component-pixel-signal extracting step of extracting a pixel signal of a first color-component pixel that includes a first color component of a target pixel from a composite signal; a second color-component-pixel-signal extracting step of extracting a pixel signal of a second color-component pixel that includes a second color component of an adjacent pixel that is adjacent to the target pixel from the composite signal; a first virtual-pixel-signal generating step of generating a pixel signal of a first virtual pixel associated with the target pixel, by using the pixel signal of the first color-component pixel that is at a predetermined position relative to the target pixel; a second virtual-pixel-signal generating step of generating a pixel signal of a second virtual pixel associated with the adjacent pixel, by using the pixel signal of the second color-component pixel that is at a predetermined position relative to the adjacent pixel; a first correlation-information generating step of generating first correlation information between the pixel signal of the first virtual pixel and a pixel signal of the target pixel; a second correlation-information generating step of generating second correlation information between the pixel signal of the second virtual pixel and a pixel signal of the adjacent pixel; a relational-information generating step of generating relational information regarding a color component between a plurality of pixels and the target pixel, based on the first correlation information and the second correlation information; and a determining step of determining whether degradation in picture quality occurs at the target pixel or in a predetermined region including the target pixel, based on the relational information regarding the color component.

The present invention, in another aspect thereof, provides a fifth recording medium having recorded thereon a computer readable program including a first color-component-pixel-signal extracting-control step of controlling extraction of a pixel signal of a first color-component pixel that includes a first color component of a target pixel from a composite signal; a second color-component-pixel-signal extracting-control step of controlling extraction of a pixel signal of a second color-component pixel that includes a second color component of an adjacent pixel that is adjacent to the target pixel from the composite signal; a first virtual-pixel-signal generating-control step of controlling generation of a pixel signal of a first virtual pixel associated with the target-pixel, by using the pixel signal of the first color-component pixel that is at a predetermined position relative to the target pixel; a second virtual-pixel-signal generating-control step of controlling generation of a pixel signal of a second virtual pixel associated with the adjacent pixel, by using the pixel signal of the second color-component pixel that is at a predetermined position relative to the adjacent pixel; a first correlation-information generating-control step of controlling generation of first correlation information between the pixel signal of the first virtual pixel and a pixel signal of the target pixel; a second correlation-information generating-control step of controlling generation of second correlation information between the pixel signal of the second virtual pixel and a pixel signal of the adjacent pixel; a relational-information generating-control step of controlling generation of relational information regarding a color component between a plurality of pixels and the target pixel, based on the first correlation information and the second correlation information; and a determining-control step of controlling determination as to whether degradation in picture quality occurs at the target pixel or in a predetermined region including the target pixel, based on the relational information regarding the color component.

The present invention, in another aspect thereof, provides a fifth program that is executed by a computer, the program including a first color-component-pixel-signal extracting-control step of controlling extraction of a pixel signal of a first color-component pixel that includes a first color component of a target pixel from a composite signal; a second color-component-pixel-signal extracting-control step of controlling extraction of a pixel signal of a second color-component pixel that includes a second color component of an adjacent pixel that is adjacent to the target pixel from the composite signal; a first virtual-pixel-signal generating-control step of controlling generation of a pixel signal of a first virtual pixel associated with the target pixel, by using the pixel signal of the first color-component pixel that is at a predetermined position relative to the target pixel; a second virtual-pixel-signal generating-control step of controlling generation of a pixel signal of a second virtual pixel associated with the adjacent pixel, by using the pixel signal of the second color-component pixel that is at a predetermined position relative to the adjacent pixel; a first correlation-information generating-control step of controlling generation of first correlation information between the pixel signal of the first virtual pixel and a pixel signal of the target pixel; a second correlation-information generating-control step of controlling generation of second correlation information between the pixel signal of the second virtual pixel and a pixel signal of the adjacent pixel; a relational-information generating-control step of controlling generation of relational information regarding a color component between a plurality of pixels and the target pixel, based on the first correlation information and the second correlation information; and a determining-control step of controlling determination as to whether degradation in picture quality occurs at the target pixel or in a predetermined region including the target pixel, based on the relational information regarding the color component.

According to the image image-information converting apparatus, method, and program, pixel signals of a plurality of first pixels associated with a target pixel are extracted from a composite signal; first relational information regarding a color component between the plurality of first pixels and the target pixel is generated; the target pixel is classified into a first class based on the first relational information regarding the color component; pixel signals of a plurality of second pixels associated with the target pixel are extracted from the composite signal; and a pixel signal of the target pixel is converted by processing the pixel signals of the plurality of second pixels using predetermined coefficients associated with the first class.

According to the image displaying apparatus, method, and program, pixel signals of a plurality of first pixels associated with a target pixel are extracted from a composite signal; relational information regarding a color component between the plurality of first pixels and the target pixel is generated; the target pixel is classified into a class based on the relational information regarding the color component; pixel signals of a plurality of second pixels associated with the target pixel are extracted from the composite signal; a pixel signal of the target pixel is converted into a component signal by processing the pixel signals of the plurality of second pixels using predetermined coefficients associated with the class; and the pixel signal of the target pixel, having been converted into the component signal, is displayed.

According to the coefficient calculating apparatus, method, and program, a composite signal is generated from an input image signal; pixel signals of a plurality of first pixels associated with a target pixel are extracted from the composite signal; relational information regarding a color component between the plurality of first pixels and the target pixel is generated; the target pixel is classified into a class based on the relational information regarding the color component; pixel signals of a plurality of second pixels associated with the target pixel are extracted from the composite signal; and coefficients associated with the class are calculated, based on the pixel signals of the plurality of second pixels and the input image signal.

According to the first apparatus, method, and program for detecting a part where picture quality is degraded, a pixel signal of a first color-component pixel that includes a first color component of a target pixel is extracted from a composite signal; a pixel signal of a second color-component pixel that includes a second color component of an adjacent pixel that is adjacent to the target pixel is extracted from the composite signal; first correlation information between the pixel signal of the first color-component pixel and a pixel signal of the target pixel is generated; second correlation information between the pixel signal of the second color-component pixel and a pixel signal of the adjacent pixel is generated; relational information regarding a color component between a plurality of pixels and the target pixel is generated; and it is determined whether degradation in picture quality occurs at the target pixel or in a predetermined region including the target pixel, based on the relational information regarding the color component.

According to the second apparatus, method, and program for detecting a part where picture quality is degraded, a pixel signal of a first color-component pixel that includes a first color component of a target pixel is extracted from a composite signal; a pixel signal of a second color-component pixel that includes a second color component of an adjacent pixel that is adjacent to the target pixel is extracted from the composite signal; a pixel signal of a first virtual pixel associated with the target pixel is generated, by using the pixel signal of the first color-component pixel that is at a predetermined position relative to the target pixel; a pixel signal of a second virtual pixel associated with the adjacent pixel is generated, by using the pixel signal of the second color-component pixel that is at a predetermined position relative to the adjacent pixel; first correlation information between the pixel signal of the first virtual pixel and a pixel signal of the target pixel is generated; second correlation information between the pixel signal of the second virtual pixel and a pixel signal of the adjacent pixel is generated; relational information regarding a color component between a plurality of pixels and the target pixel is generated, based on the first correlation information and the second correlation information; and it is determined whether degradation in picture quality occurs at the target pixel or in a predetermined region including the target pixel, based on the relational information regarding the color component.

Accordingly, in any of the above, when a composite signal is converted into a component signal, a classification-adaptation process is performed with a part in which degradation in picture quality occurs identified in advance, serving to alleviate degradation in picture quality.

BRIEF DESCRIPTION OF THE DRAWINGS

FIGS. 16A to 16C are diagrams for explaining a characteristic of an image in which degradation in picture quality occurs;

FIG. 18 is a diagram for explaining a characteristic of an image in which degradation in picture quality occurs;

FIG. 19 is a diagram for explaining a characteristic of an image in which degradation in picture quality occurs;

FIG. 20 is a diagram for explaining a characteristic of an image in which degradation in picture quality occurs;

FIG. 22 is a diagram for explaining a characteristic of an image in which degradation in picture quality occurs;

FIG. 23 is a diagram for explaining a characteristic of an image in which degradation in picture quality occurs;

FIG. 24 is a diagram for explaining a characteristic of an image in which degradation in picture quality occurs;

Figure 26:
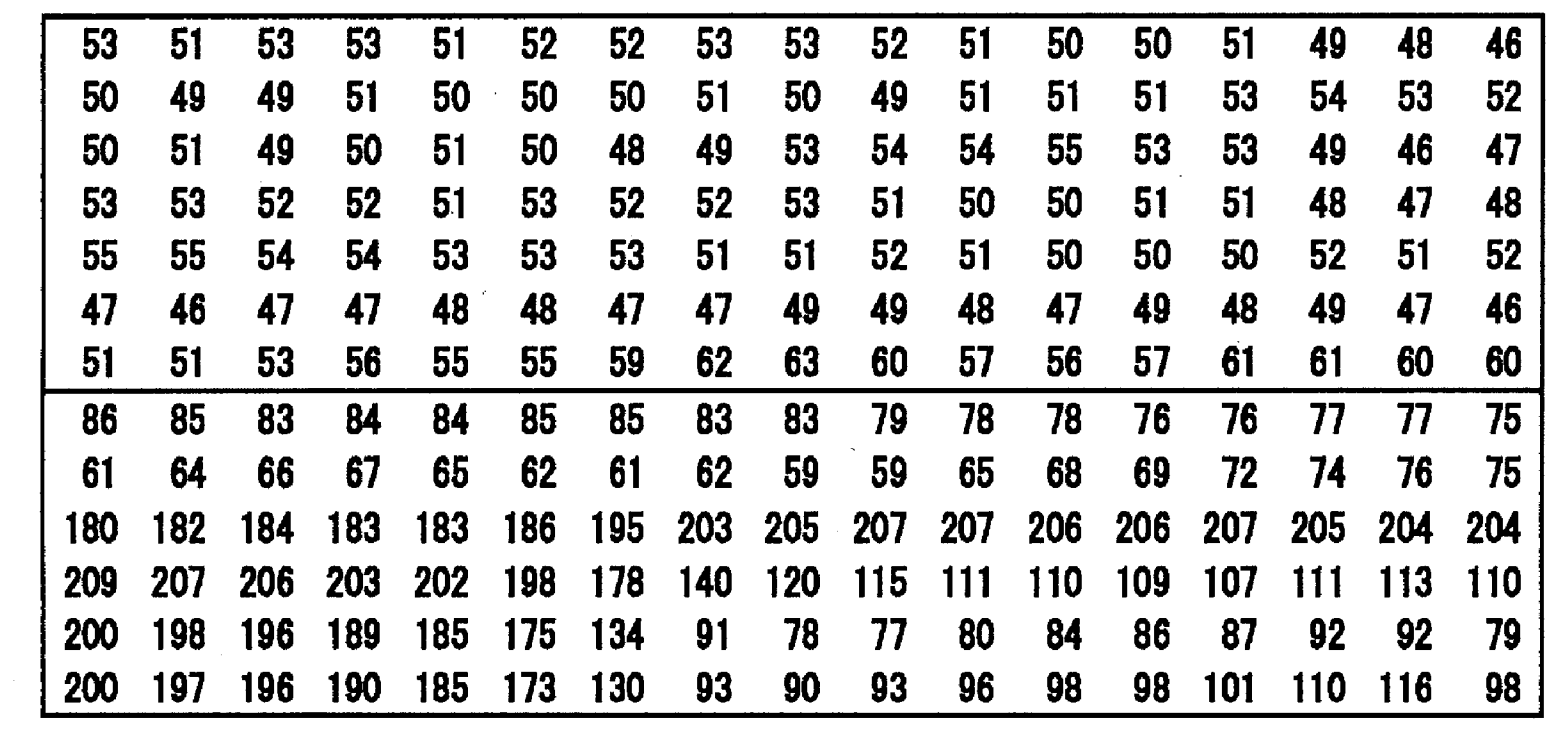

FIG. 26 is a diagram for explaining a characteristic of an image in which degradation in picture quality occurs;

FIG. 27 is a diagram for explaining a characteristic of an image in which degradation in picture quality occurs;

FIG. 28 is a diagram for explaining a characteristic of an image in which degradation in picture quality occurs;

FIGS. 29A to 29D are diagrams for explaining a pattern that is observed when degradation in picture quality occurs;

FIGS. 30A to 30D are diagrams for explaining a pattern that is observed when degradation in picture quality occurs;

FIGS. 31A to 31D are diagrams for explaining a pattern that is observed when degradation in picture quality occurs;

FIG. 33 is a flowchart for explaining a pattern detection process.

FIG. 40 is a diagram for explaining a band-pass filtering process;

FIG. 41 is a diagram for explaining a band-pass filtering process;

FIGS. 43A to 43C are diagrams showing an example of a pattern that is detected;

FIG. 45 is a flowchart for explaining a pattern detection process;

DESCRIPTION OF THE PREFERRED EMBODIMENTS

Figure 1:
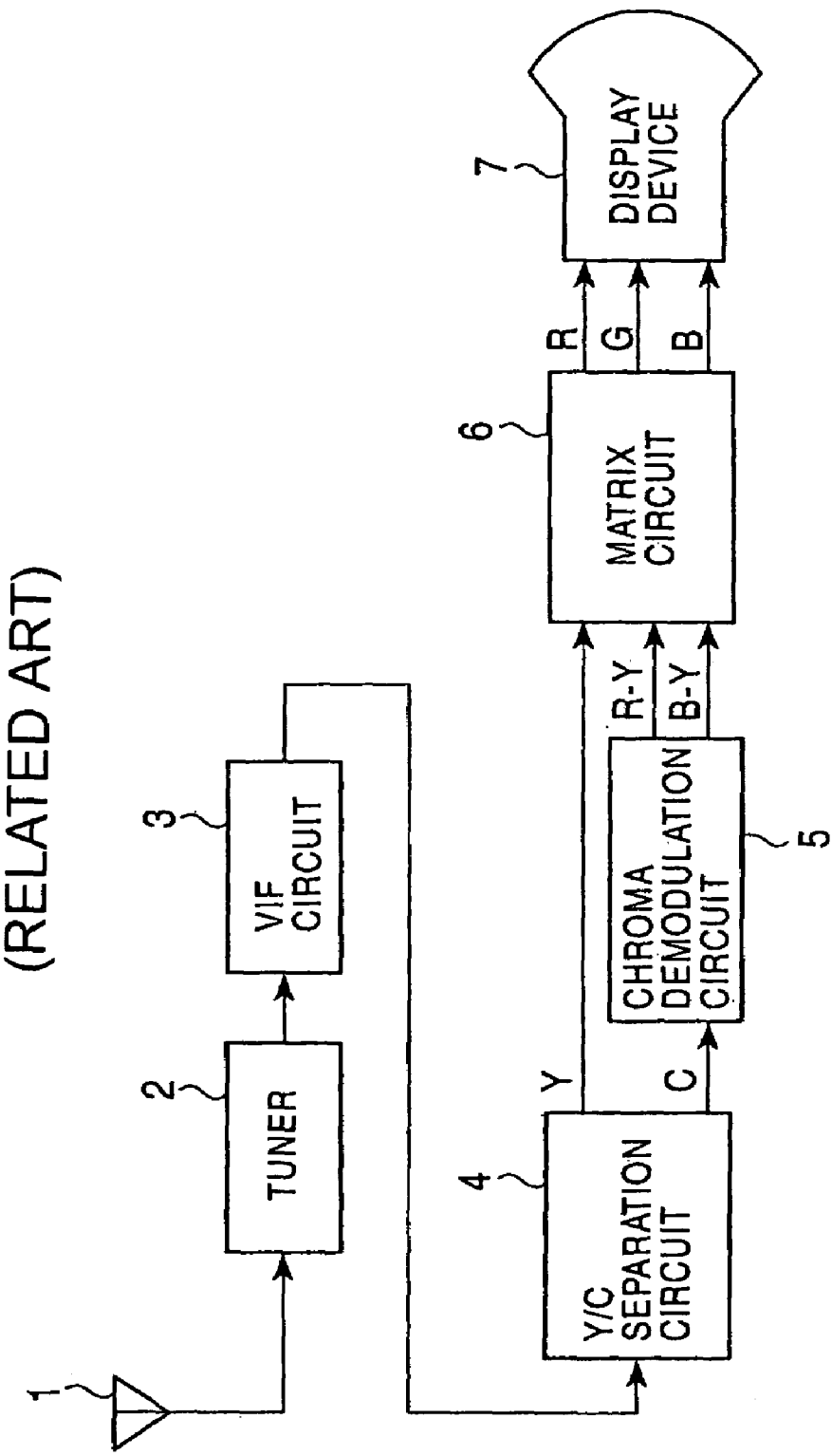
FIG. 1 is a block diagram showing an example configuration of a television receiver that is relevant to the present invention.
Figure 2:
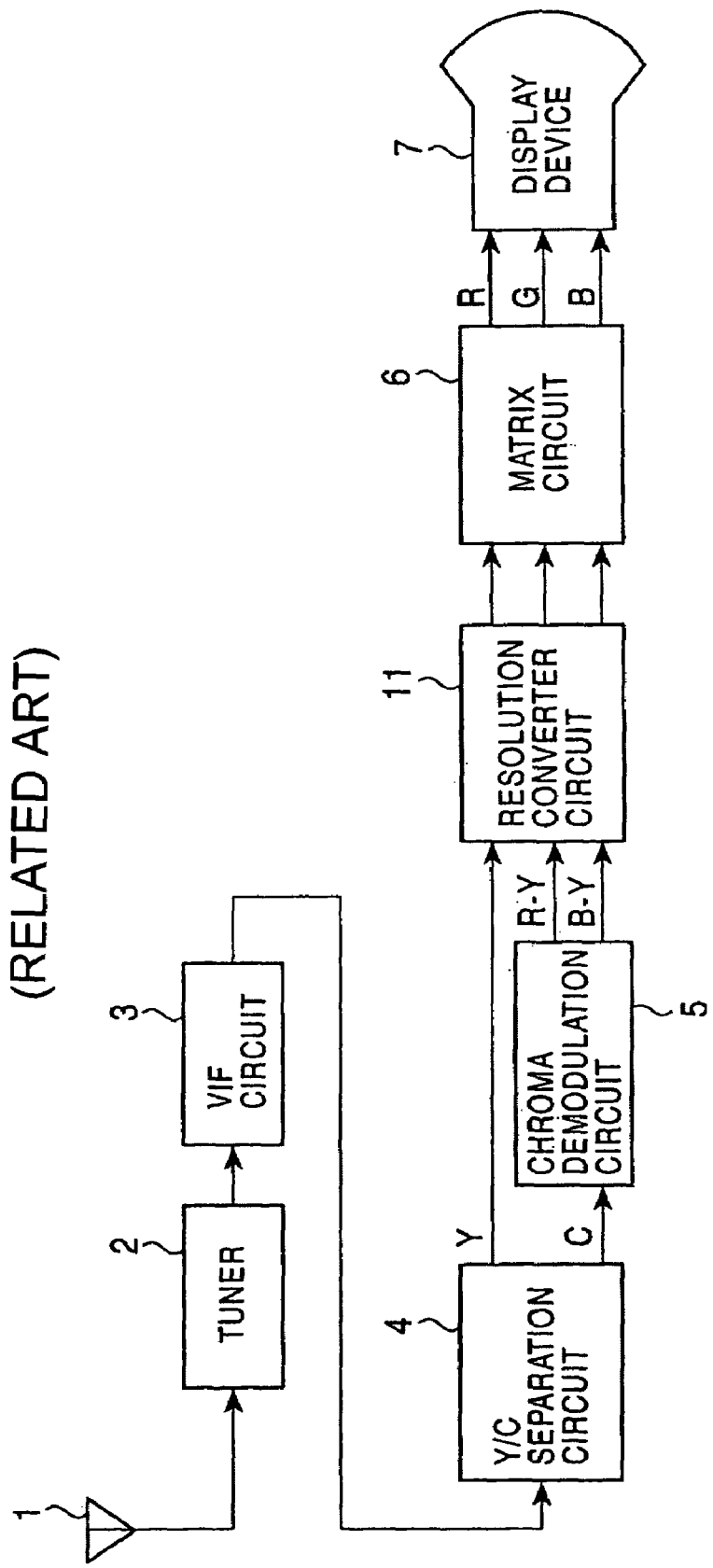
FIG. 2 is a block diagram showing an example configuration of a television receiver that is relevant to the present invention.
Figure 3:
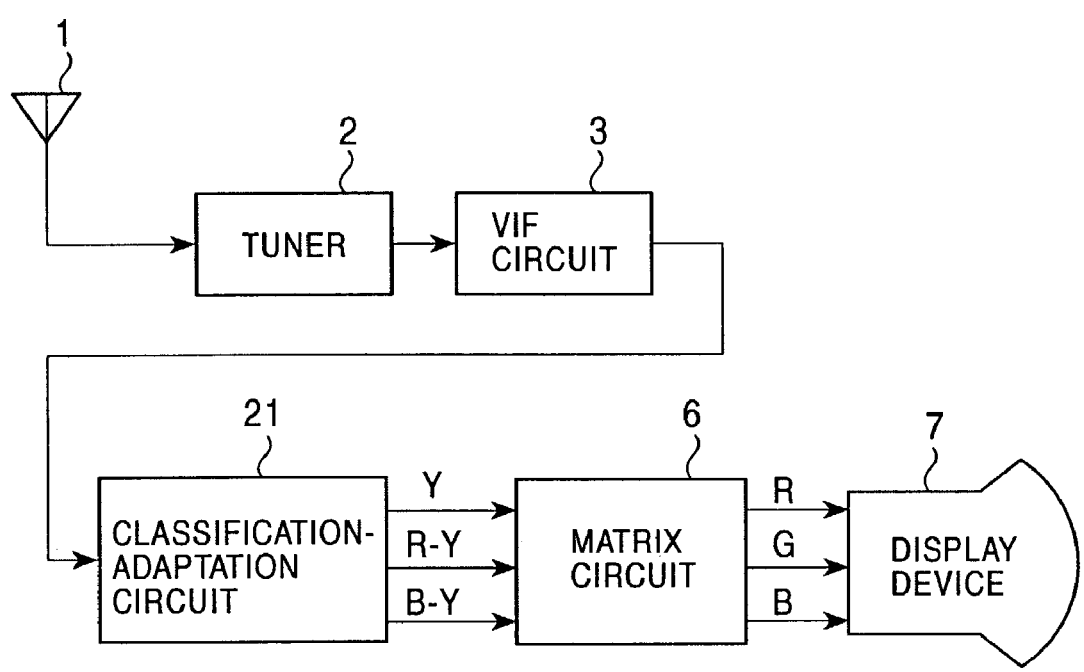
FIG. 3 is a block diagram showing the configuration of a television receiver according to an embodiment of the present invention.

FIG. 3 is a block diagram showing the configuration of a television receiver according to an embodiment of the present invention. In FIG. 3, parts corresponding to those shown in FIGS. 1 and 2 are denoted by the same numerals, and descriptions thereof will be omitted where appropriate.

Referring to FIG. 3, a classification-adaptation processing circuit 21 is disposed between a VIF circuit 3 and a matrix circuit 6. The classification-adaptation processing circuit 21, by classification and adaptation processes, directly generates a component signal including a luminance signal Y and color-difference signals R-Y and B-Y from an NTSC composite video signal input from the VIF circuit 3. Prediction coefficients for predictively generating a component signal from a composite video signal are generated by performing learning with a component signal as first training image data and with an NTSC signal formed by NTSC-modulating the component signal as second training image data. The first training image data and the second training image data have different picture qualities. For example, in this embodiment, the first training image data has a high picture quality whereas the second training image data has a low picture quality. The first training image data and the second training image data constitutes a training set. A component signal is generated by performing mapping (a predictive calculation process) using the prediction coefficients.

Figure 4:
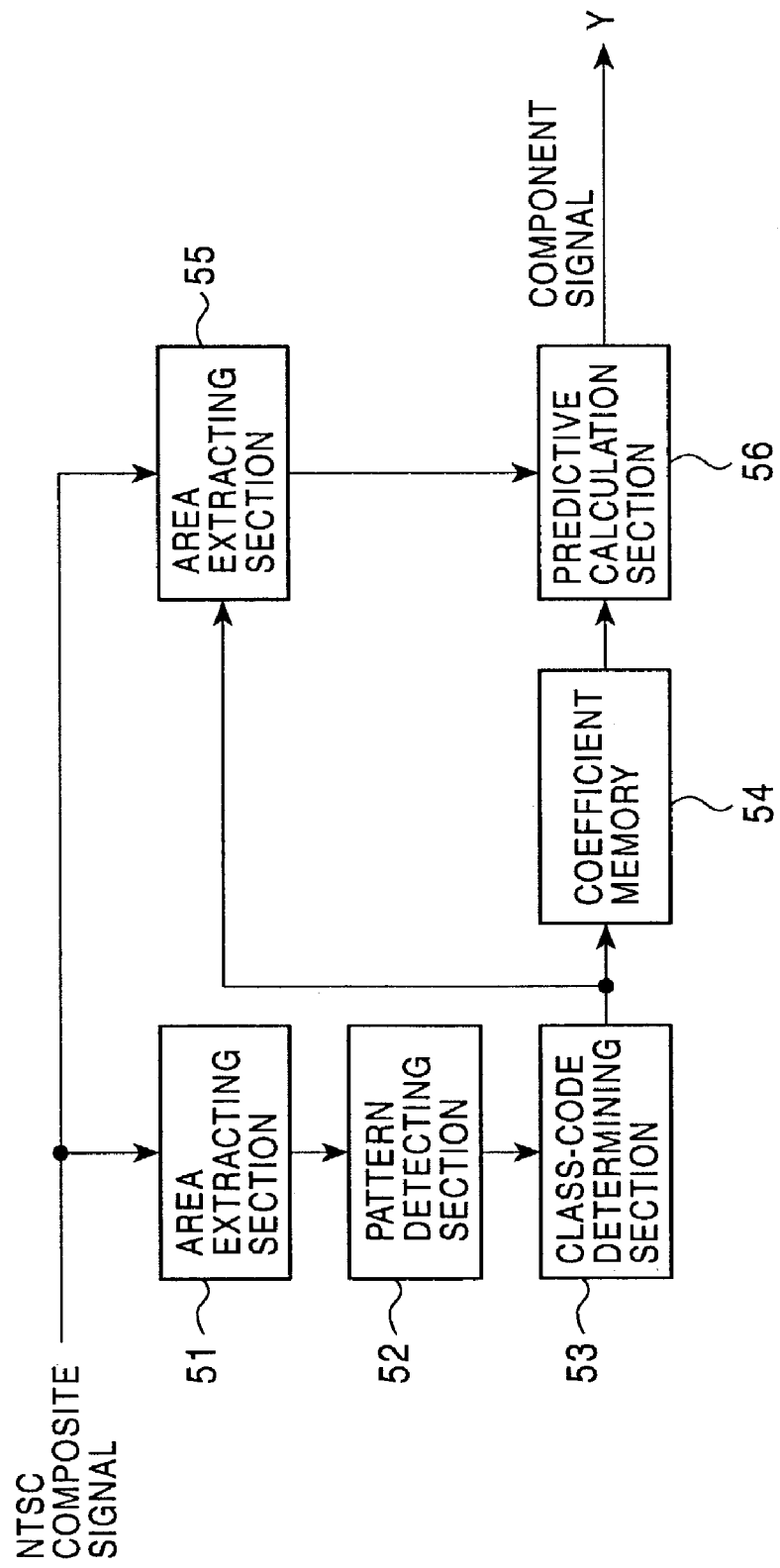
FIG. 4 is a block diagram showing an example configuration of a classification-adaptation circuit shown in FIG. 3.

FIG. 4 shows an example configuration of the classification-adaptation processing circuit 21. An NTSC composite video signal output from the VIF circuit 3 is fed to an area extracting section 51 and to an area extracting section 55. The area extracting section 51 extracts pixels required for classification, also referred to as class taps, including pixels that are used for calculation needed to detect a pattern, shown in FIGS. 6A and 6B, from the composite video signal input thereto, and outputs the class taps to a pattern detecting section 52. The pattern detecting section 52 detects a pattern of the composite video signal based on the class taps input thereto.

A class-code determining section 53 determines a class code based on the pattern detected by the pattern detecting section 52, and outputs the class code to a coefficient memory 54 and to the area extracting section 55. The coefficient memory 54 stores prediction coefficients for each class, obtained in advance by learning. The coefficient memory 54 reads prediction coefficients associated with the class code input from the class-code determining section 53, and outputs the prediction coefficients to a predictive calculation section 56. A process for learning prediction coefficients to be stored in the coefficient memory 54 will be described later with reference to a block diagram of a learning apparatus, shown in FIG. 8.

Figure 7:
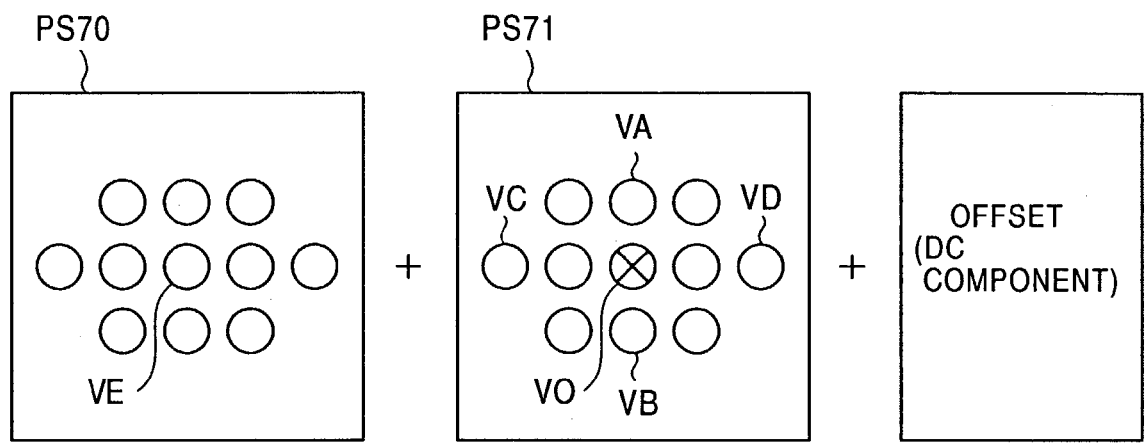
FIG. 7 is a diagram for explaining prediction taps.

The area extracting section 55, based on the class code input from the class-code determining section 53 extracts pixels required for predictively generating a component signal from the composite video signal input from the VIF circuit 3, i.e., prediction taps, shown in FIG. 7, and outputs the prediction taps to the predictive calculation section 56. The predictive calculation section 56 multiplies the prediction taps input from the area extracting section 55 by the prediction coefficients input from the coefficient memory 54, thereby generating a luminance signal Y, which constitutes a component signal.

More specifically, the coefficient memory 54 outputs prediction coefficients associated with the class code fed from the class-code determining section, to the predictive calculation section 56. The predictive calculation section 56 executes a sum-of-products operation according to equation (1) below using prediction taps extracted from the pixel values of pixels at predetermined positions of the NTSC composite video signal fed from the area extracting section 55 and the prediction coefficients fed from the coefficient memory 54, thereby calculating (predictively estimating) a component signal.

$$y = w1 \times x1 + w2 \times x2 + \ldots + wn \times xn \quad (1)$$

where y denotes the pixel value of a target pixel, x1 to xn denote the prediction taps, respectively, and w1 to wn denote the prediction coefficients, respectively.

Although not shown, circuits for generating color-difference signals R-Y and B-Y of the component signal are configured similarly. The configurations are similar to the configuration shown in FIG. 4; however, prediction coefficients for generating a color-difference signal R-Y or B-Y is stored, instead of prediction coefficients for generating a luminance signal Y in the-case shown in FIG. 4.

Figure 5:
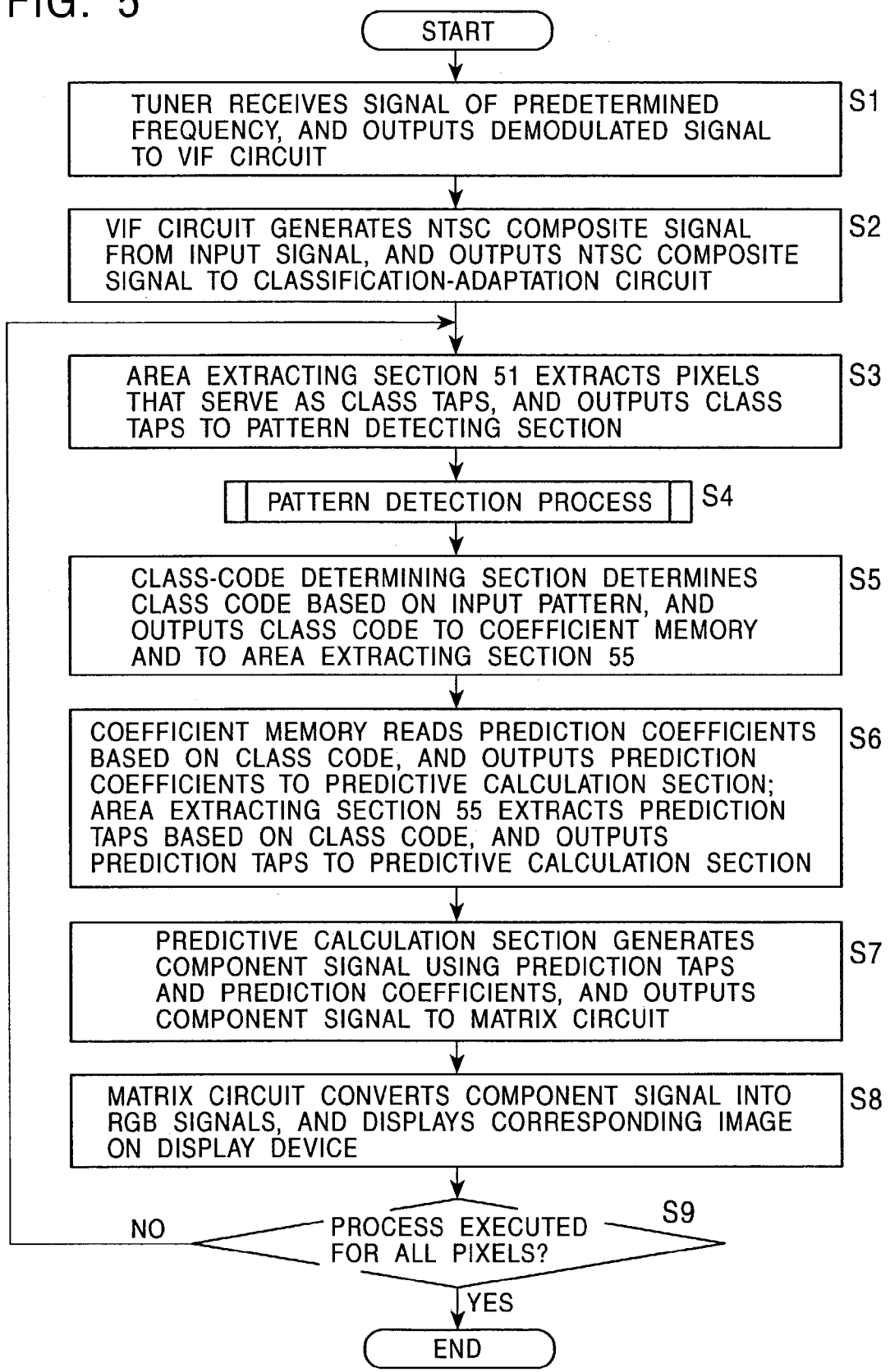
FIG. 5 is a flowchart for explaining a display process executed by the television receiver shown in FIG. 3.

Next, with reference to a flowchart shown in FIG. 5, a process for converting a composite video signal into a component signals and displaying a corresponding image on the display device 7, executed by the television receiver shown in FIG. 3, will be described.

In step S1, a tuner 2 receives a signal of a predetermined frequency via an antenna 1, demodulates the signal received, and outputs a resulting demodulated signal to the VIF circuit 3. In step S2, the VIF circuit 3 generates an NTSC composite signal from the signal input thereto, and outputs the NTSC composite signal to the classification-adaptation circuit 21.

In step S3, the area extracting section 51 of the classification-adaptation circuit 21 extracts pixels that serve as class taps, and information of pixels needed to detect a pattern, from the composite signal input thereto, and outputs these items to the pattern detecting section 52. For example, the class taps include six pixels in total, namely, five pixels VO, and VA to VD in a given field F61, shown in FIG. 6A, and a pixel VE in a field F60 that is one frame (two fields) before the field F61, corresponding to the target pixel VO, shown in FIG. 6B.

In step S4, the pattern detecting section 52, based on the class taps input thereto, executes a pattern detection process to detect a pattern for determining a class code, and outputs the pattern to the class-code determining section 53. The pattern detecting section 52 and the pattern detection process will be described later in detail.

In step S5, the class-code determining section 53 determines a class code based on the pattern detected by the pattern detecting section 52, and outputs the class code to the coefficient memory 54 and to the area extracting section 55.

In step S6, the coefficient memory 54, based on the class code input thereto, reads prediction coefficients that have been determined in advance by a learning process, and outputs the prediction coefficients to the predictive calculation section 56. The area extracting section 55, based on the class code input from the class-code determining section 53, extracts prediction taps from the composite signal, and outputs the prediction taps to the predictive calculation section 56. For example, the prediction taps include 23 values in total, namely, eleven pixels PS71 including the target pixel VO and pixels in the proximity thereof, eleven pixels PS70 in the previous frame, centered at the pixel VE, and a DC offset component, as shown in FIG. 7. Therefore, in that case, the coefficient memory 54 stores 23 coefficients for each class.

In step S7, the predictive calculation section 56 generates a component signal by a calculation using the prediction taps input from the area extracting section 55 and the prediction coefficients input from the coefficient memory 54, and outputs the component signal to the matrix circuit 6. In this example, the predictive calculation section 56 calculates the sum-of-products of the 23 prediction taps input from the area extracting section 55 and the 23 prediction coefficients input from the coefficient memory 54, thereby generating a luminance signal Y for the target pixel VO. In step S8, the matrix circuit 6 converts the component signal into RGB signals, and displays a corresponding image on the display device 7.

In step S9, it is determined whether the predictive calculation process has been executed for all the pixels. If it is determined that the predictive calculation has not been executed for all the pixels, the process returns to step S3. That is, steps S3 to S9 are repeated until the predictive calculation process is executed for all the pixels. If it is determined in step S9 that the predictive calculation process has been executed for all the pixels, the process is finished.

Since predictive calculation is performed using prediction taps associated with a class code as described above, predictive calculation is performed using optimal prediction taps for each pixel. Accordingly, degradation in picture quality that is caused by conversion of a composite signal into a component signal is alleviated.

Figure 6A:
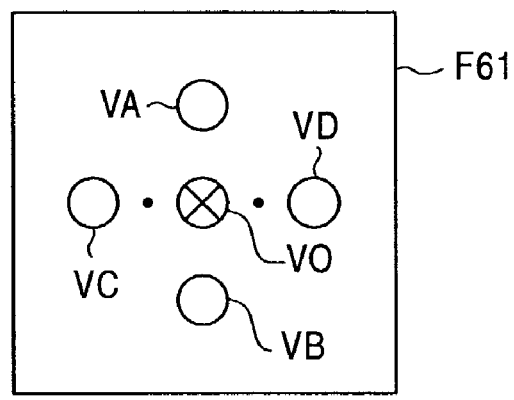
FIGS. 6A and 6B are diagrams for explaining class taps.
Figure 6B:
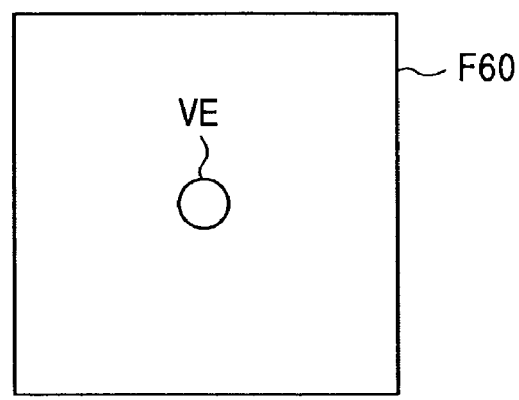

The class taps and prediction taps shown in FIGS. 6A, 6B, and 7 are examples used for convenience in describing the overall display process, and class taps and prediction taps actually used for implementing the present invention may differ therefrom.

Next, with reference to FIG. 8, a learning apparatus (prediction-coefficient calculating apparatus) for determining prediction coefficients to be stored in the coefficient memory 54 will be described.

The NTSC encoder 71 receives input of a component signal including a luminance signal Y and color-difference signals R-Y and B-Y, which serves as first training image data. The NTSC encoder 71 superposes an I signal and a Q signal calculated from the color-difference signals R-Y and B-Y on the luminance signal Y included in the component signal input thereto, thereby generating an NTSC composite video signal, which serves as second training image data. The NTSC encoder 71 outputs the NTSC composite video signal to an area extracting section 72 and to an area extracting section 75. The area extracting section 72 extracts class taps from the composite video signal input thereto, and outputs the class taps to a pattern detecting section 73. The pattern detecting section 73 detects a pattern of the class taps input thereto, and outputs the pattern to a class-code determining section 74. The class-code determining section 74 determines a class corresponding to the pattern input thereto, and outputs a corresponding class code to the area extracting section 75 and to a normal-equation generating section 76.

The area extracting section 75, based on the class code input from the class-code determining section 74, extracts prediction taps from the composite vide signal input from the NTSC encoder 71, and outputs the prediction taps to the normal-equation generating section 76. The area extracting section 72, the pattern detecting section 73, the class-code determining section 74, and the area extracting section 75 have substantially the same configurations and functions as the area extracting section 51, the pattern detecting section 52, the class-code determining section 53, and the area extracting section 55 of the classification-adaptation circuit 21 shown in FIG. 4.

The normal-equation generating section 76 generates normal equations on a class-by-class basis for every class code input from the class-code determining section 74, based on the prediction taps of the second training image data, input from the area extracting section 75, and based on the luminance signal Y in the component signal serving as first training image data. The normal-equation generating section 76 outputs the normal equations to a coefficient determining section 77. Upon receiving a sufficient number of normal equations from the normal-equation generating section 76, the coefficient determining section 77 solves the normal equations, for example, by the least-square method, to calculate the prediction coefficients w1 to wn described earlier, and transfers the prediction coefficients w1 to wn to a memory 78, where the prediction coefficients w1 to wn are stored.

Now, the normal equations will be described. In equation (1) given earlier, the prediction coefficients w1 to wn are not yet determined before learning. Learning is performed with an input of a plurality of first training image data for each class. Letting the number of the first training image data be denoted by m, equation (2) is derived from equation (1):

$$yk = w1 \times xk1 + w2 \times xk2 + \ldots + wn \times xkn \quad (2)$$

where k ranges from 1 to m. If m is greater than n, the prediction coefficients w1 to wn cannot be unambiguously determined. Thus, letting an element ek of an error vector e be defined by the following equation (3), prediction coefficients are determined such that the error vector e defined by equation (4) is minimized. That is, the prediction coefficients are unambiguously determined by, for example, the least square method.

$$ek = yk - (w1 \times xk1 + w2 \times xk2 + \ldots + wn \times xkn) \quad (3)$$

$$e^2 = \sum_{k=0}^{m} e_k^2 \quad (4)$$

A set of prediction coefficients wi that minimizes $e^2$ in equation (4) is calculated by partially differentiating $e^2$ with respect to the prediction coefficients wi (i=1, 2, ...) to derive equation (5) and assuming a partial differentiation value of 0 for each value of i.

$$\frac{\partial e^2}{\partial W_i} = \sum_{k=0}^{m} 2\left(\frac{\partial e_k}{\partial w_i}\right) e_k = \sum_{k=0}^{m} 2x_{kj} \cdot e_k \quad (5)$$

Now, a specific procedure for determining the prediction coefficients wi from equation (5) will be described. Letting Xji and Yi be defined as expressed by equations (6) and (7), equation (5) is rearranged into a matrix expressed by equation (8):

$$X_{ji} = \sum_{p=0}^{m} x_{\pi} \cdot x_{pj} \quad (6)$$

$$Y_i = \sum_{k=0} x_{ki} \cdot y_k \quad (7)$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \quad (8)$$

Equation (8) is generally called normal equations, in which Xji (j, i=1, 2 ... n) and Yi (i=1, 2 ... n) are calculated based on the first training image data and the second training image data. That is, the normal-equation generating section 76 calculates values of Xji and Yi to determine equation (8) composed of normal equations. Then, the coefficient determining section 77 solves equation (8) to determine the prediction coefficients wi.

Now, a process in which the learning apparatus shown in FIG. 8 learns prediction coefficients will be described with reference to a flowchart shown in FIG. 9.

In step S21, a component signal that serves as first training image data is input to the NTSC encoder 71 and to the normal-equation generating section 76. In step S22, the NTSC encoder 71 generates second training image data composed of an NTSC composite signal from the component signal input thereto, and outputs the second training image data to the area extracting sections 72 and 75. In step S23, the area extracting section 72 extracts pixels that serve as class taps of the second training image data, and outputs the class taps to the pattern detecting section 73.

In step S24, the pattern detecting section 73 executes a pattern detection process to detect a pattern that is used to determine a class code from the class taps, and outputs the pattern to the class-code determining section 74. The pattern detection process executed by the pattern detecting section 73 is the same as that executed by the pattern detecting section 52 described earlier, and will be described later in more detail.

In step S25, the class-code determining section 74 determines a class code based on the pattern detected by the pattern detecting section 73, and outputs the class code to the area extracting section 75 and to the normal-equation generating section 76.

In step S26, the area extracting section 75 extracts prediction taps of the second training image data based on the class code input from the class-code determining section 74, and outputs the prediction taps to the normal-equation generating section 76.

In step S27, the normal-equation generating section 76 generates the normal equations expressed by equation (8), given earlier, based on the class code input from the class-code determining section 74, the prediction taps input from the area extracting section 75, and the component signal input as the first training image data, and outputs the normal equations, together with the class code input from the class-code determining section 74, to the coefficient determining section 77.

In step S28, the coefficient determining section 77 solves the normal equations expressed by equation (8), given earlier, to determine prediction coefficients, and stores the prediction coefficients in association with the class code in the memory 78.

In step S29, it is determined whether the process has been executed for all the pixels. If it is determined that the process has not been executed for all the pixels, the process returns to step S23. That is, steps S23 to S29 are repeated until the process is executed for all the pixels. If it is determined in step S29 that the process has been executed for all the pixels, the process is finished.

As described above, prediction coefficients are calculated using prediction taps associated with a class code. Thus, prediction coefficients are determined using optimal prediction taps for each pixel. Accordingly, degradation in picture quality that is caused by conversion of a composite signal into a component signal is alleviated.

Figure 10:
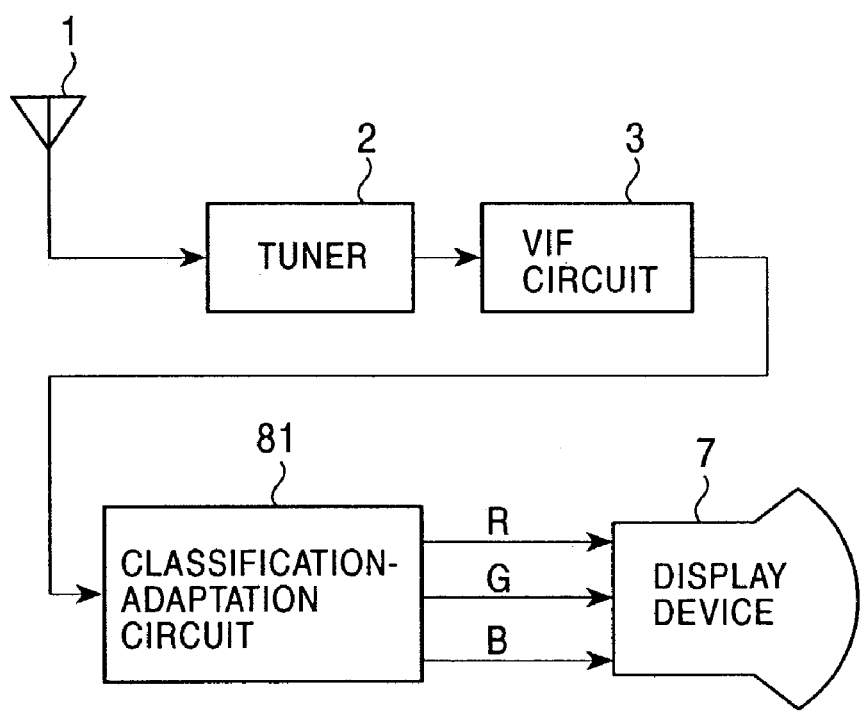
FIG. 10 is a block diagram showing the configuration of a television receiver according to a modification of the embodiment of the present invention.

In the example described above, a component video signal is generated from a composite video signal. For example, as shown in FIG. 10, the classification-adaptation circuit 21 and the matrix circuit 6 may be integrated to form a classification-adaptation circuit 81 so that RGB primary-color signals will be directly generated from a composite video signal output from the VIF circuit 3. The configuration of the classification-adaptation circuit 81 is similar to that of the classification-adaptation circuit 21; however, although the second training image data used in the learning process for determining prediction coefficients to be stored in the coefficient memory 54 is a composite signal, the first training image data is composed of RGB primary-color signals and prediction coefficients that are determined relate to RGB signals.

Next, with reference to FIG. 11, the configuration of the pattern detecting section 52 shown in FIG. 4 will be described in detail. The configuration of the pattern detecting section 73 in the learning apparatus described with reference to FIG. 8 is the same as that of the pattern detecting section 52.

A target-pixel selecting section 91 selects a target pixel to be processed from among the pixels serving as class taps, input from the area extracting section 51. The. target-pixel selecting section 91 outputs a pixel value of the target pixel to an upper-pixel deriving section 94, a lower-pixel deriving section 95, and magnitude comparing sections 100 and 101 associated therewith.

A left-adjacent-pixel selecting section 92 selects a pixel that is left-adjacent to the target pixel from among the pixels serving as class taps, input from the area extracting section 51. The left-adjacent-pixel selecting section 92 outputs a pixel value of the left-adjacent pixel to an upper-pixel deriving section 96, a lower-pixel deriving section 97, and magnitude comparing sections 102 and 103 associated therewith.

A right-adjacent-pixel selecting section 93 selects a pixel that is right-adjacent to the target pixel from among the pixels serving as class taps, input from the area extracting section 51. The right-adjacent-pixel selecting section 93 outputs a pixel value of the right-adjacent pixel to an upper-pixel deriving section 98, a lower-pixel deriving section 99, and magnitude comparing sections 104 and 105 associated therewith.

Figure 12:
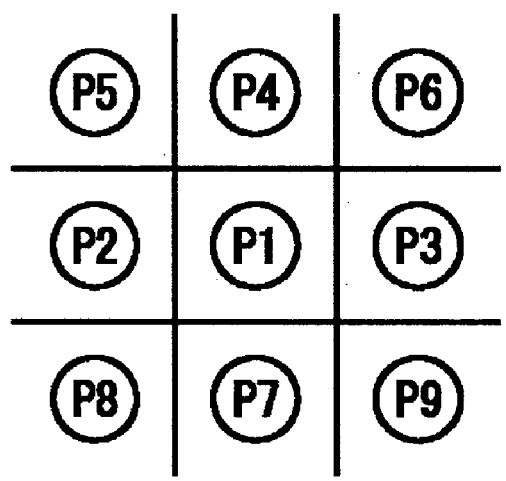
FIG. 12 is a diagram for explaining a process executed by magnitude comparing sections.

The upper-pixel deriving section 94 associated with the target-pixel selecting section 91 derives a pixel value of a virtual pixel at an upper position with respect to the target pixel from the pixel values of the pixels serving as class taps, input from the area extracting section 51, and the pixel value of the target pixel, input from the target-pixel selecting section 91, and outputs the pixel value derived to the magnitude comparing section 100. More specifically, assuming that the target pixel is a pixel P1 shown in FIG. 12, the upper-pixel deriving section 94 derives a pixel value of a pixel P4 that is located above the target pixel P1 and that is in the same field as and in phase with the target pixel P1, and outputs the pixel value derived to the magnitude comparing section 100. The method of deriving the pixel value will be described later in more detail.

The lower-pixel deriving section 95 associated with the target-pixel selecting section 91 derives a pixel value of a virtual pixel at a lower position with respect to the target pixel from the pixel values of the pixels serving as class taps, input from the area extracting section 51, and the pixel value of the target pixel, input from the target-pixel selecting section 91, and outputs the pixel value derived to the magnitude comparing section 101. More specifically, assuming that the target pixel is the pixel P1 shown in FIG. 12, the lower-pixel deriving section 95 derives a pixel value of a pixel P7 that is located below the target pixel P1 and that is in the same field as and in phase with the target pixel P1, and outputs the pixel value derived to the magnitude comparing section 101.

The upper-pixel deriving section 96 associated with the left-adjacent-pixel selecting section 92 derives a pixel value of a virtual pixel at an upper position with respect to the pixel that is left-adjacent to the target pixel from the pixel values of the pixels serving as class taps, input from the area extracting section 51, and the pixel value of the left-adjacent pixel, input from the left-adjacent-pixel selecting section 92, and outputs the pixel value derived to the magnitude comparing section 102. More specifically, assuming that the left-adjacent pixel is a pixel P2 shown-in FIG. 12, the upper-pixel deriving section 96 derives a pixel value of a pixel P5 that is located above the left-adjacent pixel P2 and that is in the same field as and in phase with the left-adjacent pixel P2, and outputs the pixel value derived to the magnitude comparing section 102.

The lower-pixel deriving section 97 associated with the left-adjacent-pixel selecting section 92 derives a pixel value of a virtual pixel at a lower position with respect to the left-adjacent pixel from the pixel values of the pixels serving as class taps, input from the area extracting section 51, and the pixel value of the left-adjacent pixel, input from the left-adjacent-pixel selecting section 92, and outputs the pixel value derived to the magnitude comparing section 103. More specifically, assuming that the left-adjacent pixel is the pixel P2 shown in FIG. 12, the lower-pixel deriving section 97 derives a pixel value of a pixel P8 that is located below the left-adjacent pixel P2 and that is in the same field as and in phase with the left-adjacent pixel P2, and outputs the pixel value derived to the magnitude comparing section 103.

The upper-pixel deriving section 98 associated with the right-adjacent-pixel selecting section 93 derives a pixel value of a virtual pixel at an upper position with respect to the pixel that is right-adjacent to the target pixel from the pixel values of the pixels serving as class taps, input from the area extracting section 51, and the pixel value of the right-adjacent pixel, input from the right-adjacent-pixel selecting section 93, and outputs the pixel value derived to the magnitude comparing section 104. More specifically, assuming that the right-adjacent pixel is a pixel P3 shown in FIG. 12, the upper-pixel deriving section 98 derives a pixel value of a pixel P6 that is located above the right-adjacent pixel P3 and that is in the same field as and in phase with the right-adjacent pixel P3, and outputs the pixel value derived to the magnitude comparing section 104.

The lower-pixel deriving section 99 associated with the right-adjacent-pixel selecting section 93 derives a pixel value of a virtual pixel at a lower position with respect to the right-adjacent pixel from the pixel values of the pixels serving as class taps, input from the area extracting section 51, and the pixel value of the right-adjacent pixel, input from the right-adjacent-pixel selecting section 93, and outputs the pixel value derived to the magnitude comparing section 105. More specifically, assuming that the right-adjacent pixel is the pixel P3 shown in FIG. 12, the lower-pixel deriving section 99 derives a pixel value of a pixel P9 that is located below the right-adjacent pixel P3 and that is in the same field as and in phase with the right-adjacent pixel P3, and outputs the pixel value derived to the magnitude comparing section 105.

The magnitude comparing section 100 calculates the absolute value of the difference between the pixel value of the target pixel and the pixel value of the upper pixel with respect to the target pixel, input from the target-pixel selecting section 91 and the upper-pixel deriving section 94 associated therewith, respectively. If the absolute value of the difference is greater than or equal to a predetermined threshold value, the magnitude comparing section 100 outputs a "1" to the pattern outputting section 106. On the other hand, if the absolute value of the difference is smaller than the predetermined threshold value, the magnitude comparing section 100 outputs a "0" to the pattern-outputting section 106. It is experimentally known that the threshold value is preferably on the order of five, but the threshold value may be other values. The same applies to threshold values used in the magnitude comparing sections 101 to 105.

The magnitude comparing section 101 calculates the absolute value of the difference between the pixel value of the target pixel and the pixel value of the lower pixel with respect to the target pixel, input from the target-pixel selecting section 91 and the lower-pixel deriving section 95 associated therewith, respectively. If the absolute value of the difference is greater than or equal to a predetermined threshold value, the magnitude comparing section 101 outputs a "1" to the pattern outputting section 106. On the other hand, if the absolute value of the difference is smaller than the predetermined threshold value, the magnitude comparing section 101 outputs a "0" to the pattern outputting section 106.

The magnitude comparing section 102 calculates the absolute value of the difference between the pixel value of the pixel that is left-adjacent to the target pixel and the pixel value of the upper pixel with respect to the left-adjacent pixel, input from the left-adjacent-pixel selecting section 92 and the upper-pixel deriving section 96 associated therewith, respectively. If the absolute value of the difference is greater than or equal to a predetermined threshold value, the magnitude comparing section 102 outputs a "1" to the pattern outputting section 106. On the other hand, if the absolute value of the difference is smaller than the predetermined threshold value, the magnitude comparing section 102 outputs a "0" to the pattern outputting section 106.

The magnitude comparing section 103 calculates the absolute value of the difference between the pixel value of the pixel that is left-adjacent to the target pixel and the pixel value of the lower pixel with respect to the left-adjacent pixel, input from the left-adjacent-pixel selecting section 92 and the lower-pixel deriving section 97 associated therewith, respectively. If the absolute value of the difference is greater than or equal to a predetermined threshold value, the magnitude comparing section 103 outputs a "1" to the pattern outputting section 106. On the other hand, if the absolute value of the difference is smaller than the predetermined threshold value, the magnitude comparing section 103 outputs a "0" to the pattern outputting section 106.

The magnitude comparing section 104 calculates the absolute value of the difference between the pixel value of the pixel that is right-adjacent to the target pixel and the pixel value of the upper pixel with respect to the right-adjacent pixel, input from the right-adjacent-pixel selecting section 93 and the upper-pixel deriving section 98 associated therewith, respectively. If the absolute value of the difference is greater than or equal to a predetermined threshold value, the magnitude comparing section 104 outputs a "1" to the pattern outputting section 106. On the other hand, if the absolute value of the difference is smaller than the predetermined threshold value, the magnitude comparing section 104 outputs a "0" to the pattern outputting section 106.

The magnitude comparing section 105 calculates the absolute value of the difference between the pixel value of the pixel that is right-adjacent to the target pixel and the pixel value of the lower pixel with respect to the right-adjacent pixel, input from the right-adjacent-pixel selecting section 93 and the lower-pixel deriving section 99 associated therewith, respectively. If the absolute value of the difference is greater than or equal to a predetermined threshold value, the magnitude comparing section 105 outputs a "1" to the pattern outputting section 106. On the other hand, if the absolute value of the difference is smaller than the predetermined threshold value, the magnitude comparing section 105 outputs a "0" to the pattern outputting section 106.

The "1"s and "0"s output from the magnitude comparing sections 100 to 105 may be used to represent magnitude relationships opposite to those in the example described above.

The pattern outputting section 106 forms a pattern from the binary information input from the magnitude comparing sections 100 to 105, and outputs the pattern to the pattern detecting section 52. That is, a "1" is output if the absolute value of the difference between pixel values in each of the magnitude comparing sections 100 to 105 is larger than the threshold value whereas a "0" is output if the absolute value of the difference is smaller than the threshold value. In the example shown in FIG. 12, with the target pixel P1 at the center, 6-bit pattern information representing comparison results with regard to the left-adjacent pixel P2 and the upper pixel P5 with respect thereto, the left-adjacent pixel P2 and the lower pixel P8 with respect thereto, the target pixel P1 and the upper pixel P4 with respect thereto, the target pixel P1 and the lower pixel P7 with respect thereto, the right-adjacent pixel P3 and the upper pixel P6 with respect thereto, and the right-adjacent pixel P3 and the lower pixel P9 with respect thereto, respectively, is output.

The pattern of class taps detected by the pattern detecting section 52 as described above indicates magnitude relationships of pixel values between the three pixels horizontally aligned with the target pixel at the center and their respectively associated pixels in the vertical direction. In this embodiment, the pattern detecting section 52 forms a pattern representing magnitude relationships of pixel values of pixels in the vertical direction, which is in accordance with probability of occurrence of degradation in picture quality that is caused by conversion of a composite signal into a component signal. Prediction coefficients are prepared for each pattern. Accordingly, conversion of a composite signal into a component signal by a classification-adaptation process is allowed while suppressing degradation in picture quality, which has been likely to occur where color changes in the vertical direction.

The above operation is based on the following characteristics of degradation in picture quality. It has been empirically verified that degradation in picture quality occurs where color changes in the vertical direction, for example, when a component signal is converted into a composite signal for transmission of a broadcasting signal and the composite signal is converted back into a component signal upon reception. Examples of prominent degradation in picture quality include a case where color changes in the vertical direction from red in an upper region to yellow in a lower region, as shown in FIG. 13A, and a case where color changes in the vertical direction from brown in an upper region to blue in a lower region, as shown in FIG. 13B, where V denotes the vertical direction and H denotes the horizontal direction in both cases.

Figure 13A:
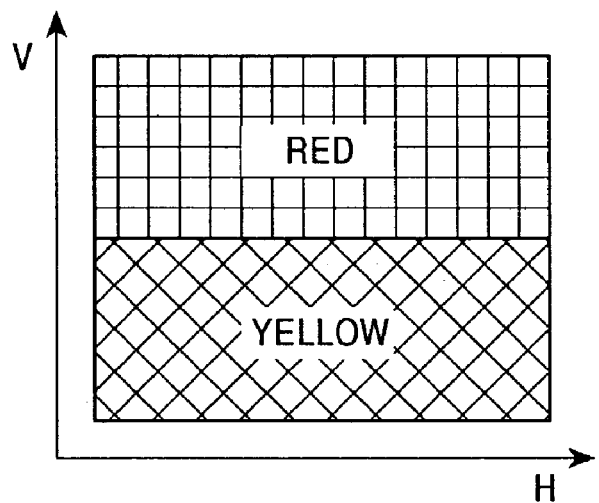
FIGS. 13A and 13B are diagrams for explaining a characteristic of an image in which degradation in picture quality occurs.
Figure 13B:
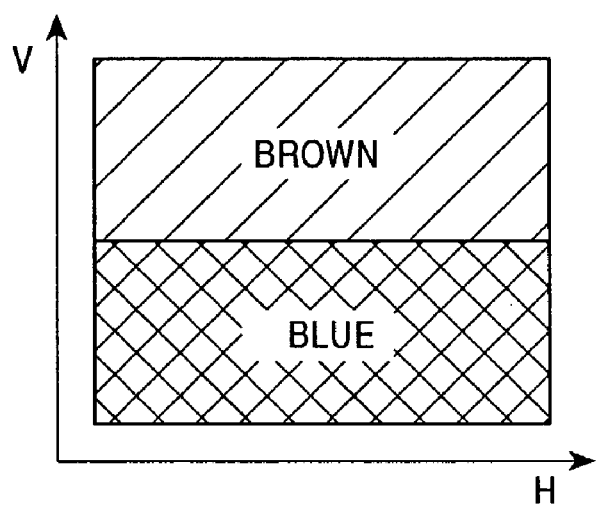
Figure 14A:
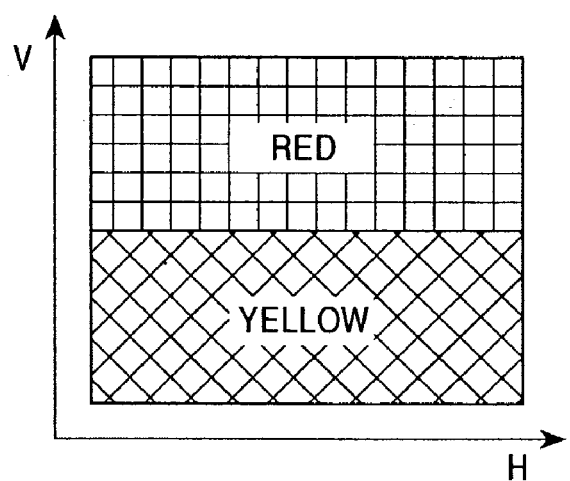
FIGS. 14A and 14B are diagrams for explaining a characteristic of an image in which degradation in picture quality occurs.
Figure 14B:
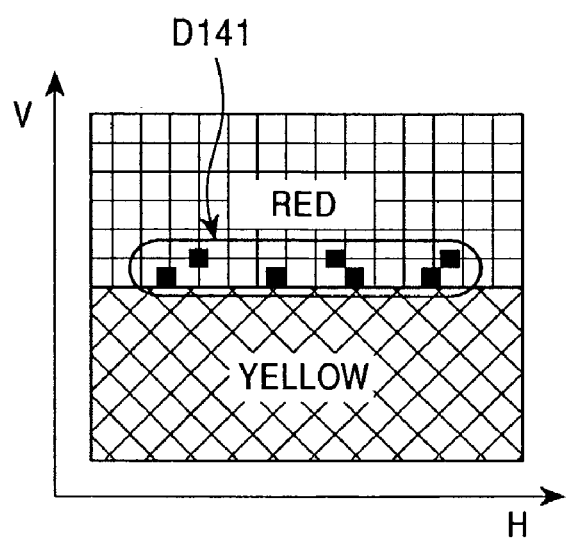

For example, when a component signal in which color changes in the vertical direction from red in an upper region to yellow in a lower region as shown in FIG. 14A, where V denotes the vertical direction and H denotes the horizontal direction similarly to FIG. 13A, is converted into a composite signal and the composite signal is converted back into a component signal, a part D141 in which picture quality is degraded due to dot interference, etc. becomes prominent in the proximity of the border, as shown in FIG. 14B.

By examining the part in which picture quality is degraded, it was verified that a characteristic phenomenon is observed in a case where color changes in the vertical direction.

For example, if a luminance signal Y of an original image (first training image data) in which degradation in picture quality occurs is red in an upper region and yellow in a lower region, the pixel values thereof are, from the top left, 99, 92, 91, 88, 87, and 88 for red pixels, and 106, 107, 108, 150, 154, and 156 for yellow pixels.

Figure 15C:
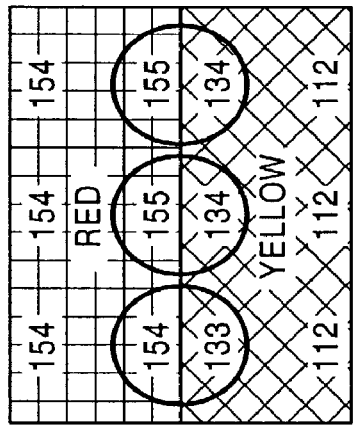
FIGS. 15A to 15C are diagrams for explaining a characteristic of an image in which degradation in picture quality occurs.
Figure 15B:
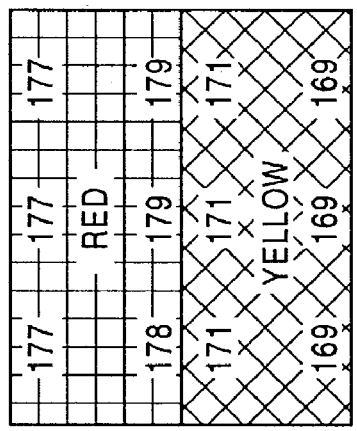
Figure 15A:
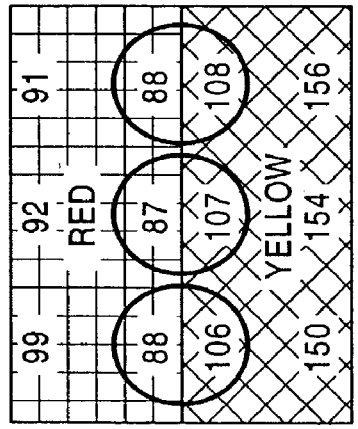
Figure 17:
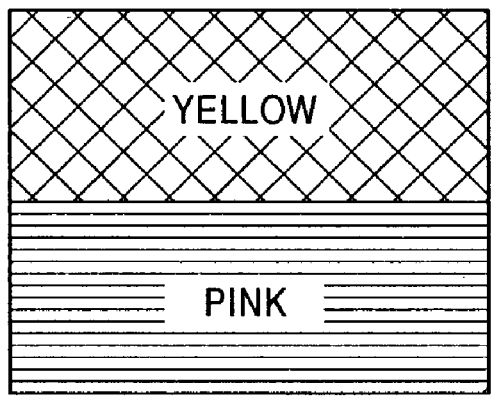
FIG. 17 is a diagram for explaining a characteristic of an image in which degradation in picture quality occurs.
Figure 21:
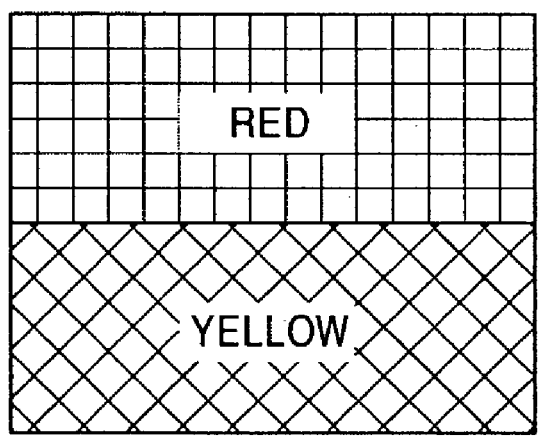
FIG. 21 is a diagram for explaining a characteristic of an image in which degradation in picture quality occurs.
Figure 25:
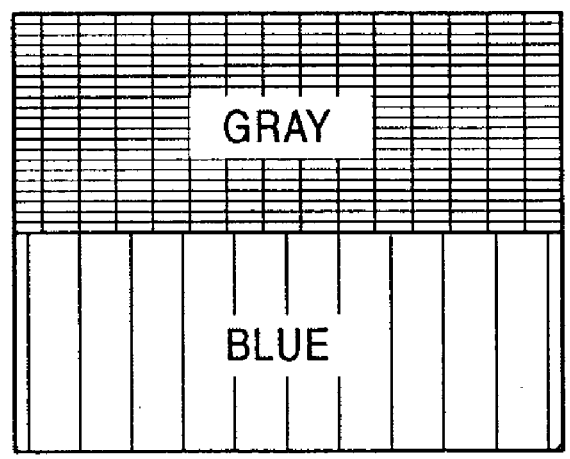
FIG. 25 is a diagram for explaining a characteristic of an image in which degradation in picture quality occurs.

In that case, the Q signal and the I signal of the original image is as shown in FIGS. 15B and 15C. More specifically, as shown in FIG. 15B, from the Q signal of the original image, the pixel values are, from the top left to the right as viewed in the figure, 177, 177, 177, 178, 179, and 179 for red pixels, and 171, 171, 171, 169, 169, and 169 for yellow pixels. With respect to the border, (red pixel value, yellow pixel value)=(178, 171), (179, 171), and (179, 171), and the absolute values of the differences are 7 (=|178−171|), 8 (=|179−171|), and 8 (=|179−171|). Assuming that each pixel value is represented by 0 to 255, and assuming that a change occurs between pixels if the absolute value of the difference between the pixel values of the pixels is greater than or equal to a predetermined threshold value for example, ten, the threshold value is not exceeded in the above example.

Furthermore, as shown in FIG. 15C, from the I signals of the original image, the pixel values are, from the top left to the right as viewed in the figure, 154, 154, 154, 154, 155, and 155 for red pixels, and 133, 134, 134, 112, 112, and 112 for yellow pixels. With respect to the border, (red pixel value, yellow pixel value)=(154, 113), (155, 134), and (155, 134), and the absolute values of the differences are 21 (=|154−133|), 21 (=|155−134|), and 21 (=|155−134|), which are greater than the threshold value.

Furthermore, as shown in FIG. 16A, if a Y signal of an original image (first training image data) in which degradation of picture quality occurs is brown in an upper region and blue in a lower region, the pixel values are, for example, from the top left to the right, 91, 97, 105, 89, 89, and 92 for brown pixels, and 18, 16, 17, 28, 28, and 28 for blue pixels.

The Q signal and the I signal of the original image area as shown in FIGS. 16B and 16C. More specifically, as shown in FIG. 16B, from the Q signal of the original image, the pixel values are, from top left to the right as viewed in the figure, 165, 167, 169, 149, 147, and 145 for brown pixels, and 112, 111, 110, 115, 115, and 115 for blue pixels. With respect to the border, (brown pixel value, blue pixel value) =(149, 112), (147, 111), and (145, 110), and the absolute values of the differences are 37 (=|149−112|), 36 (=|147−111|), and 35 (=|145−111|), which are greater than the threshold value.

Furthermore, as shown in FIG. 16C, from the I signal of the original image, the pixel values are, from the top left to the right as viewed in the figure, 129, 129, 130, 136, 137, and 138 for brown pixels, and 144, 145, 145, 144, 144, and 144 for blue pixels. With respect to the border, (brown pixel value, blue pixel value)=(136, 144), (137, 145), and (138, 145), and the absolute values of the differences are 8 (=|144−136|), 8 (=|145−137|), and 7 (=|145−138|) which are smaller than the threshold value.

If change is color that causes degradation in picture quality occurs in the vertical direction, as shown in FIGS. 15A to 15C and FIGS. 16A to 16C, it is observed that change between the pixel values of pixels occurs (the absolute value of the difference becomes large) in the proximity of a border of the I signal or the Q signal.

FIGS. 17 to 28 show other examples of degradation in picture quality that occurs where color changes in the vertical direction. It has been verified that, as shown in FIGS. 17 to 28, in an image in which color changes in the vertical direction, which suffers degradation in picture quality, either the pixel values of the I signal change in the vertical direction and the pixel values of the Q signal do not change in the vertical direction, or the pixel value of the I signal do not change in the vertical direction and the pixel values of the Q signal change in the vertical direction, irrespective of change at the border of the luminance signal Y.

Thus, as described earlier, a video signal in which either the pixel values of the I signal change in the vertical direction and the pixel values of the Q signal do not change in the vertical direction or the pixel values of the I signal do not change in the vertical direction and the pixel values of the Q signal change in the vertical direction has a possibility of picture degradation in the proximity of the border.

The condition for occurrence of degradation in picture quality at a pixel due to characteristics of pixels in the proximity of a border where color changes in the vertical direction is as shown in FIGS. 29A to 32 D when represented by patterns generated by the pattern detecting section 52 (or 73). FIGS. 29A and 29B to FIGS. 32A and 32B represent relationship of the absolute values of the differences between the pixel values of the I signal and the Q signal of the target pixel of the original image and their respectively associated upper and lower pixels. In the figures, "B" denotes a target pixel of the original image, "A" denotes an upper pixel with respect to the target pixel in the original image, and "C" denotes a lower pixel with respect to the target pixel in the original image. "L" and "S" in the figures denote the magnitude of the difference between the pixel values of pixels, i.e., presence or absence of change (whether the absolute value of the difference is greater than or equal to the threshold value).

Figure 32D:
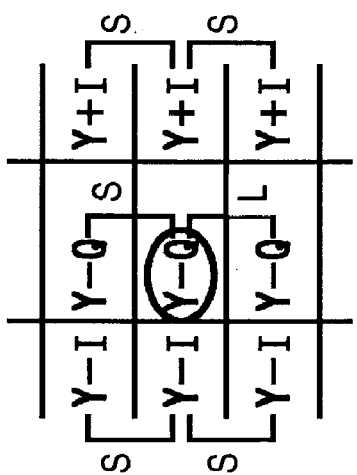
FIGS. 32A to 32D are diagrams for explaining a pattern that is observed when degradation in picture quality occurs.
Figure 32C:
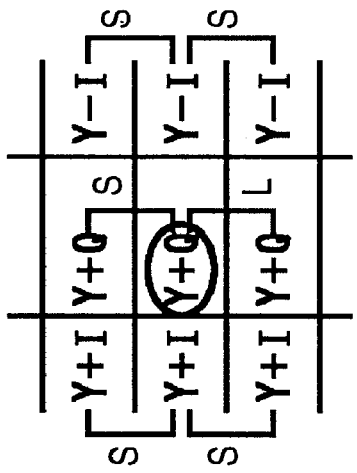

An NTSC signal is obtained by superposing (adding or subtracting) an I signal or a Q signal on a luminance signal Y, and these signals are combined to form four signals (four phases), namely, Y+I, Y−I, Y+Q, and Y−Q. Thus, also with regard to a signal of a target pixel in the original image, four cases are possible; namely, the target pixel in the original image is represented by a signal obtained by adding an I signal to a luminance signal Y as shown in FIGS. 29C and 30C, the target pixel in the original image is represented by a signal obtained by subtracting an I signal from a luminance signal Y as shown in FIGS. 29D and 30D, the target pixel in the original image is represented by a signal obtained by adding a Q signal to a luminance signal Y as shown in FIGS. 31C and 32C, or the target pixel in the original image is represented by a signal obtained by subtracting a Q signal from a luminance signal Y as shown in FIGS. 31D and 32D.

In the example shown in FIGS. 29A to 29D, with regard to the I signal of the target pixel in the original image, the absolute value of the difference in relation to the upper pixel with respect to the target pixel in the original image is larger than the threshold value (L), as shown in FIG. 29A, and the absolute value of the difference in relation to the lower pixel is smaller than the threshold value (S). Furthermore, with regard to the Q signal of the target pixel in the original image, the absolute values of the differences in relation to the upper pixel and the lower pixels are smaller than the threshold value (S), as shown in FIG. 29B. In this case, two situations shown in FIGS. 29C and 29D are possible. More specifically, in the case of FIG. 29C, in which the target pixel of the original image is represented by a signal obtained by adding the I signal to the luminance signal Y, the left-adjacent pixel is represented by a signal obtained by subtracting the Q signal from the luminance signal Y, and the right-adjacent pixel is represented by a signal obtained by adding the Q signal to the luminance signal Y. On the other hand, in the case of FIG. 29D, since the target pixel in the original image is represented by a signal obtained by subtracting the I signal from the luminance signal Y, the left-adjacent pixel is represented by a signal obtained by adding the Q signal to the luminance signal Y, and the right-adjacent pixel is represented by a signal obtained by subtracting the Q signal from the Y signal.

As described above, in the example shown in FIGS. 29A to 29D, the I signal of the target pixel included in the original image has a considerable difference in relation to the upper pixel as shown in FIG. 29A, and the Q signals included in the left and right adjacent pixels do not have considerable differences in relation to their associated upper and lower pixels. Thus, when a component signal is converted into a composite signal and the composite signal is converted back into a component signal by a conventional method, degradation in picture quality due to dot interference or the like is likely to occur at the upper pixel with respect to the target pixel or pixels in the proximity thereof.

In the example shown in FIGS. 30A to 30D, with regard to the I signal of the target pixel in the original image, the absolute value of the difference in relation to the upper pixel with respect to the target pixel in the original image is smaller than the threshold value (S) and the absolute value of the difference in relation to the lower pixel is larger than the threshold value (L), as shown in FIG. 30A. Furthermore, with regard to the Q signal of the target pixel in the original image, the absolute values of the differences in relation to the upper pixel and the lower pixels are smaller than the threshold value (S), as shown in FIG. 30B. In this case, two situations shown in FIGS. 30C and 30D are possible. More specifically, in the case of FIG. 30C, in which the target pixel of the original image is represented by a signal obtained by adding the I signal to the luminance signal Y, the left-adjacent pixel is represented by a signal obtained by subtracting the Q signal from the luminance signal Y, and the right-adjacent pixel is represented by a signal obtained by adding the Q signal to the luminance signal Y. On the other hand, in the case of FIG. 30D, since the target pixel in the original image is represented by a signal obtained by subtracting the I signal from the luminance signal Y, the left-adjacent pixel is represented by a signal obtained by adding the Q signal to the luminance signal Y, and the right-adjacent pixel is represented by a signal obtained by subtracting the Q signal from the luminance signal Y.

As described above, in the example shown in FIGS. 30A to 30D, the I signal of the target pixel included in the original image has a considerable difference in relation to the lower pixel as shown in FIG. 30A, and the Q signals do not have considerable differences in relation to their associated upper and lower pixels. Thus, when a component signal is converted into a composite signal and the composite signal is converted back into a component signal by a conventional method, degradation in picture quality due to dot interference or the like is likely to occur at the lower pixel with respect to the target pixel or pixels in the proximity thereof.

In the example shown in FIGS. 31A to 31D, with regard to the I signal of the target pixel in the original image, the absolute values of the differences in relation to the upper pixel and the lower pixel with respect to the target pixel are smaller than the threshold value (S), as shown in FIG. 31A. Furthermore, with regard to the Q signal of the target pixel in the original image, the absolute value of the difference in relation to the upper pixel is larger than the threshold value (L) and the absolute value of the difference in relation to the lower pixel is smaller than the threshold value (S), as shown in FIG. 31B. In this case, two situations shown in FIGS. 31C and 31D are possible. More specifically, in the case of FIG. 31C, in which the target pixel of the original image is represented by a signal obtained by adding the I signal to the luminance signal Y, the left-adjacent pixel is represented by a signal obtained by adding the I signal to the luminance signal Y, and the right-adjacent pixel is represented by a signal obtained by subtracting the I signal to the luminance signal Y. On the other hand, in the case of FIG. 31D, since the target pixel in the original image is represented by a signal obtained by subtracting the Q signal from the luminance signal Y, the left-adjacent pixel is represented by a signal obtained by subtracting the I signal from the luminance signal Y, and the right-adjacent pixel is represented by a signal obtained by adding the signal to the luminance signal Y.

As described above, in the example shown in FIGS. 31A to 31D, the Q signal of the target pixel in the original image has a considerable difference in relation to the upper pixel and does not have a considerable difference in relation to the lower pixel, and the I signals do not have considerable differences in relation to their associated upper and lower pixels. Thus, when a component signal is converted into a composite signal and the composite signal is converted back into a component signal by a conventional method, degradation in picture quality due to dot interference or the like is likely to occur at the upper pixel with respect to the target pixel or pixels in the proximity thereof.

Figure 32B:
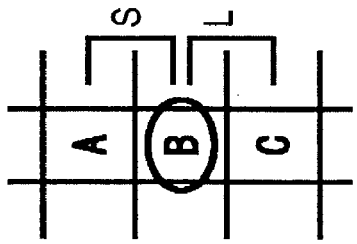
Figure 32A:
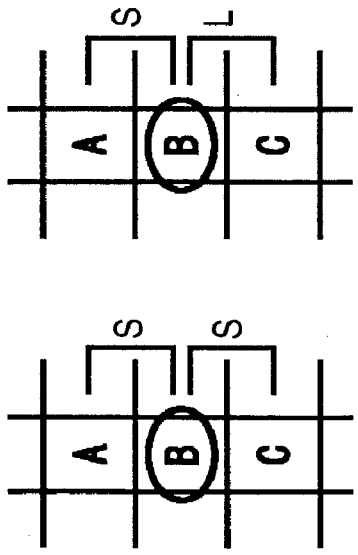

In the example shown in FIGS. 32A to 32D, with regard to the I signal of the target pixel in the original image, the absolute values of the differences in relation to the upper pixel and the lower with respect to the target pixel are smaller than the threshold value (S), as shown in FIG. 32A. Furthermore, with regard to the Q signal of the target pixel in the original image, the absolute value of the difference in relation to the upper pixel with respect to the target pixel in the original image is smaller than the threshold value (S) and the absolute value of the difference in relation to the lower pixel is larger than the threshold value (L), as shown in FIG. 32B. In this case, two situations shown in FIGS. 32C and 32D are possible. More specifically, in the case of FIG. 32C, in which the target pixel of the original image is represented by a signal obtained by adding the Q signal to the luminance signal Y, the left-adjacent pixel is represented by a signal obtained by adding the I signal to the luminance signal Y, and the right-adjacent pixel is represented by a signal obtained by subtracting the I signal from the luminance signal Y. On the other hand, in the case of FIG. 32D, since the target pixel in the original image is represented by a signal obtained by subtracting the Q signal from the luminance signal Y, the left-adjacent pixel is represented by a signal obtained by subtracting the I signal from the luminance signal Y, and the right-adjacent pixel is represented by a signal obtained by adding the I signal to the luminance signal Y.

As described above, in the example shown in FIGS. 32A to 32D, the Q signal of the target pixel in the original image has a considerable difference in relation to the lower pixel, and the I signals do not have considerable differences in relation to their associated upper and lower pixels. Thus, when a component signal is converted into a composite signal and the composite signal is converted back into a component signal by a conventional method, degradation in picture quality due to dot interference or the like is likely to occur at the lower pixel with respect to the target pixel or pixels in the proximity thereof.

In order to detect a pixel at which degradation in picture quality occurs, such as a pixel for which I signals change in the vertical direction and Q signals do not change in the vertical direction, or a pixel for which I signals do not change in the vertical direction and Q signals change in the vertical direction, as described above, information regarding differences between six pairs of pixel values, namely, pixel values of a target pixel, a pixel that is left-adjacent to the target pixel, a pixel that is right-adjacent to the target pixel, and their respectively associated upper and lower pixels, is needed. Based on the absolute values of the differences between the six pairs of pixel values, it is determined whether conditions shown in FIGS. 29A to 32D are satisfied.

Figure 11:
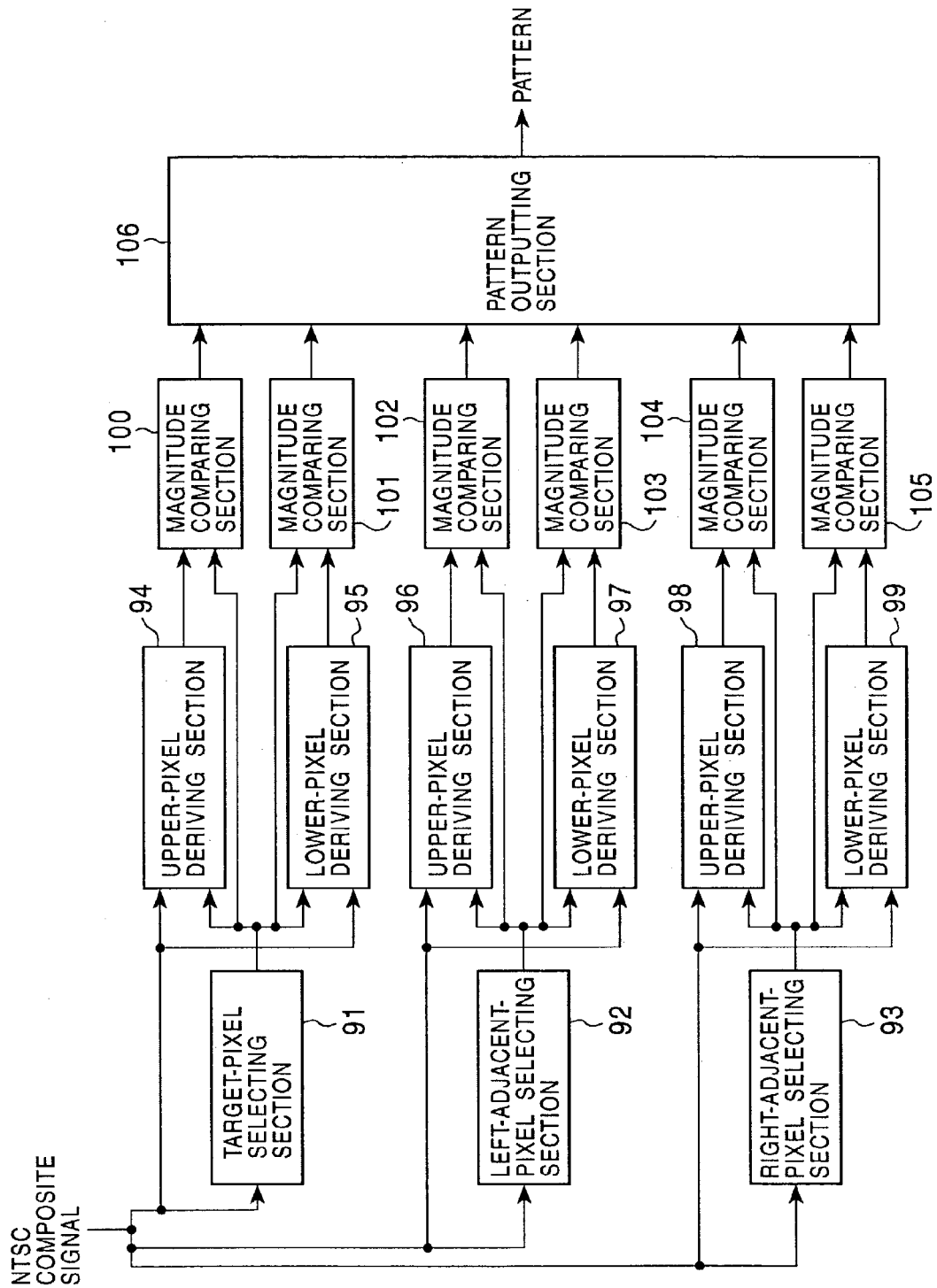
FIG. 11 is a block diagram of a pattern detecting section shown in FIG. 4.

The 6-bit pattern generated by the pattern detecting section 52 shown in FIG. 11 corresponds to the information regarding the absolute values of the differences between the six pairs of pixel values. More specifically, if each of the absolute values of the differences between the six pairs of pixel values of the target pixel, the left-adjacent pixel, and the right-adjacent pixel and their respectively associated upper and lower pixels is greater than or equal to the predetermined threshold value, a "1" is assigned, and a "0" is assigned otherwise. By detecting such a pattern, a class code in accordance with a pixel at which picture quality is degraded is assigned. Furthermore, by using prediction coefficients associated with the class code, a predictive calculation process is performed while suppressing degradation in picture quality.

Next, a process executed by the pattern detecting section 52 shown in FIG. 11 will be described with reference to a flowchart shown in FIG. 33.

In step S41, the target-pixel selecting section 91 selects a target pixel to be processed from among the pixels serving as class taps, extracted by the area extracting section 51, and outputs the target pixel to the upper-pixel deriving section 94, the lower-pixel deriving section 95, and the magnitude comparing sections 100 and 101 associated therewith.

In step S42, the left-adjacent-pixel selecting section 92 selects a pixel that is left-adjacent to the-target pixel from among the pixels serving as class taps, extracted by the area extracting section 51, and outputs the left-adjacent pixel to the upper-pixel deriving section 96, the lower-pixel deriving section 97, and the magnitude comparing sections 102 and 103 associated therewith.

In step S43, the right-adjacent-pixel selecting section 93 selects a pixel that is right-adjacent to the target pixel from among the pixels serving as class taps, extracted by the area extracting section 51, and outputs the right-adjacent pixel to the upper-pixel deriving section 98, the lower-pixel deriving section 99, and the magnitude comparing sections 104 and 105 associated therewith.

In step S44, the upper-pixel deriving section 94 associated with the target-pixel selecting section 91 derives a pixel value of a virtual pixel that is above and in phase with the target pixel, and outputs the pixel value to the magnitude comparing section 100.

Figure 35:
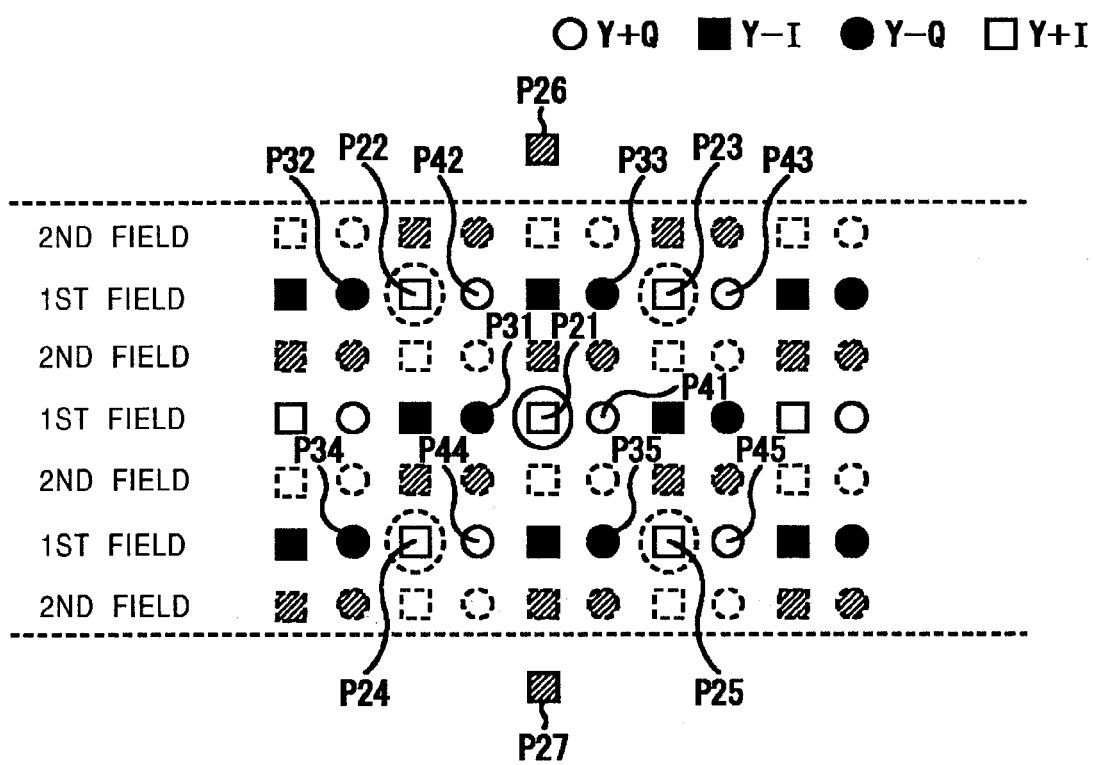
FIG. 35 is a diagram for explaining a method of deriving an upper pixel and a lower pixel with respect to a target pixel.

Now, a method of deriving a pixel value of a virtual pixel that is above and in phase with a target pixel, executed by the upper-pixel deriving section 94, will be described. It is to be assumed that, as shown in FIG. 35, a target pixel P21, enclosed in a solid circle, exists in a first field. Furthermore, in FIG. 35, a white circle indicates a signal (Y+Q), i.e., the sum of a luminance signal Y and a Q signal, a black square indicates a signal (Y−I), i.e., a result of subtracting an I signal from a luminance signal Y, a black circle indicates a signal (Y−Q), i.e., a result of subtracting a Q signal from a luminance signal Y, and a white square indicates a signal (Y+I), i.e., the sum of a luminance signal Y and an I signal. Furthermore, signals in the first field are shown as enclosed by solid lines whereas signals in a second field are shown as enclosed by dotted lines. The signals in four phases, i.e., (Y+I), (Y−I), (Y+Q), and (Y−Q), are located as shown in FIG. 35.

Figure 34A:
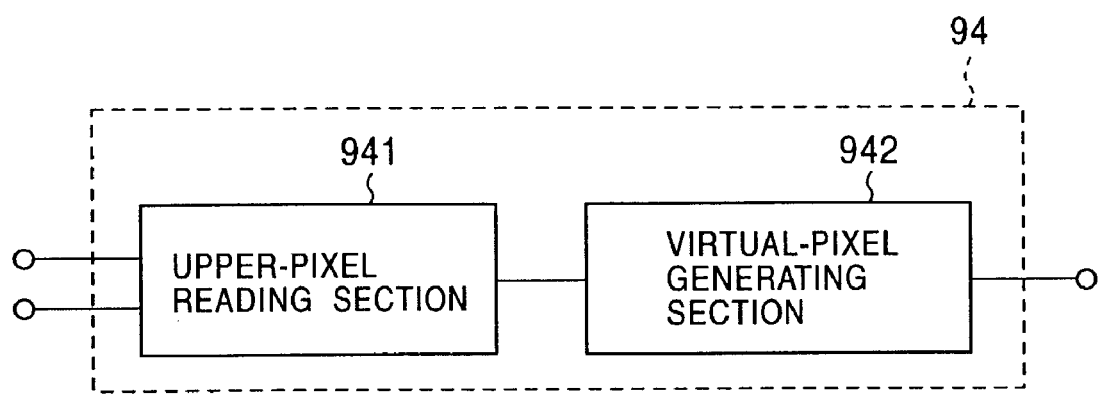
FIGS. 34A and 34B are diagrams for explaining a virtual-pixel deriving section.

The upper-pixel deriving section 94 includes an upper-pixel reading section 941 and a virtual-pixel generating section 942, as shown in FIG. 34A. The upper-pixel reading section 941 reads the pixel values of pixels P22 and P23 that are in phase with the target pixel P21 and on the horizontal line immediately above the target pixel P21. The virtual-pixel generating section 942 calculates an average of the pixel values ((P22+P23)/2) to derive a virtual pixel above the target pixel P21 (e.g., a pixel P26 in FIG. 35, which does not actually exist), and outputs the virtual upper pixel to the magnitude comparing section 100.

Figure 34B:
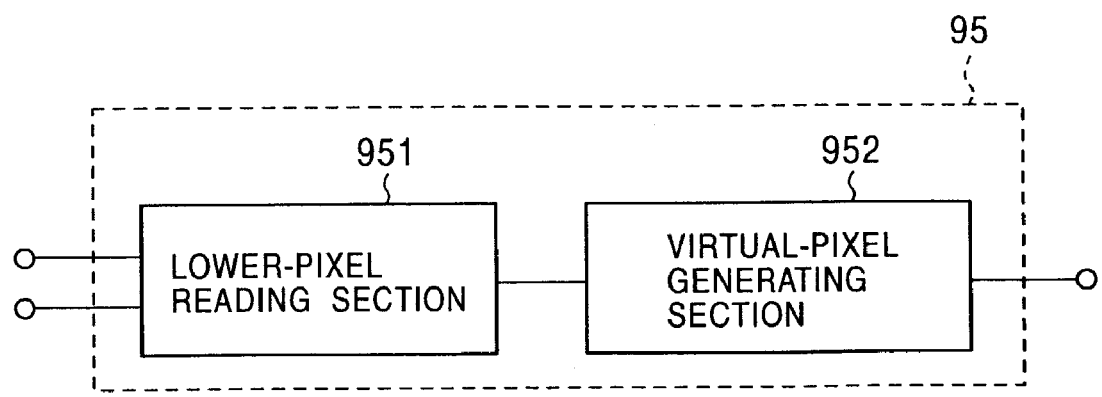

In step S45, the lower-pixel deriving section 95 associated with the target-pixel selecting section 91 derives a pixel that is below and in phase with the target pixel, and outputs the lower pixel to the magnitude comparing section 101. More specifically, similarly to the upper-pixel deriving section 94, the lower-pixel deriving section 95 includes a lower-pixel reading section 951 and a virtual-pixel generating section 952, as shown in FIG. 34B. The lower-pixel deriving section 951 reads the pixel values of pixels P24 and P25 that are in phase with the target pixel P21 and on the line immediately below the target pixel P21. The virtual-pixel generating section 952 calculates an average of the pixel values ((P24+P25)/2) to derive a virtual pixel below the target pixel P21 (e.g., a pixel P27 in FIG. 35, which does not actually exist), and outputs the virtual lower pixel to the magnitude comparing section 101.

In step S46, the upper-pixel deriving section 96 associated with the left-adjacent-pixel selecting section 92 derives a pixel that is above and in-phase with the left-adjacent pixel, and outputs the upper pixel to the magnitude comparing section 102. More specifically, by an arrangement similar to that of the upper-pixel deriving section 94 shown in FIG. 34A, the upper-pixel deriving section 96 calculates an average of the pixel values of pixels P32 and P33 ((P32+P33/2) that are in phase with and on the line immediately above a pixel P31 that is left-adjacent to the target pixel P21, as shown in FIG. 35, to derive a virtual pixel above the left-adjacent pixel, and outputs the virtual upper pixel to the magnitude comparing section 102.

In step S47, the lower-pixel deriving section 97 associated with the left-adjacent-pixel selecting section 92 derives a pixel that is below and in-phase with the left-adjacent pixel, and outputs the lower pixel to the magnitude comparing section 103. More specifically, by an arrangement similar to that of the lower-pixel deriving section 95 shown in FIG. 34B, the lower-pixel deriving section 97 calculates an average of the pixel values of pixels P34 and P35 ((P34+P35/2) that are in phase with and on the line immediately below the pixel P31 that is left-adjacent to the target pixel P21, as shown in FIG. 35, to derive a virtual pixel below the left-adjacent pixel, and outputs the virtual lower pixel to the magnitude comparing section 103.

In step S48, the upper-pixel deriving section 98 associated with the right-adjacent-pixel selecting section 93 derives a pixel that is above and in-phase with the right-adjacent pixel, and outputs the upper pixel to the magnitude comparing section 104. More-specifically, by an arrangement similar to that of the upper-pixel deriving section 94 shown in FIG. 34A, the upper-pixel deriving section 98 calculates an average of the pixel values of pixels P42 and P43 ((P42+P43/2) that are in phase with and on the line immediately above a pixel P41 that is right-adjacent to the target pixel P21, as shown in FIG. 35, to derive a virtual pixel above the right-adjacent pixel, and outputs the virtual upper pixel to the magnitude comparing section 104.

In step S49, the lower-pixel deriving section 99 associated with the right-adjacent-pixel selecting section 93 derives a pixel that is below and in-phase with the right-adjacent pixel, and outputs the lower pixel to the magnitude comparing section 105. More specifically, by an arrangement similar to that of the lower-pixel deriving section 95 shown in FIG. 34B, the lower-pixel deriving section 99 calculates an average of the pixel values of pixels P44 and P45 ((P44+P45/2) that are in phase with and on the line immediately below the pixel P31 that is right-adjacent to the target pixel P21, as shown in FIG. 35, to derive a virtual pixel below the right-adjacent pixel, and outputs the virtual lower pixel to the magnitude comparing section 105.

In step S50, each of the magnitude comparing sections 100 to 105 compares two input values, and outputs a value in accordance with a comparison result to the pattern outputting section 106. More specifically, the magnitude comparing sections 100 to 105 calculates the absolute values of the differences between the pixel values of the target pixel and the upper pixel with respect to the target pixel, the target pixel and the lower pixel with respect to the target pixel, the left-adjacent pixel and the upper pixel with respect to the left-adjacent pixel, the left-adjacent pixel and the lower pixel with respect to the left-adjacent pixel, the right-adjacent pixel and the upper pixel with respect to the right-adjacent pixel, and the right-adjacent pixel and the lower pixel with respect to the right-adjacent pixel, respectively. Each of the magnitude comparing sections 100 to 105 compares the absolute value of the difference with a predetermined threshold value, and outputs to the pattern detecting section 106 a comparison result of "1" if the absolute value of the difference is greater than or equal to the predetermined threshold value while outputting a comparison result of "0" if the absolute value of the difference is smaller than the predetermined threshold value.

Figures 36, 37:
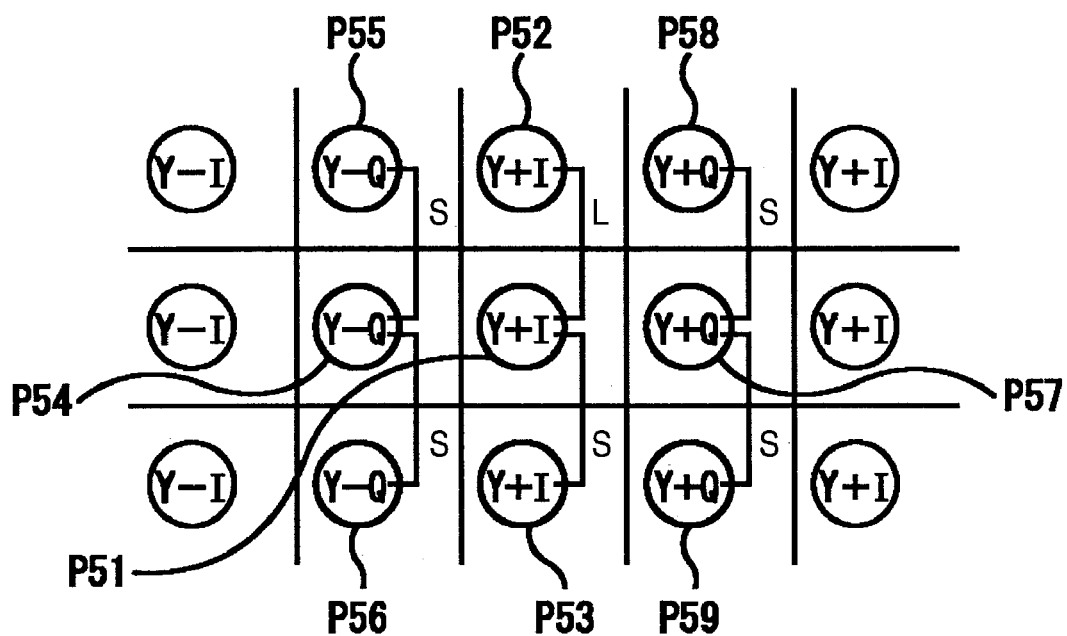
FIG. 36 is a diagram showing an example of a pattern that is detected.
FIG. 37 is a diagram showing an example of a pattern that is detected.

In step S51, the,pattern outputting section 106 forms a pattern based on the comparison results fed from the magnitude comparing sections 100 to 105, and outputs the pattern to the class-code determining section 53. For example, as shown in FIG. 36, with regard to a target pixel P51, if the absolute value of the difference between the pixel values of the target pixel P51 and an upper pixel P52 with respect to the target pixel P51 is greater than or equal to the threshold value (L), and if the absolute values of the differences between the pixel values of the other pairs of pixels (i.e., the absolute values of the differences between the pixel values of a left-adjacent pixel P54 and upper and lower pixels P55 and P56 with respect to the left-adjacent pixel P54, the absolute values of the differences between the pixel values of a right-adjacent pixel P57 and upper and lower pixels P58 and P59 with respect to the right-adjacent pixel P57, and the absolute value of the difference between the pixel values of the target pixel P51 and a lower pixel P53 with respect to the target pixel P51) are all smaller than the threshold value (S), assuming that each of the magnitude comparing sections 100 to 105 outputs a "1" as a comparison result if the absolute value of the difference is greater than or equal to the predetermined threshold value while otherwise outputting a "0", the pattern outputting section 106 outputs a 6-bit pattern as shown in FIG. 37 (e.g., a pattern of "010000" as read from top left to the right) to the class-code determining section 53.

In step S52, it is determined whether patterns have been detected for all the pixels. If it is determined that patterns have not been detected for all the pixels, the process returns to step S41, and the process is repeated until it is determined that patterns have been detected for all the pixels. If it is determined in step S52 that patterns have been detected for all the pixels, the process is finished.

Of 6-bit patterns that can be obtained by the process described above, two patterns, namely, "010000" and "000010", indicate possibility of degradation in picture quality at the target pixel. More specifically, if an I signal is included in the target pixel, "010000" indicates a change in an upper direction of the I signal but no change in a lower direction thereof, and indicates no change in upper and lower directions of Q signals included in the left and right adjacent pixels. If a Q signal is included in the target pixel, "010000" indicates a change in an upper direction of the Q signal but not change in a lower direction thereof, and indicates no change in upper and lower directions of I signals included in the left and right adjacent pixels. Similarly, if an I signal is included in the target pixel, "000010" indicates a change in a lower direction of the I signal but no change in an upper direction thereof, and indicates no change in upper and lower directions of Q signals included in the left and right adjacent pixels. If a Q signal is included in the target pixel, "000010" indicates a change in a lower-direction of the Q signal but no change in an upper direction thereof, and indicates no change in upper and lower directions of I signals included in the left and right adjacent pixels.

Steps S41 to S43 are executed substantially at the same timing. Also, steps S44 to S49 are executed substantially at the same timing.

The 6-bit patterns that can be detected by the process described above include patterns that identify pixels with possibility of degradation in picture quality, shown in FIGS. 29A to 32D. Thus, by assigning class codes in accordance with the patterns and performing a predictive calculation process using associated prediction coefficients, degradation in picture quality, which has hitherto been caused, is suppressed.

Figure 38:
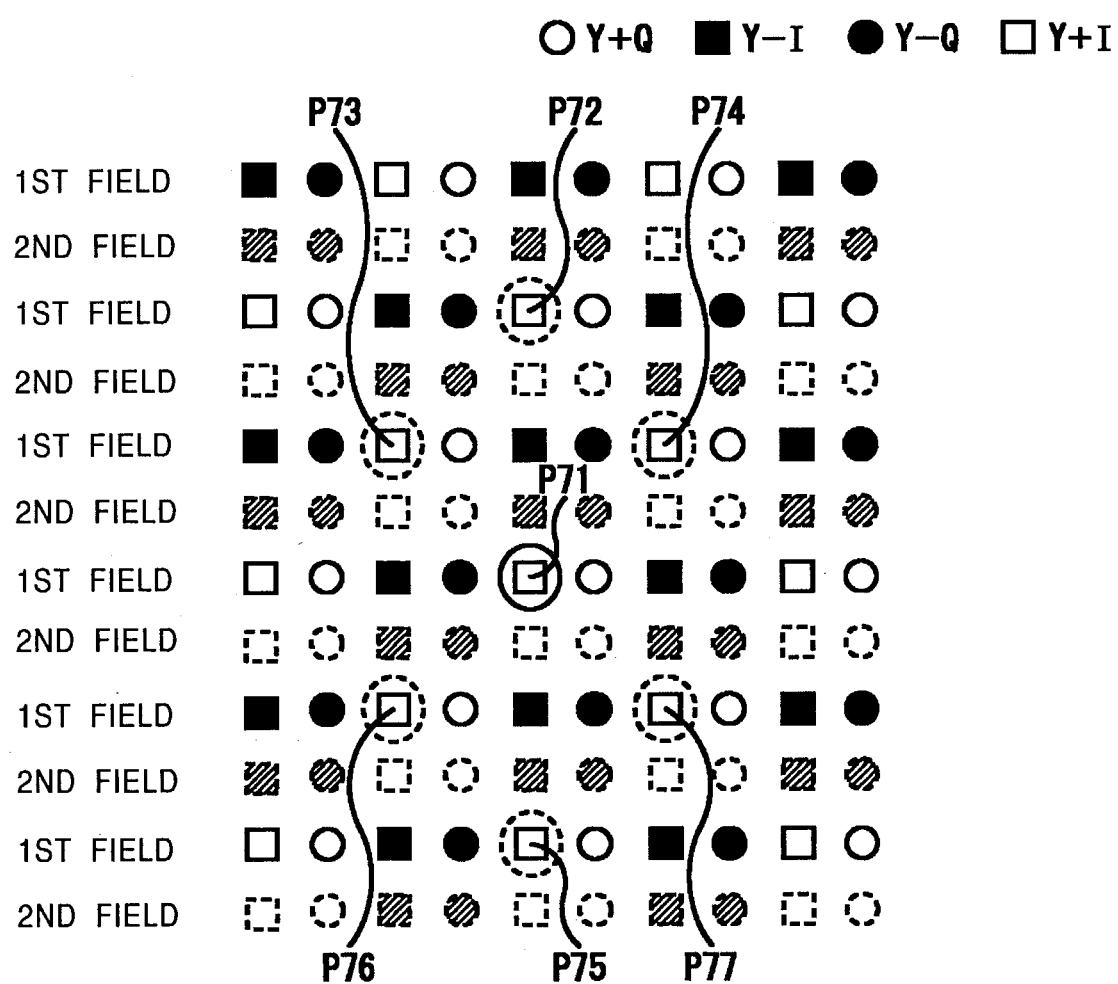
FIG. 38 is a diagram for explaining another method of deriving an upper pixel and a lower pixel with respect to a target pixel.

According to the above description, the upper-pixel deriving section 94 derives an upper pixel with respect to a target pixel based on an average of pixel values of two nearest pixels that are in phase with the target pixel and on the line immediately above the line of the target pixel, and the lower-pixel deriving section 95 derives a lower pixel with respect to the target pixel based on an average of pixel values of two nearest pixels that are in phase with the target pixel and on the line immediately below the line of the target pixel. Alternatively, for example, as shown in FIG. 38, the pixels may be derived by a classification-adaptation process using pixels including a target pixel P71 and pixels P72, P73, and P74 that are in the same field as and in phase with the target pixel P71 as prediction taps for deriving an upper pixel with respect to the target pixel, and using for pixels including the target pixel P71 and pixels P75, P76, and P77 that are in the same field as and in phase with the target pixel P71 as prediction taps for deriving a lower pixel with respect to the target pixel. The arrangement of a classification-adaptation circuit used at this time is the same as that shown in FIG. 4; however, prediction coefficients used for the calculation are generated by the learning apparatus shown in FIG. 8 in relation to the patterns described above.

In that case, the upper-pixel deriving section 96 and the lower-pixel deriving section 97 associated with the left-adjacent-pixel selecting section 92, and the upper-pixel deriving section 98 and the lower-pixel deriving section 99 associated with the right-adjacent-pixel selecting section 93 may derive an upper pixel and a lower pixel with respect to the left-adjacent pixel and an upper pixel and a lower pixel with respect to the right-adjacent pixel in similar manners, respectively.

In the example described above, presence or absence of change is detected and a pattern is formed, with regard to an I signal and a Q signal included in an NTSC composite signal, based on whether each of the absolute values of the differences between pixel values of a target pixel, a pixel that is left-adjacent to the target pixel, and a pixel that is right-adjacent to the target pixel and their respectively associated upper and lower pixels is greater than or equal to a predetermined threshold value. Then, pixels with possibility of degradation in picture quality, i.e., pixels in the proximity of a border where color changes in the vertical direction as described with reference to FIGS. 17 to 28, are identified. Alternatively, a composite signal may be separated into an I signal and a Q signal, and in addition to the absolute values of the differences between pixel values of a target pixel, a pixel that is left-adjacent to the target pixel, and a pixel that is right-adjacent to the target pixel and their respectively associated upper and lower pixels, the absolute values of the differences between pixel values of the left-adjacent pixel and the right-adjacent pixel with respect to the target pixel and their respectively associated left and right pixels may be used for comparison. This serves to identify more accurately a part in which picture quality is degraded with consideration as to whether color changes in the horizontal direction.

Figure 39:
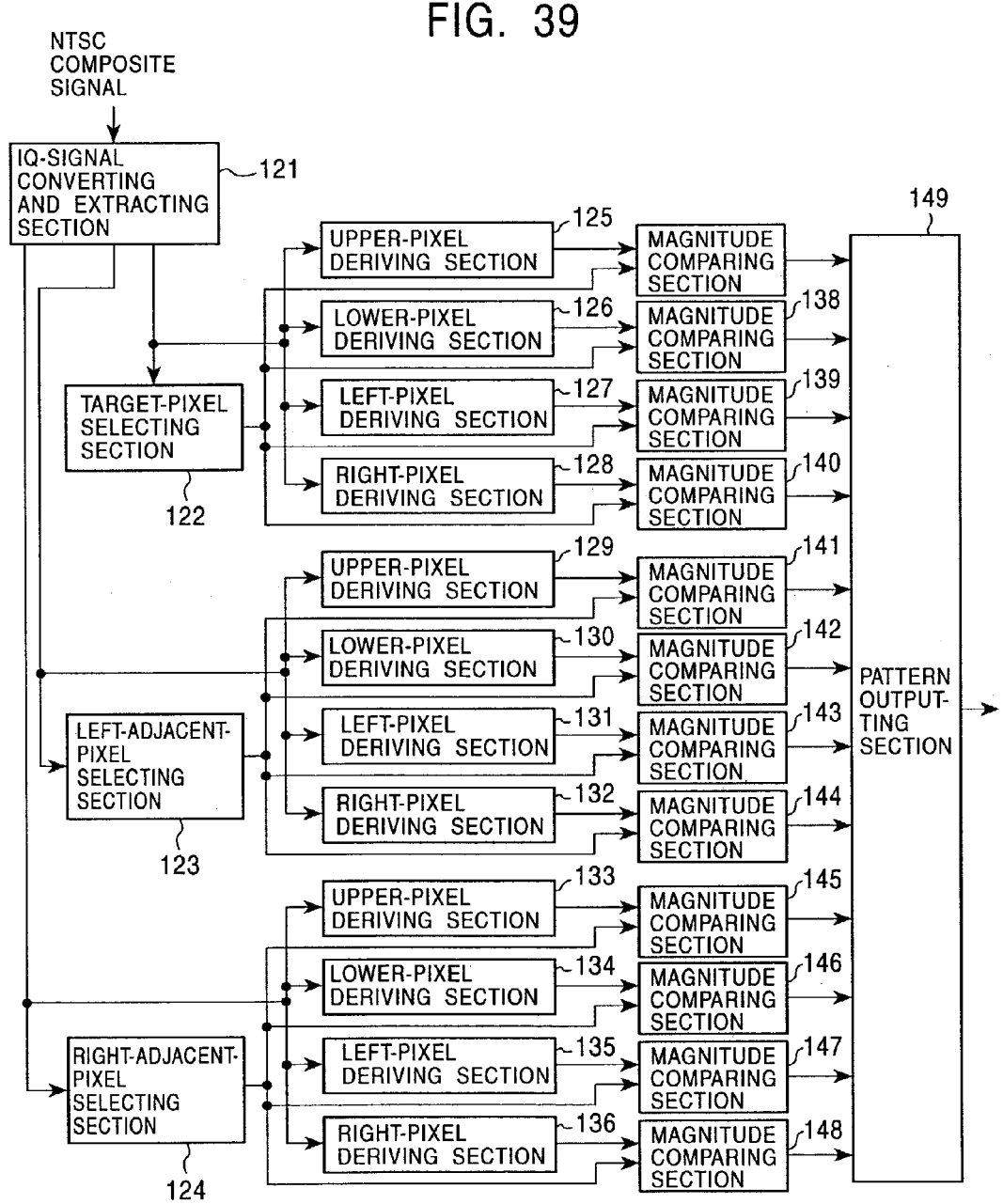
FIG. 39 is a block diagram showing another configuration of the pattern detecting section shown in FIG. 4.

FIG. 39 is a block diagram showing another example configuration of the pattern detecting section 52 in a case where a composite signal is separated into an I signal and a Q signal and in which, in addition to the absolute values of the differences between pixel values of a target pixel, a pixel that is left-adjacent to the target pixel, and a pixel that is right-adjacent to the target pixel and their respectively associated upper and lower pixels, the absolute values of the differences between pixel values of the left-adjacent pixel and the right-adjacent pixel with respect to the target pixel and their respectively associated left and right pixels are used for comparison.

An IQ-signal converting and extracting section 121 converts an input signal to extract an I signal and a Q signal, and outputs the I signal and the Q signal to a target-pixel selecting section 122, a left-adjacent-pixel selecting section 123, a right-adjacent-pixel selecting section 124, to an upper-pixel deriving section 125, a lower-pixel deriving section 126, a left-pixel deriving section 127, and a right-pixel deriving section 128 associated with the target-pixel selecting section 122, to an upper-pixel deriving section 129, a lower-pixel deriving section 130, a left-pixel deriving section 131, and a right-pixel deriving section 132 associated with the left-adjacent-pixel selecting section 123, and to an upper-pixel deriving section 133, a lower-pixel deriving section 134, a left-pixel deriving section 135, and a right-pixel deriving section 136 associated with the right-adjacent-pixel deriving section 124. More specifically, for example, let it be assumed that a target pixel P91 is represented by a sum signal of a luminance signal Y and an I signal (Y+I), as shown in FIG. 40. In that case, the left-adjacent pixel is represented by a signal (Y−Q), i.e., a signal obtained by subtracting a Q signal from a luminance signal Y, and the right-adjacent signal is represented by a sum signal (Y+Q) obtained by adding a Q signal to a luminance signal Y. A pixel P92 that is left to the left-adjacent pixel is represented by a signal (Y−I) obtained by subtracting an I signal from a luminance signal Y, and a pixel P93 that is right to the right-adjacent pixel is represented by a signal (Y+I) obtained by adding an I signal to a luminance signal Y. A bandpass filtering (BPF) process is executed according to equation (9) below using the target pixel P91 and the pixels P92 and P93, whereby an I signal is extracted and output as a signal of a target pixel P101, as shown in FIG. 41.

$$|2 \times P91 - P92 - P93|/4 \quad (9)$$

By executing similar processes for all the pixels, all the signals are separated into I signals and Q signals, as shown in FIG. 41.

Also in cases where a target pixel is represented by a signal (Y−I), (Y+Q), or (Y−Q), similar processes are executed.

The target-pixel selecting section 122 selects an I signal or a Q signal of a target pixel from the I signal and the Q signal input from the IQ-signal converting and extracting section 121, and outputs the signal selected to magnitude comparing sections 137 to 140.

The left-adjacent-pixel selecting section 123 selects an I signal or a Q signal of a pixel that is left-adjacent to the target pixel from the I signal and the Q signal input from the IQ-signal converting and extracting section 121, and outputs the signal selected to magnitude comparing sections 141 to 144.

The right-adjacent-pixel selecting section 124 selects an I signal or a Q signal of a pixel that is right-adjacent to the target pixel from the I signal and the Q signal input from the IQ-signal converting and extracting section 121, and outputs the signal selected to magnitude comparing sections 145 to 148.

Figure 42:
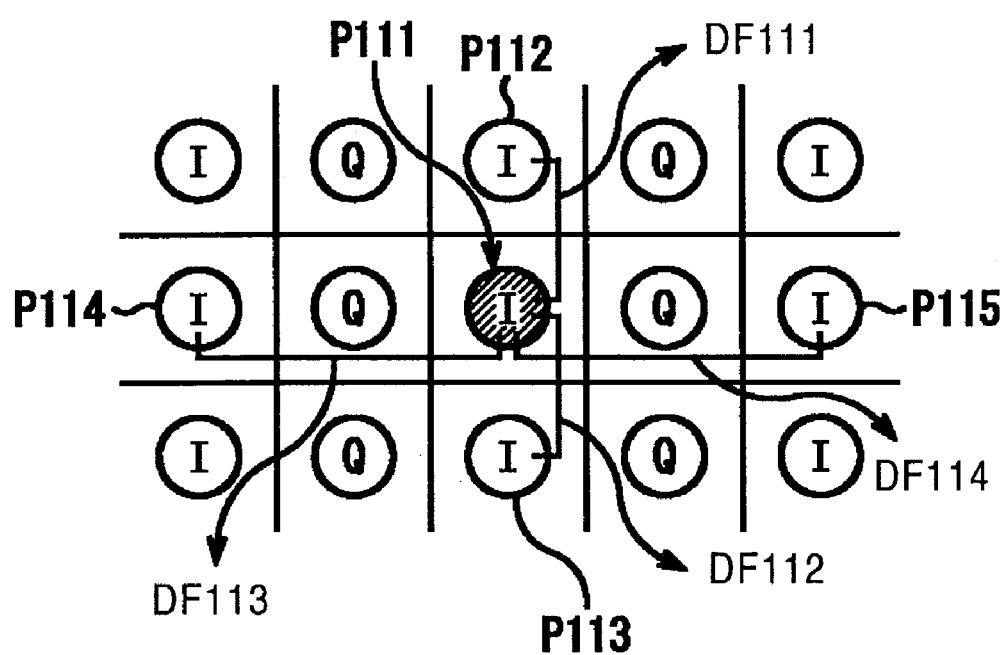
FIG. 42 is a diagram for explaining a process executed by magnitude comparing sections.

The upper-pixel deriving section 125 associated with the target-pixel selecting section 122 selects an I signal or a Q signal of an upper pixel with respect to the target pixel from the I and Q signals input from the IQ-signal converting and extracting section 121, and outputs the signal selected to the magnitude comparing section 137. For example, if the target pixel is a pixel P111 represented by an I signal, as shown in FIG. 42, a pixel P112 is derived as an upper pixel and output to the magnitude comparing section 137.

The lower-pixel deriving section 126 associated with the target-pixel selecting section 122 selects an I signal or a Q signal of a lower pixel with respect to the target pixel from the I and Q signals input from the IQ-signal converting and extracting section 121, and outputs the signal selected to the magnitude comparing section 138. For example, if the target pixel is the pixel P111 represented by an I signal, as shown in FIG. 42, a pixel P113 is derived as a lower pixel and output to the magnitude comparing section 138.

The left-pixel deriving section 127 associated with the target-pixel selecting section 122 selects an I signal or a Q signal of a pixel that is in phase with and left to the target pixel from the I and Q signals input from the IQ-signal converting and extracting section 121, and outputs the signal selected to the magnitude comparing section 139. For example, if the target pixel is the pixel P111 represented by an I signal, as shown in FIG. 42, a pixel P114 is derived as a left pixel and output to the magnitude comparing section 139.

The right-pixel deriving section 128 associated with the target-pixel selecting section 122 selects an I signal or a Q signal of a pixel that is in phase pixel with and right to the target pixel from the I and Q signals input from the IQ-signal converting and extracting section 121, and outputs the signal selected to the magnitude comparing section 140. For example, if the target pixel is the pixel Pill represented by an I signal, as shown in FIG. 42, a pixel P115 is derived as a right pixel and output to the magnitude comparing section 140.

The upper-pixel deriving section 129 associated with the left-adjacent-pixel selecting section 123, similarly to the upper-pixel deriving section 125, selects an I signal or Q signal of an upper pixel with respect to the left-adjacent pixel from the I and Q signals input from the IQ-signal converting and extracting section 121, and outputs the signal selected to the magnitude comparing section 141.

The lower-pixel deriving section 130 associated with the left-adjacent-pixel selecting section 123, similarly to the lower-pixel deriving section 126, selects an I signal or Q signal of a lower pixel with respect to the left-adjacent pixel from the I and Q signals input from the IQ-signal converting and extracting section 121, and outputs the signal selected to the magnitude comparing section 142.

The left-pixel deriving section 131 associated with the left-adjacent-pixel selecting-section 123, similarly to the left-pixel deriving section 127, selects an I signal or Q signal of a pixel that is in phase with and left to the left-adjacent pixel from the I and Q signals input from the IQ-signal converting and extracting section 121, and outputs the signal selected to the magnitude comparing section 143.

The right-pixel deriving section 132 associated with the left-adjacent-pixel selecting section 123, similarly to the right-pixel deriving section 128, selects an I signal or Q signal of a pixel that is in phase with and right to the left-adjacent pixel from the I and Q signals input from the IQ-signal converting and extracting section 121, and outputs the signal selected to the magnitude comparing section 144.

The upper-pixel deriving section 133 associated with the right-adjacent-pixel selecting section 124, similarly to the upper-pixel deriving section 125, selects an I signal or Q signal of an upper pixel with respect to the right-adjacent pixel from the I and Q signal input from the IQ-signal converting and extracting section 121, and outputs the signal selected to the magnitude comparing section 145.

The lower-pixel deriving section 134 associated with the right-adjacent-pixel selecting section 124, similarly to the lower-pixel deriving section 126, selects an I signal or Q signal of a lower pixel with respect to the right-adjacent pixel from the I and Q signals input from the IQ-signal converting and extracting section 121, and outputs the signal selected to the magnitude comparing section 146.

The left-pixel deriving section 135 associated with the right-adjacent-pixel selecting section 124, similarly to the left-pixel deriving section 127, selects an I signal or Q signal of a pixel that is in phase with and left to the right-adjacent pixel from the I and Q signals input from the IQ-signal converting and extracting section 121, and outputs the signal selected to the magnitude comparing section 147.

The right-pixel deriving section 136 associated with the right-adjacent-pixel selecting section 124, similarly to the right-pixel deriving section 128, selects an I signal or Q signal of a pixel that is in phase with and right to the right-adjacent signal from the I and Q signals input from the IQ-signal converting and extracting section 121, and outputs the signal selected to the magnitude comparing section 148.

The magnitude comparing section 137 compares the pixel value of the target pixel, input from the target-pixel selecting section 122, and the pixel value of the upper pixel with respect to the target pixel, input from the upper-pixel deriving section 125, and outputs a comparison result to a pattern outputting section 149 in the form of binary information. More specifically., referring to FIG. 42, the magnitude comparing section 137 calculates the absolute value of the difference DF111 between the pixel value of the target pixel P111 and the pixel value of the upper pixel P112 with respect to the target pixel P111. If the absolute value of the difference DF111 is greater than or equal to a predetermined threshold value, the magnitude comparing section 137 outputs a "1" to the pattern outputting section 149 while outputting a "0" if the absolute value of the difference DF111 is smaller than the predetermined threshold value. Similarly to the case of the magnitude comparing sections 100 to 105, it is empirically known that a threshold value on the order of five is appropriate; however, the threshold value may be other values. The same applies to threshold values used in the magnitude comparing sections 138 to 148.

The magnitude comparing section 138 compares the pixel value of the target pixel, input from the target-pixel selecting section 122, and the pixel value of the lower pixel with respect to the target pixel, input from the lower-pixel deriving section 126, and outputs a comparison result to the pattern outputting section 149 in the form of binary information. More specifically, referring to FIG. 42, the magnitude comparing section 138 calculates the absolute value of the difference DF112 between the pixel value of the target pixel P111 and the pixel value of the lower pixel P113 with respect to the target pixel P111. If the absolute value of the difference DF112 is greater than or equal to a predetermined threshold value, the magnitude comparing section 138 outputs a "1" to the pattern outputting section 149 while outputting a "0" if the absolute value of the difference DF112 is smaller than the predetermined threshold value.

The magnitude comparing section 139 compares the pixel value of the target pixel, input from the target-pixel selecting section 122, and the pixel value of the left pixel with respect to the target pixel, input from the left-pixel deriving section 127, and outputs a comparison result to the pattern outputting section 149 in the form of binary information. More specifically, referring to FIG. 42, the magnitude comparing section 139 calculates the absolute value of the difference DF113 between the pixel value of the target pixel P111 and the pixel value of the pixel P114 that is in phase with and left to the target pixel P111. If the absolute value of the difference DF113 is greater than or equal to a predetermined threshold value, the magnitude comparing section 139 outputs a "1" to the pattern outputting section 149 while outputting a "0" if the absolute value of the difference DF113 is smaller than the predetermined threshold value.

The magnitude comparing section 140 compares the pixel value of the target pixel, input from the target-pixel selecting section 122, and the pixel value of the right pixel with respect to the target pixel, input from the right-pixel deriving section 128, and outputs a comparison result to the pattern outputting section 149 in the form of binary information. More specifically, referring to FIG. 42, the magnitude comparing section 140 calculates the absolute value of the difference DF114 between the pixel value of the target pixel P111 and the pixel P115 that is in phase with and right to the target pixel P111. If the absolute value of the difference DF114 is greater than or equal to a predetermined threshold value, the magnitude comparing section 140 outputs a "1" to the pattern outputting section 149 while outputting a "0" if the absolute value of the difference DF114 is smaller than the predetermined threshold value.

The magnitude comparing section 141, similarly to the magnitude comparing section 137, compares the pixel value of the pixel that is left-adjacent to the target pixel, input from the left-adjacent-pixel selecting section 123, and the pixel value of the upper pixel with respect to the left-adjacent pixel, input from the upper-pixel deriving section 129, and outputs a comparison result to the pattern outputting section 149 in the form of binary information.

The magnitude comparing section 142, similarly to the magnitude comparing section 138, compares the pixel value of the pixel that is left-adjacent to the target pixel, input from the left-adjacent-pixel selecting section 123, and the pixel value of the lower pixel with respect to the left-adjacent pixel, input from the lower-pixel deriving section 130, and outputs a comparison result to the pattern outputting section 149 in the form of binary information. The magnitude comparing section 143, similarly to the magnitude comparing section 139, compares the pixel value of the pixel that is left-adjacent to the target pixel, input from the left-adjacent-pixel selecting section 123, and the pixel value of the left pixel with respect to the left-adjacent pixel, input from the left-pixel deriving section 131, and outputs a comparison result to the pattern outputting section 149 in the form of binary information.

The magnitude comparing section 144, similarly to the magnitude comparing section 140, compares the pixel value of the pixel that is left-adjacent to the target pixel, input from the left-adjacent-pixel selecting section 123, and the pixel value of the right pixel with respect to the left-adjacent pixel, input from the right-pixel deriving section 132, and outputs a comparison result to the pattern outputting section 149 in the form of binary information.

The magnitude comparing section 145, similarly to the magnitude comparing section 137, compares the pixel value of the pixel that is right-adjacent to the target pixel, input from the right-adjacent-pixel selecting section 124, and the pixel value of the upper pixel with respect to the right-adjacent pixel, input from the upper-pixel deriving section 133, and outputs a comparison result to the pattern outputting section 149 in the form of binary information.

The magnitude comparing section 146, similarly to the magnitude comparing section 138, compares the pixel value of the pixel that is right-adjacent to the target pixel, input from the right-adjacent-pixel selecting section 124, and the pixel value of the lower pixel with respect to the right-adjacent pixel, input from the lower-pixel deriving section 134, and outputs a comparison result to the pattern outputting section 149 in the form of binary information.

The magnitude comparing section 147, similarly to the magnitude comparing section 139, compares the pixel value of the pixel that is right-adjacent to the target pixel, input from the right-adjacent-pixel selecting section 124, and the pixel value of the left pixel with respect to the right-adjacent pixel, input from the left-pixel deriving section 135, and outputs a comparison result to the pattern outputting section 149 in the form of binary information.

The magnitude comparing section 148, similarly to the magnitude comparing section 140, compares the pixel value of the pixel that is right-adjacent to the target pixel, input from the right-adjacent-pixel selecting section 124, and the pixel value of the right pixel with respect to the right-adjacent pixel, input from the right-pixel deriving section 136, and outputs a comparison result to the pattern outputting section 149 in the form of binary information.

The "1"s and "0"s output from the magnitude comparing sections 137 to 148 may be used to represent magnitude relationships opposite to those in the example described above.

The pattern outputting section 149 forms a pattern from the binary signals input from the magnitude comparing sections 137 to 148, and outputs the pattern to the class-code determining section 53. More specifically, the pattern outputting section 149 receives input of 12-bit information in total as results of comparisons of the absolute values of the differences between the pixel values of the target pixel, the pixel that is left-adjacent to the target pixel, and the pixel that is right-adjacent to the target pixel and their respectively associated, nearest and in-phase upper, lower, left, and right pixels with predetermined threshold values, forms a pattern from the information, and outputs the pattern to the class-code determining section 53.

FIGS. 43A to 43C and FIGS. 44A to 44C show patterns that indicate possibility of degradation in picture quality at the target pixel. A possibility of degradation in picture quality at the target pixel P111 exists if the absolute value of the difference between the pixel values of the target pixel P111 and the associated upper pixel P112 is greater than or equal to the threshold value (L) and the absolute values of the differences between the pixel values of the target pixel P111 and the associated lower pixel P113, left pixel P114, and right pixel P115, respectively, are smaller than the threshold value (S), as shown in FIG. 43A, if the absolute values of the differences between the pixel values of the left-adjacent pixel P121 with respect to the target pixel P111 and the associated upper pixel P122, lower pixel P123, left pixel P124, and right pixel P125, respectively, are smaller than the threshold value (S), as shown in FIG. 43B, and if the absolute values of the differences between the pixel values of the right-adjacent pixel P131 with respect to the target pixel P111 and the associated upper pixel P132, lower pixel P133, left pixel P134, and right pixel P135, respectively, are smaller than the threshold value (S), as shown in FIG. 43C.

Figure 44C:
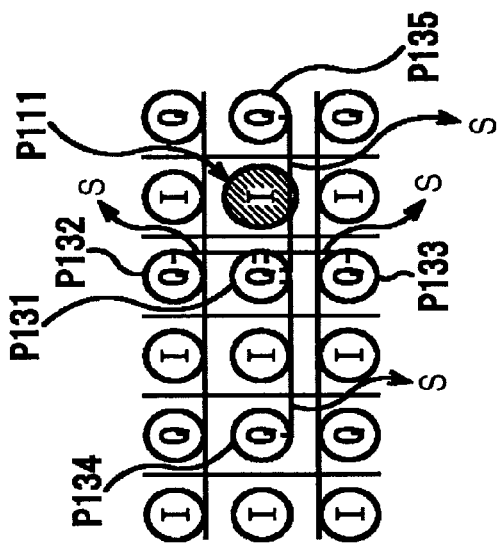
FIGS. 44A to 44C are diagrams showing an example of a pattern that is detected.
Figure 44B:
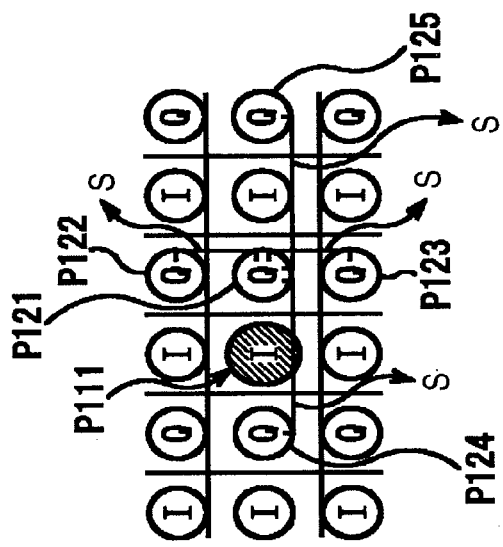
Figure 44A:
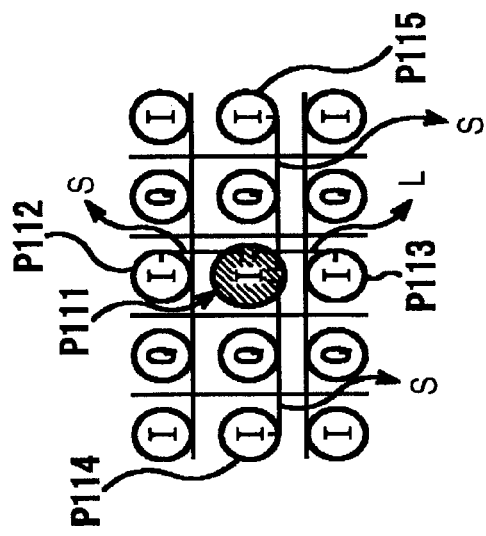

Also, a possibility of degradation in picture quality at the target pixel P111 exists if the absolute value of the difference between the pixel values of the target pixel P111 and the associated lower pixel P113 is greater than or equal to the threshold value (L) and the absolute values of the differences between the pixel values of the target pixel P111 and the associated upper pixel P112, left pixel P114, and right pixel P115, respectively, are smaller than the threshold value (S), as shown in FIG. 44A, if the absolute values of the differences between the pixel values of the left-adjacent pixel P121 with respect to the target pixel Pill and the associated upper pixel P122, lower pixel P123, left pixel P124, and right pixel P125, respectively, are smaller than the threshold value (S), as shown in FIG. 44B, and if the absolute values of the differences between the pixel values of the right-adjacent pixel P131 with respect to the target pixel P111 and the associated upper pixel P132, lower pixel P133, left pixel P134, and right pixel P135, respectively, are smaller than the threshold value (S), as shown in FIG. 44C.

As shown in FIGS. 43A to 43C and FIGS. 44A to 44C, results of comparison of the absolute values of the differences between pixel values of the target pixel, the left-adjacent pixel, and the right-adjacent pixel and their respectively associated, in-phase, left and right pixels with the threshold values are included. This is because color does not necessarily change in the vertical direction as described with reference to FIGS. 17 to 28, and color also changes in the horizontal direction of I signals or Q signals of pixels. Accordingly, information that allows identification of change in color in the horizontal direction of I signals or Q signals of pixels is included.

Next, a pattern detection process executed by the pattern outputting section 149 shown in FIG. 39 will be described with reference to a flowchart shown in FIG. 45.

In step S61, the IQ-signal converting and extracting section 121 converts a composite signal into an IQ signal, and outputs the IQ signals to the target-pixel selecting section 122, the left-adjacent-pixel selecting section 123, the right-adjacent-pixel selecting section 124, to the upper-pixel deriving section 125, the lower-pixel deriving section 126, the left-pixel deriving section 127, and the right-pixel deriving section 128 associated with the target-pixel selecting section 122, to the upper-pixel deriving section 129, the lower-pixel deriving section 130, the left-pixel deriving section 131, and the right-pixel deriving section 132 associated with the left-adjacent-pixel selecting section 123, and to the upper-pixel deriving section 133, the lower-pixel deriving section 134, the left-pixel deriving section 135, and the right-pixel deriving section 136 associated with the right-adjacent-pixel selecting section 124.

In step S62, the target-pixel selecting section 122 selects a signal of a target pixel from the IQ signal input thereto, and outputs the signal selected to the magnitude comparing sections 137 to 140. In step S63, the left-adjacent-pixel selecting section 123 selects a signal of a pixel that is left-adjacent to the target pixel from the IQ signal input thereto, and outputs the signal selected to the magnitude comparing sections 141 to 144. In step S64, the right-adjacent-pixel selecting section 124 selects a signal of a pixel that is right-adjacent to the target pixel from the IQ signal input thereto, and outputs the signal selected to the magnitude comparing sections 145 to 148.

In step S65, the upper-pixel deriving section 125, the lower-pixel deriving section 126, the left-pixel deriving section 127, and the right-pixel deriving section 128 associated with the target-pixel selecting section 122 derives an upper pixel, a lower pixel, an in-phase left pixel, and an in-phase right pixel with respect to the target pixel from the IQ signals input thereto, and outputs the upper pixel, the lower pixel, the left pixel, and the right pixel to the magnitude comparing sections 137 to 140, respectively.

In step S66, the upper-pixel deriving section 129, the lower-pixel deriving section 130, the left-pixel deriving section 131, and the right-pixel deriving section 132 associated with the left-adjacent-pixel selecting section 123 derives an upper pixel, a lower pixel, an in-phase left pixel, and an in-phase right pixel with respect to the left-adjacent pixel from the IQ signals input thereto, and outputs the upper pixel, the lower pixel, the left pixel, and the right pixel to the magnitude comparing sections 141 to 144, respectively.

In step S67, the upper-pixel deriving section 133, the lower-pixel deriving section 134, the left-pixel deriving section 135, and the right-pixel deriving section 136 associated with the right-adjacent-pixel selecting section 124 derives an upper pixel, a lower pixel, an in-phase left pixel, and an in-phase right pixel with respect to the right-adjacent pixel from the IQ signals input thereto, and outputs the upper pixel, the lower pixel, the left pixel, and the right pixel to the magnitude comparing sections 145 to 148, respectively.

In step S68, each of the magnitude comparing sections 137 to 148 compares the absolute value of the difference between the two input values with the predetermined threshold value, and outputs a value in accordance with a comparison result to the pattern outputting section 149. More specifically, each of the magnitude comparing sections 137 to 148 compares calculates the absolute value of the difference between the two input values, and outputs a "1" to the pattern outputting section 149 if the absolute value of the difference is greater than or equal to the predetermined threshold value while outputting a "0" if the absolute value of the difference is smaller than the predetermined threshold value.

In step S69, the pattern outputting section 149 forms a pattern from the 12-bit comparison results input from the magnitude comparing sections 137 to 148, and outputs the pattern to the class-code determining section 53.

In step S70, it is determined whether patterns have been detected for all the pixels. If it is determined in step S70 that patterns have not been detected for all the pixels, the process returns to step S62, and steps S62 to S70 are repeated until it is determined that patterns have been detected for all the pixels. If it is determined in step S70 that patterns have been detected for all the pixels, the process is finished.

Steps S62 to S64 described above are executed substantially at the same timing. Also, steps S65 to S67 are executed substantially at the same timing.

12-bit patters that are detected by the process described above when possibility of degradation in picture quality at the target pixel exists are as shown in FIGS. 43A to 43C and FIGS. 44A to 44C. Thus, assuming that the 12 bits of a pattern is in order of the magnitude comparing sections 137 to 148, the pattern is either "010000000000" or "100000000000".

By the process described above, a pattern for detecting a pixel at which possibility of degradation in picture quality exists is generated based on relationships with adjacent pixels in the vertical direction and also based on relationships with in-phase, adjacent pixels in the horizontal direction. Thus, change in pixel values in the vertical direction is grasped more accurately. Accordingly, predictive calculation is performed using optimal prediction coefficients, serving to suppress degradation in picture quality that is caused when a composite signal is converted into a component signal.

Figure 46A:
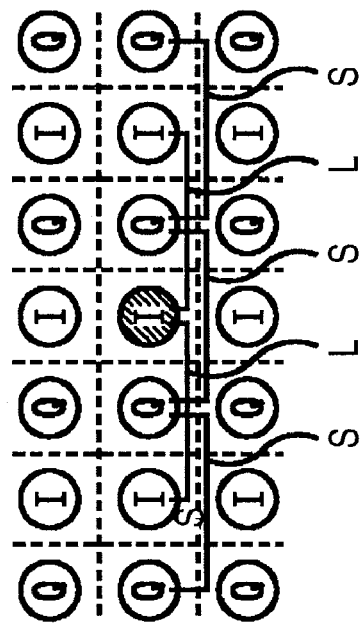
FIGS. 46A to 46C are diagrams for explaining that 12-bit information can be handled substantially as 11-bit information.
Figure 46B:
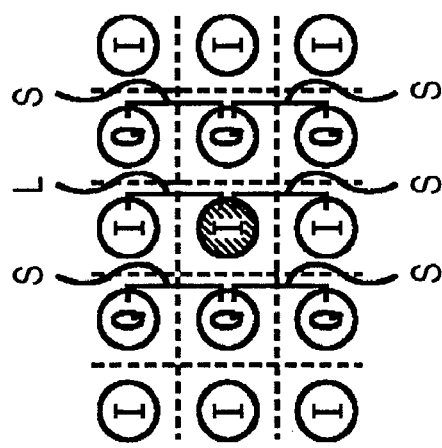
Figure 46C:
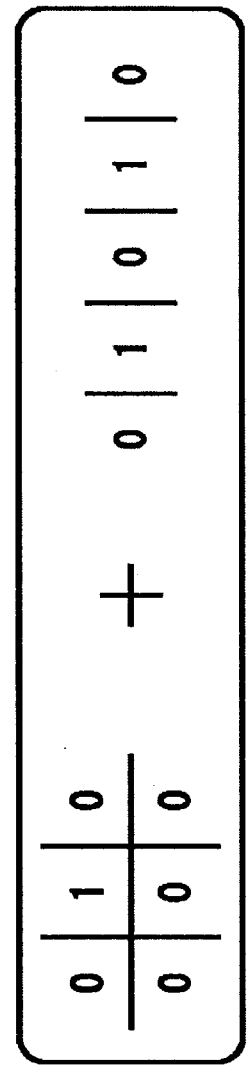

In the example described above, the pattern outputting section 149 generates a pattern of 12-bit information as results of comparing the absolute values of the differences between the pixel values of the target pixel, the pixel that is left-adjacent to the target pixel, and the pixel that is right-adjacent to the target pixel, and their respectively associated, in-phase, nearest upper, lower, left, and right pixels with predetermined threshold values. Alternatively, as shown in FIG. 46, of the comparison results, the absolute value of the difference between the pixel values of the right-adjacent pixel with respect to the target pixel and the in-phase, left pixel nearest to the right-adjacent pixel is the same as the absolute value of the difference between the pixel values of the left-adjacent pixel with respect to the target pixel and the in-phase, right pixel nearest to the left-adjacent pixel (results of comparing the same values), as shown in FIG. 46B. Thus, it is sufficient to use only one of these values and to for a pattern of 11 bits in total, as shown in FIG. 46C, which is output to the class-code determining section 53. That is, one of the right-pixel deriving section 132 associated with the left-adjacent pixel and the left-pixel deriving section 135 associated with the right-adjacent pixel may be omitted, and one of the magnitude comparing sections 144 and 147 may be omitted accordingly.

Figure 47:
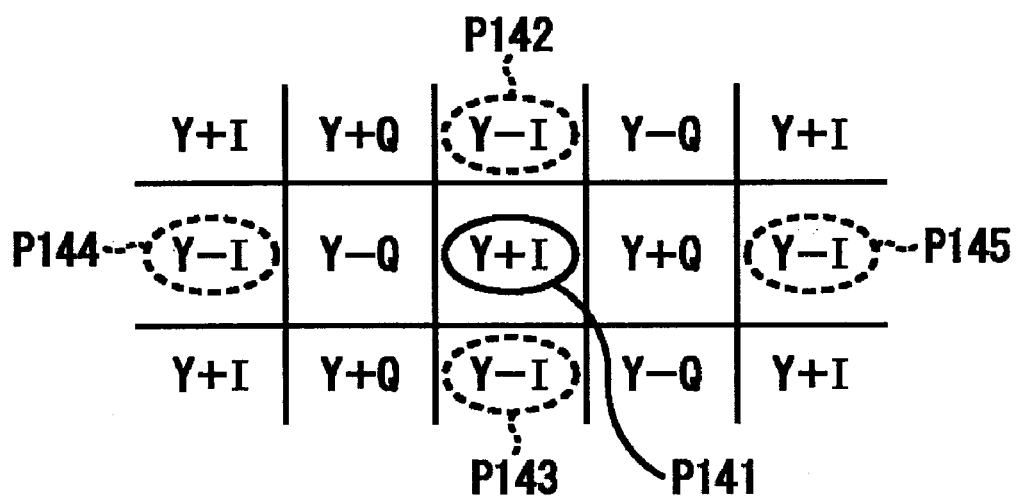
FIG. 47 is a diagram for explaining a process that is executed when a classification-adaptation process is used.

The above description has been made in the context of an example where band-pass filtering is used to extract IQ signals. Alternatively, for example, as shown in FIG. 47, if a target pixel P141 is represented by a signal obtained by superposing an IQ signal (an I signal in FIG. 47), opposite-phase signals on which IQ signals in nearest upper, lower, left and right positions are superposed may be read as prediction taps. In that case, a pixel value C(P141) of the target pixel P141 is calculated by a classification-adaptation process, and an IQ signal is separated and extracted according to equation (10) below using the calculated pixel value C(P141) and an actual pixel value R(P141) of the target pixel P141:

$$|(C(P141)-R(P141))/2|=I \qquad (10)$$

Figure 8:
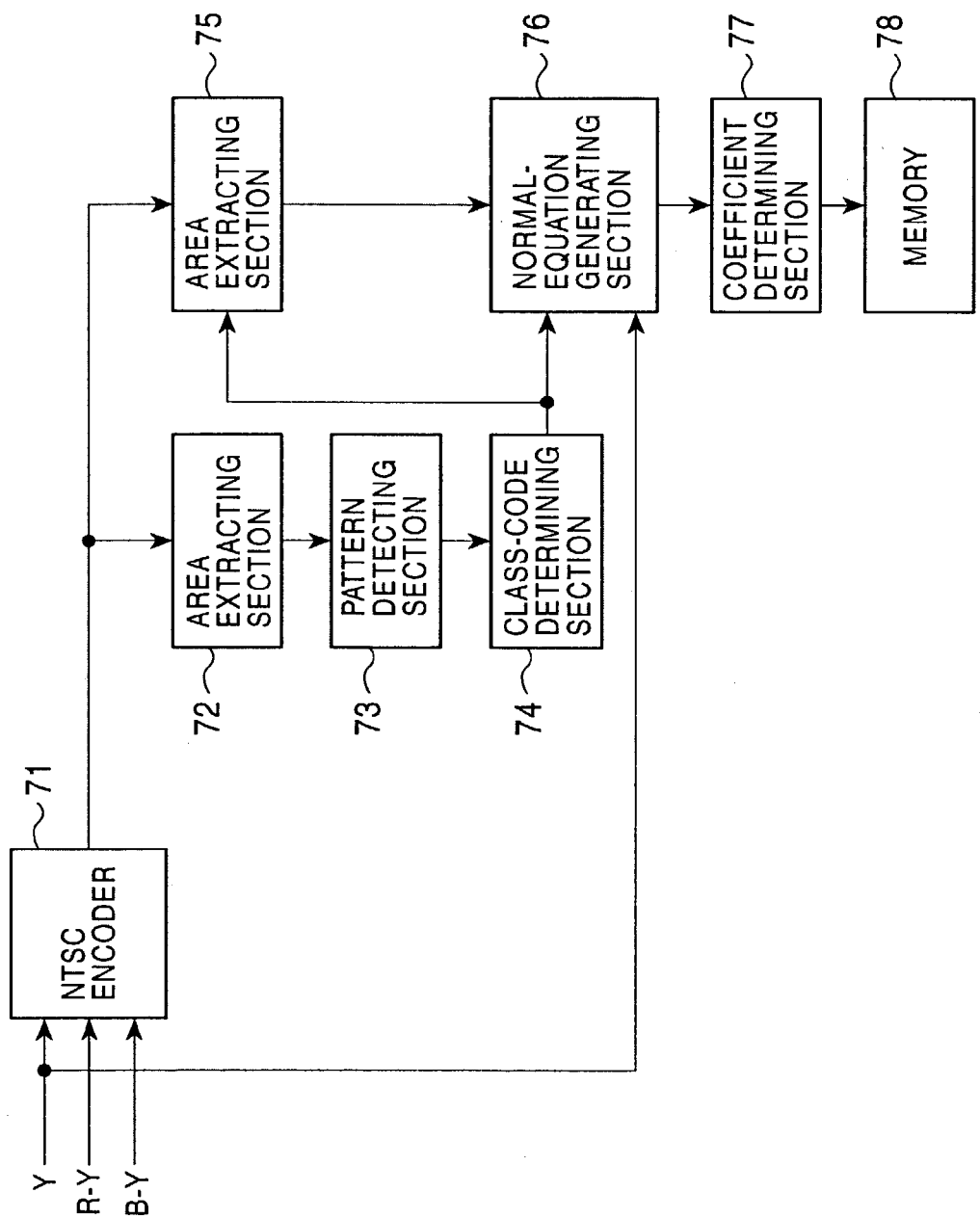
FIG. 8 is a block diagram of a learning apparatus.
Figure 9:
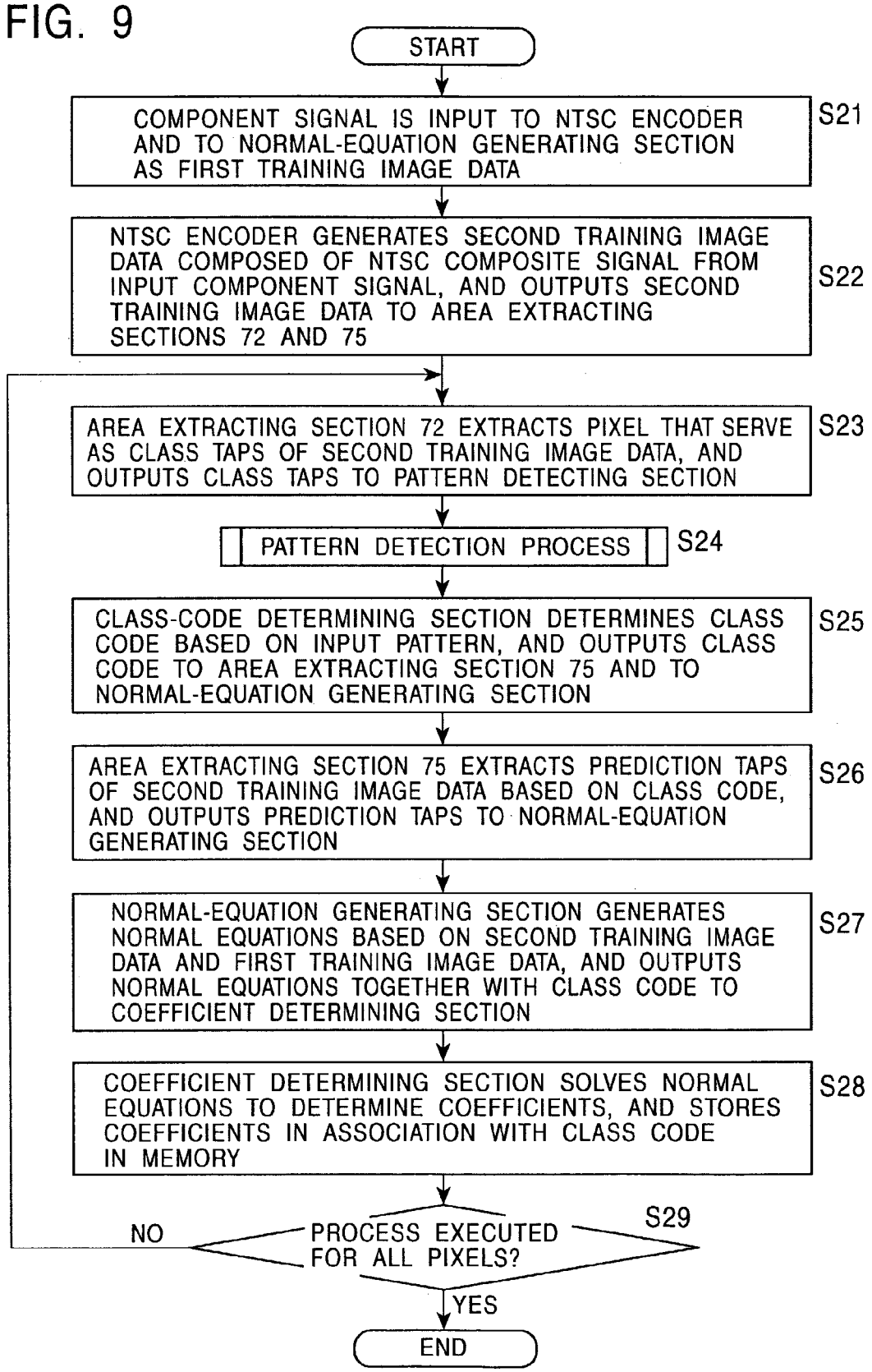
FIG. 9 is a flowchart for explaining a learning process executed by the learning apparatus.

The configuration of a classification-adaptation circuit that is used in this case is the same as that shown in FIG. 4; however, prediction coefficients used for the calculation are generated by the learning apparatus shown in FIG. 8 in relation to the pixels to be derived as described above. Also, a Q signal can be separated and extracted by a similar process according to equation (10).

The above description has been made in relation to a process for detecting a pattern that identifies a pixel on a border where color changes in the vertical direction, at which degradation in picture quality is likely to occur when a component signal is converted into a composite signal and the composite signal is converted back into a component signal. Since the pattern indicates the magnitude of the absolute value of the difference between the pixel values of pixels in the vertical direction, the pattern may be used to indicate the degree of correlation between the pixels. Accordingly, the configuration of prediction taps may be changed based on the correlation in the vertical direction.

Figure 48:
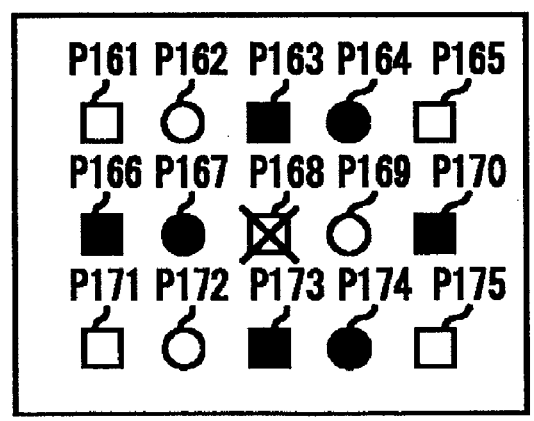
FIG. 48 is a diagram showing an example set of prediction taps.

More specifically, for example, as shown in FIG. 48, with regard to a target pixel P 168 at a center, sixteen prediction taps in total, namely, fifteen pixels including pixels P161 to P165 on the horizontal line above the target pixel P168, pixels P166 to P170 on the line including the target pixel P168, and pixels P171 to P175 on the horizontal line below the target pixel P168 in the same field, and an offset tap for correcting deviation in DC component that is caused when a composite signal is converted into a component signal, are used when the predictive calculation section 56 predictively calculates a pixel value of the target pixel P168.

Figures 49, 50:
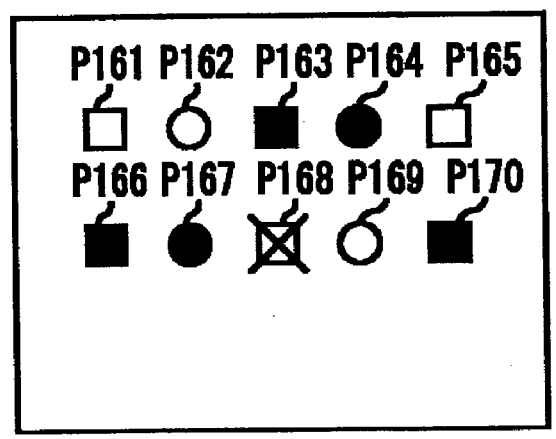
FIG. 49 is a diagram showing an example of a pattern that is detected.
FIG. 50 is a diagram showing an example set of prediction taps in a case where the pattern shown in FIG. 49 is detected.

If the 6-bit pattern detected by the pattern detecting section 52 shown in FIG. 4 in relation to the target pixel P168 is as shown in FIG. 49, the absolute values of the differences between the pixel values of the pixels P166 to P170 on the line of the target pixel P168 and their respectively associated pixels P171 to P175 on the line below the target pixel P168 are greater than the predetermined threshold value, so that correlation is considered to be weak. Thus, when this pattern is detected, the area extracting section 55 may use the pixels P161 to P170 as prediction taps while not using the pixels P171 to P175 with weak correlation as prediction taps, as shown in FIG. 50. Accordingly, when the pattern shown in FIG. 49 is detected, the area extracting section 55 uses prediction taps including eleven pixels in total, namely, ten pixels and an offset tap shown in FIG. 50. This alleviates the load of the coefficient calculation process executed by the predictive calculation section 55, serving to improve processing speed.

Furthermore, since patterns that are generated by the pattern detecting section 52 described earlier include patterns that identify pixels at which degradation in picture quality occurs when a component signal is converted into a composite signal and the composite signal is converted back into a component signal. Thus, for example, when a video producer produces a component video signal as an original image, a pixel with possibility of picture degradation when it is broadcast (a component signal is converted into a composite signal and broadcast, and the composite signal is converted back into a component signal, for example, by a television receiver), or pixels in the proximity thereof can be identified.

Figure 51:
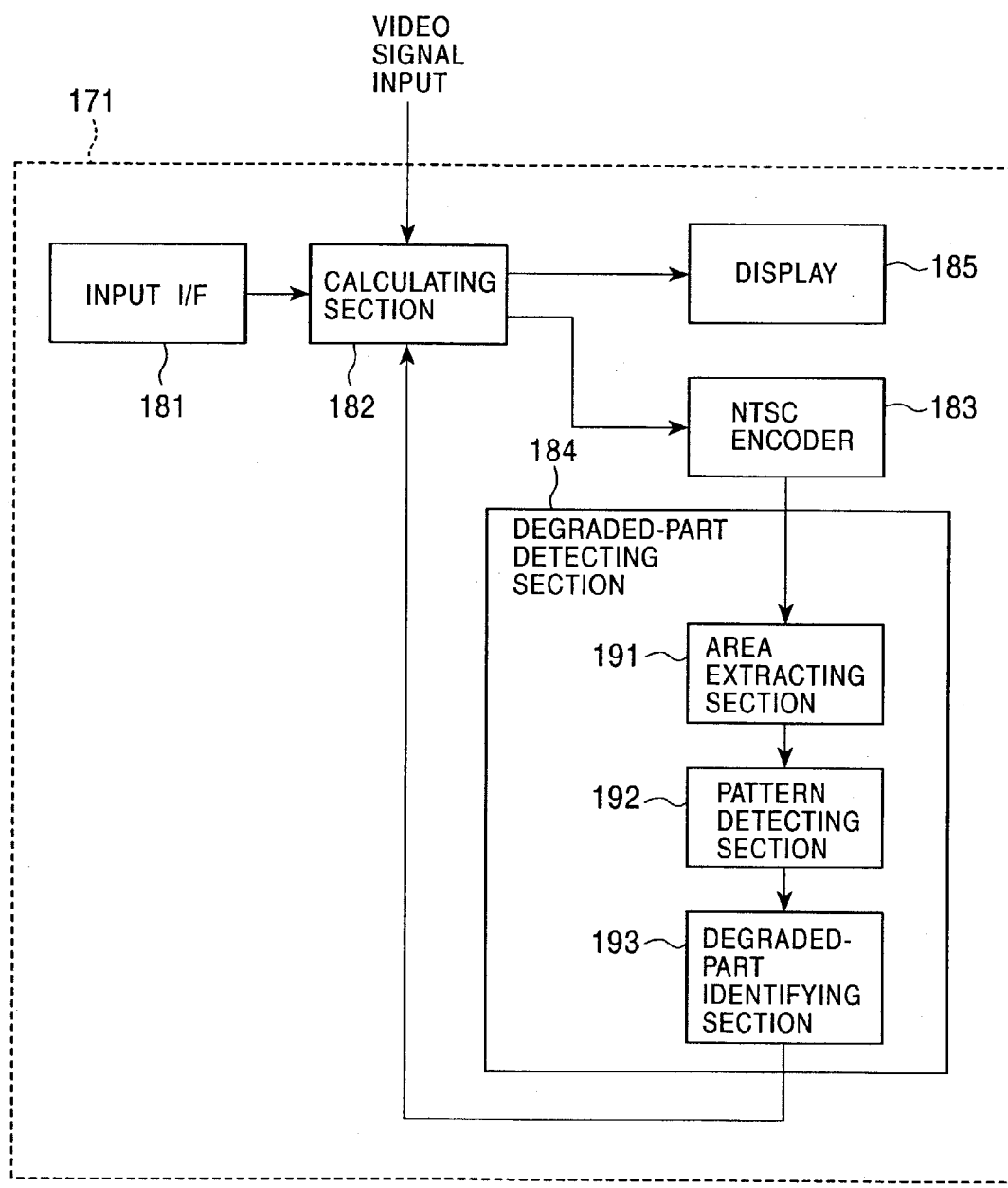
FIG. 51 is a block diagram showing the configuration of a degraded-part detecting apparatus.

FIG. 51 shows the configuration of a picture-quality-degradation detecting apparatus 171 including the pattern detecting section described above.

Referring to FIG. 51, an input I/F (interface) 181 includes, for example, a keyboard and a mouse. The input I/F allows a user to input predetermined commands. A calculating section 182 executes processes according to commands received from the input I/F 181, and outputs a component video signal input thereto to an NTSC encoder 183. Furthermore, the calculating section 182 processes a video signal based on information that identifies a degraded part, input from a degraded-part detecting section 184, so that pixels in the degraded part will be displayed, for example, in white on a display 185.

The NTSC encoder 183 converts the component video signal input thereto into an NTSC composite signal, and outputs the NTSC composite signal to the degraded-part detecting section 184. The degraded-part detecting section 184 includes an area extracting section 191, a pattern detecting section 192, and a degraded-part identifying section 193. The area extracting section 191 extracts taps from the composite signal input thereto, and outputs the taps to the pattern detecting section 192. The pattern detecting section 192 detects a pattern from the taps input thereto, and outputs the pattern to the degraded-part identifying section 193. The degraded-part identifying section 193 identifies a degraded part from the pattern input thereto, and outputs information regarding the degraded part to the calculating section 182. The configurations of the area extracting section 191 and the pattern detecting section 192 are the same as those of the area extracting section 51 and the pattern detecting section 52 described earlier, respectively.

Figure 52:
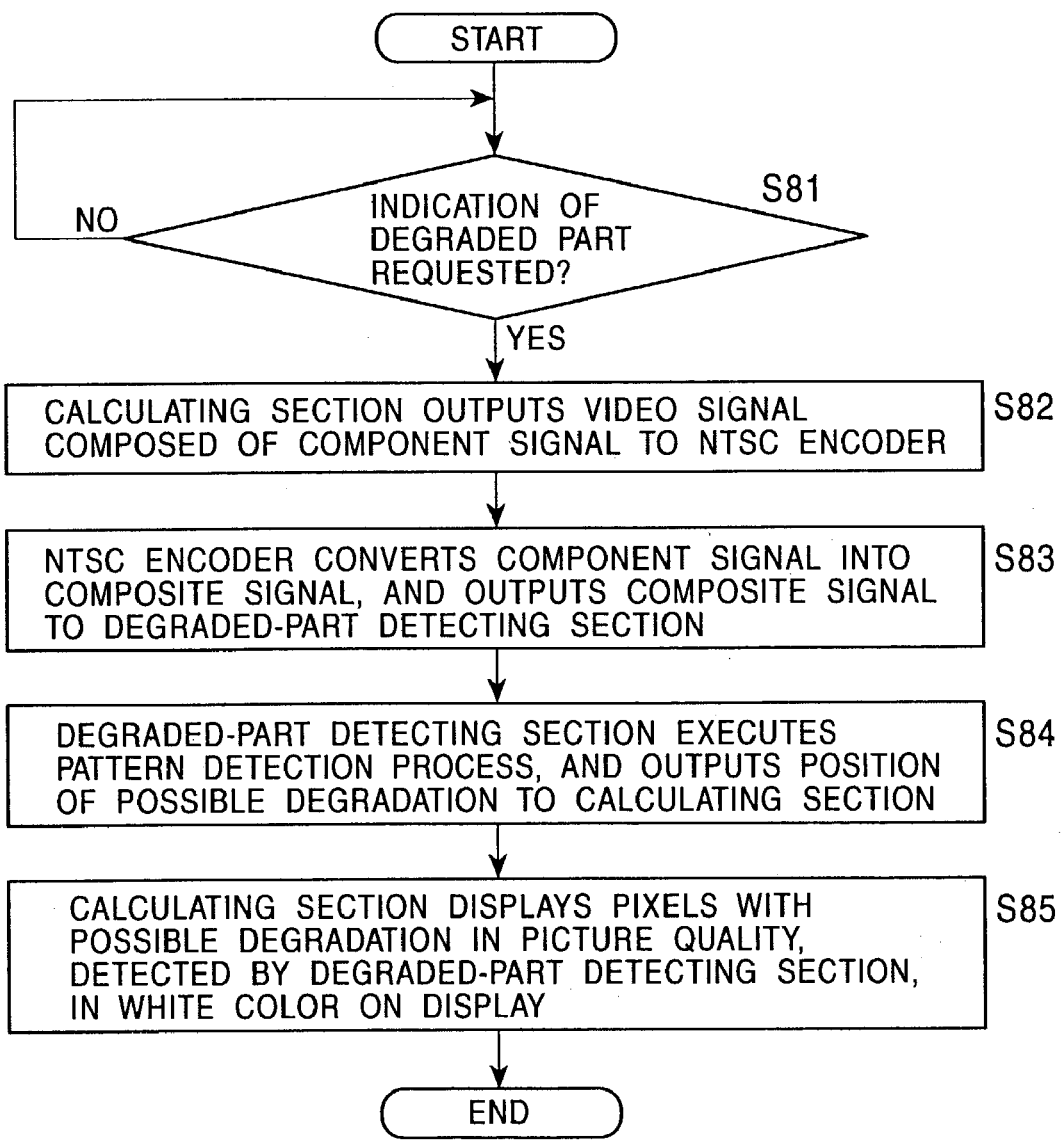
FIG. 52 is a flowchart for explaining a degraded-part indicating process executed by the degraded-part detecting apparatus shown in FIG. 51.

Next, a degraded-part indicating process executed by the picture-quality-degradation detecting apparatus 171 will be described with reference to a flowchart shown in FIG. 52.

In step S81, it is determined whether indication of a degraded part has been requested. Step S81 is repeated until it is determined that indication of a degraded part has been requested, for example, when the input I/F is operated. When the input I/F is operated and it is determined in step S81 that indication of a degraded part has been requested, the process proceeds to step S82.

In step S82, the calculating section 182 outputs a component video signal input thereto to the NTSC encoder 183 according to a command received from the input I/F 181. In step S83, the NTSC encoder 183 converts the component video signal input thereto into a composite signal, and outputs the composite signal to the degraded-part detecting section 184.

In step S84, the degraded-part detecting section 184 executes the pattern detection process described earlier, based on the NTSC composite signal input thereto, and outputs information regarding pixels in a part where picture quality is considered as degraded based on a pattern detected to the calculating section 182. More specifically, the area extracting section 191 extracts taps from the composite signal input thereto, and outputs the taps to the pattern detecting section 192. The pattern detecting section 192 detects a pattern from the taps input thereto, and outputs the pattern to the degraded-part identifying section 193. The degraded-part identifying section 193 identifies a degraded part based on the pattern input thereto, and outputs information regarding the degraded part to the calculating section 182. The pattern detection process may be either the pattern detection described with reference to the flowchart shown in FIG. 33 or the pattern detection process described with reference to the flowchart shown in FIG. 45. For example, if the pattern detection process shown in the flowchart of FIG. 33 is used to detect a 6-bit pattern, the position of a pixel that forms a pattern shown in FIG. 37 ("010000" from top left), the position of a target pixel that forms a pattern of "000010", or the position of a pixel in the proximity thereof is detected as a position with a possibility of degradation in picture quality caused by conversion of a composite signal into a component signal, and information regarding the position is output to the calculating section 182.

In step S85, the calculating section 182, based on the information of degraded position, input from the degraded-part detecting section 184, displays pixels with possibility of degradation in picture quality, for example, in white on the display 185.

When a video signal is produced by the process described above, a producer of the video signal is allowed to visually check a degraded part of the video signal before distributing the video signal. Although a part with degraded picture quality is displayed in white in the example described above, for example, a part with degraded picture quality may be displayed in black, may be displayed as flashing, or a coordinate position of a degraded pixel may be indicated by text, as long as the degraded part can be visually checked.

The process executed by the pattern detecting section 73 is similar to the process executed by the pattern detecting section 52, and description thereof will be omitted. It is to be noted, however, that the pattern detecting section 73 allows the learning apparatus to calculate prediction coefficients from patterns that allow identification of a part in which picture quality is degraded. Thus, the prediction coefficients calculated can be stored in the coefficient memory 54 as being associated with a part in which picture quality is degraded. Accordingly, the predictive calculation section 56 is allowed to use the prediction coefficients associated with a part in which picture quality is degraded, for predictive calculation as needed, allowing conversion of a composite signal into a component signal while suppressing degradation in picture quality.

Furthermore, although the above description has been made in the context of an example where a composite signal is converted into a component signal or a composite signal is converted into RGB primary-color signals, for example, a classification-adaptation circuit may be provided in place of the Y/C separation circuit 4 in FIG. 1 or FIG. 2 so that a composite signal will be Y/C separated by a classification-adaptation process. In that case, the classification-adaptation circuit is implemented, for example, as shown in FIG. 4.

Furthermore, although the above description has been made in the context of an example where degradation in picture quality that is caused when a component signal (a luminance signal Y and color-difference signals R-Y and B-Y) is converted into an NTSC composite signal by the NTSC encoder 71 and the NTSC composite signal is converted back into a component signal is suppressed by utilizing characteristics of degradation in picture quality of I signals and Q signals, which are color components superposed on luminance signals Y by the NTSC encoder 71, without limitation to I signals and Q signals, characteristics of other color components may be utilized.

That is, the NTSC encoder 71 superposes an I signal and a Q signal, calculated from color-difference signals R-Y and B-Y, on a luminance signal Y of a component signal input thereto, thereby converting the component signal into an NTSC composite signal. Thus, instead of the NTSC encoder 71, for example, an encoder that converts a component signal into a composite signal by superposing color-difference signals R-Y and B-Y themselves (so-called U signal and V signal) on a luminance signal Y of a component signal input thereto may be provided so that degradation in picture quality that is caused when a composite signal obtained by superposing the U signal and the V signal on the luminance signal Y is converted back into a component signal is suppressed by utilizing characteristics of the U signal and the V signal. Since an I signal and a Q signal are obtained by the NTSC encoder from color-difference signals R-Y and B-Y and superposed on a luminance signal Y, a U signal and a V signal (color-difference signals R-Y and B-Y) also have the characteristics described earlier with reference to FIGS.

17 to 28. That is, when color changes in the vertical direction and degradation in picture quality occurs, color changes significantly in the vertical direction on the border of one of the signals. Thus, the I signal and the Q signal in the example described above may be replaced with a U signal and a V signal. Also in that case, similarly to the example described earlier, degradation in picture quality that is caused when a composite signal is converted into a signal obtained by superposing a U signal and a V signal on a luminance signal Y and the signal is converted back into a composite signal is suppressed.

Although a component signal (luminance signal Y and color-difference signals R-Y and B-Y) is used as first training image data and an NTSC composite signal generated by the NTSC encoder 71 is used as second training image data in a learning process in the example described earlier, in this example, a signal obtained by superposing a U signal and a V signal on a luminance signal Y is used as second training image data. Thus, associated prediction coefficients can be determined by performing a similar learning process by an arrangement similar to that of the learning apparatus shown in FIG. 8.

According to what has been described hereinabove, Y/C separation, chroma demodulation, and conversion of image information can be simultaneously executed by a classification-adaptation process, allowing reduction in the size of apparatus and reduction in cost. Furthermore, a part in which picture quality is degraded due to change in color in the vertical direction can be identified and a pattern can be detected accordingly, degradation in picture quality that is caused by conversion of a composite signal into a component signal is alleviated.

The series of processing steps described hereinabove may be executed either by hardware or by software. When the series of processing steps is executed by software, a program constituting the software is installed on from a recording medium onto a computer embedded in special hardware or onto a computer that allows various functions to be executed with various programs installed thereon, such as a general-purpose personal computer.

Figure 53:
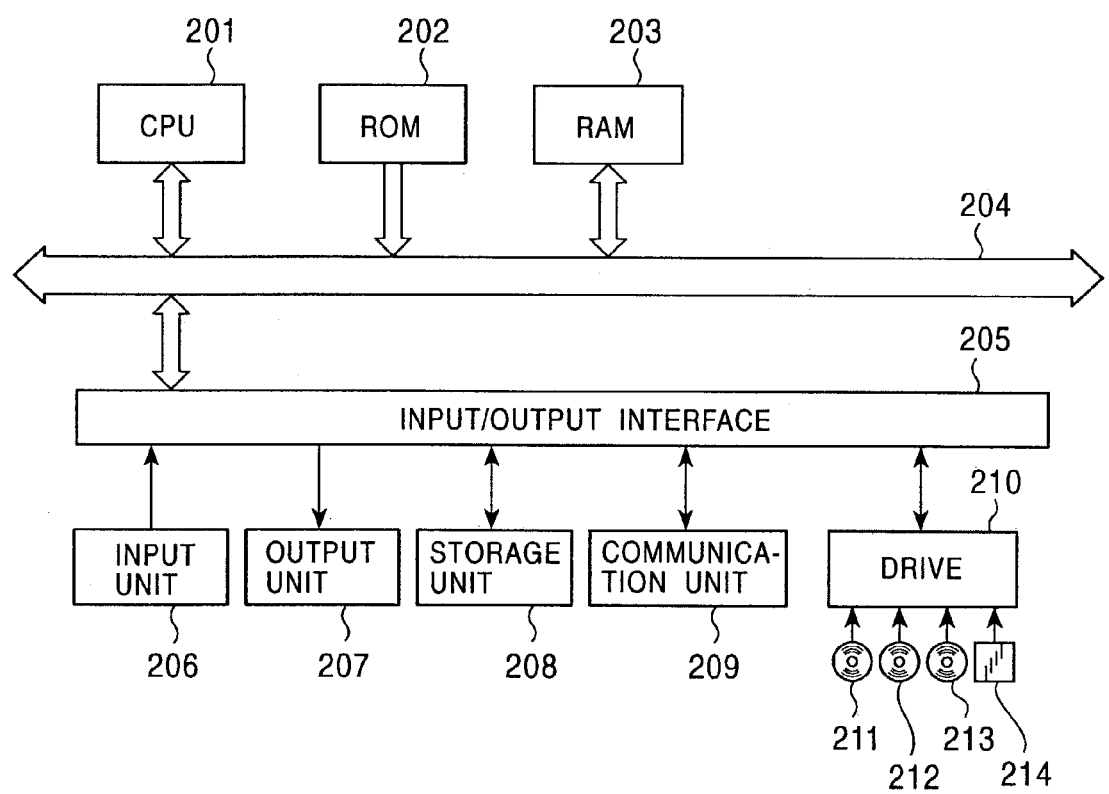
FIG. 53 is a diagram showing an example configuration of a personal computer.

FIG. 53 shows an example configuration of a personal computer in a case where the television receiver or the learning apparatus is implemented by software. Referring to FIG. 53, a CPU 201 of the personal computer controls the overall operation of the personal computer. Furthermore, the CPU 201, upon receiving a command issued by a user from an input unit including a keyboard and a mouse via a bus 204 and an input/output interface 205, executes a program stored in a ROM (read-only memory) 202 according to the command. Also, the CPU 201 loads into a RAM (random access memory) 203 a program read from a magnetic disc 211, an optical disc 212, a magneto-optical disc 213, or a semiconductor memory 214 and installed on a storage unit 208, and executes the program. Thus, the functions of the image processing apparatus described earlier are implemented by software. Furthermore, the CPU 201 controls a communication unit 209 to execute communications with the outside and to thereby exchange data.

The recording medium having recorded the program thereon may be a package media that is distributed to a user separately from a computer, such as the magnetic disc 211 (including a flexible disc), the optical disc 212 (including a CD-ROM (compact disc read-only memory) and a DVD (digital versatile disc)), the magneto-optical disc 213 (including an MD (mini-disc)), or the semiconductor memory 214, as shown in FIG. 53. Alternatively, the recording medium may be the ROM 202 or a hard disc included in the storage unit 208, which is distributed to a user as included in a computer.

It is to be understood that, according to the present invention, steps of the program recorded on the recording medium are not limited to processing steps executed sequentially in the described order, and may include processing steps executed in parallel or individually.

What is claimed is:

1. An image-information converting apparatus comprising:
   first extracting means for extracting pixel signals of a plurality of first pixels associated with a target pixel from a composite signal;
   first relational-information generating means for generating first relational information regarding a color component between the plurality of first pixels and the target pixel;
   first classification means for classifying the target pixel into a first class based on the first relational information regarding the color component;
   second extracting means for extracting pixel signals of a plurality of second pixels associated with the target pixel from the composite signal; and
   target-pixel-signal converting means for converting a pixel signal of the target pixel by processing the pixel signals of the plurality of second pixels using predetermined coefficients associated with the first class.

2. An image-information converting apparatus according to claim 1, further comprising:
   virtual-pixel-signal generating means for generating a pixel signal of a virtual signal associated with the target pixel, using the pixel signals of the plurality of first pixels; and
   difference calculating means for calculating a difference in a color component between the pixel signal of the virtual pixel and the pixel signal of the target pixel;
   wherein the first relational-information generating means generates first relational information regarding the color component between the plurality of first pixels and the target pixel based on the difference in the color component.

3. An image-information converting apparatus according to claim 2, wherein the virtual-pixel-signal generating means generates a pixel signal of a virtual pixel associated with the target pixel by linear interpolation using the pixel signals of the plurality of first pixels.

4. An image-information converting apparatus according to claim 2, further comprising:
   third extracting means for extracting pixel signals of a plurality of third pixels associated with the virtual pixel from the composite signal;
   second relational-information generating means for generating second relational information, different from the first relational information regarding the color component, between the plurality of first pixels and the virtual pixel; and
   second classification means for classifying the virtual pixel into a second class that is different from the first class, based on the second relational information;
   wherein the virtual-pixel-signal generating means processes the pixel signals of the plurality of third pixels using predetermined coefficients associated with the second class to generate a pixel signal of the virtual pixel.

5. An image-information converting apparatus according to claim 1, wherein the first relational-information generating means further comprises comparing means for comparing the first relational information regarding the color component with a predetermined threshold value, and the first classification means classifies the target pixel into the first class based on a result of the comparison by the comparing means.

6. An image-information converting apparatus according to claim 1, wherein the color component includes a first color component and a second color component, and wherein the image-information converting apparatus further comprises:
   first color-component-pixel-signal extracting means for extracting a pixel signal of a first color-component pixel that includes the first color component of the target pixel from the plurality of first pixels;
   second color-component-pixel-signal extracting means for extracting a pixel signal of a second color-component pixel that includes the second color component of an adjacent pixel that is adjacent to the target pixel from the plurality of first pixels;
   first virtual-pixel-signal generating means for generating a pixel signal of a first virtual pixel associated with the target pixel, by using, of the pixel signals of the plurality of first pixels, a pixel signal of a pixel that is at a predetermined position relative to the target pixel and that includes the first color component; and
   second virtual-pixel-signal generating means for generating a pixel signal of a second virtual pixel associated with the adjacent pixel, by using, of the pixel signals of the plurality of first pixels, a pixel signal of a pixel that is at a predetermined position relative to the adjacent pixel and that includes the second color component;
   and wherein the first relational-information generating means generates first relational information regarding the color component between the plurality of first pixels and the target pixel based on first correlation information between the pixel signal of the first virtual pixel and the pixel signal of the target pixel and based on second correlation information between the pixel signal of the second virtual pixel and the pixel signal of the adjacent pixel.

7. An image-information converting method comprising:
   a first extracting step of extracting pixel signals of a plurality of first pixels associated with a target pixel from a composite signal;
   a relational-information generating step of generating relational information regarding a color component between the plurality of first pixels and the target pixel;
   a classification step of classifying the target pixel into a class based on the relational information regarding the color component;
   a second extracting step of extracting pixel signals of a plurality of second pixels associated with the target pixel from the composite signal; and
   a target-pixel-signal converting step of converting a pixel signal of the target pixel by processing the pixel signals of the plurality of second pixels using predetermined coefficients associated with the class.

8. A recording medium having recorded thereon a computer-readable program comprising:
   a first extracting-control step of controlling extraction of pixel signals of a plurality of first pixels associated with a target pixel from a composite signal;
   a relational-information generating-control step of controlling generation of relational information regarding a color component between the plurality of first pixels and the target pixel;
   a classification-control step of controlling classification of the target pixel into a class based on the relational information regarding the color component;
   a second extracting-control step of controlling extraction of pixel signals of a plurality of second pixels associated with the target pixel from the composite signal; and
   a target-pixel-signal converting-control step of controlling conversion of a pixel signal of the target pixel by controlling processing of the pixel signals of the plurality of second pixels using predetermined coefficients associated with the class.

9. A program that is executed by a computer, the program comprising:
   a first extracting-control step of controlling extraction of pixel signals of a plurality of first pixels associated with a target pixel from a composite signal;
   a relational-information generating-control step of controlling generation of relational information regarding a color component between the plurality of first pixels and the target pixel;
   a classification-control step of controlling classification of the target pixel into a class based on the relational information regarding the color component;
   a second extracting-control step of controlling extraction of pixel signals of a plurality of second pixels associated with the target pixel from the composite signal; and
   a target-pixel-signal converting-control step of controlling conversion of a pixel signal of the target pixel by controlling processing of the pixel signals of the plurality of second pixels using predetermined coefficients associated with the class.

10. An image displaying apparatus comprising:
    first extracting means for extracting pixel signals of a plurality of first pixels associated with a target pixel from a composite signal;
    relational-information generating means for generating relational information regarding a color component between the plurality of first pixels and the target pixel;
    classification means for classifying the target pixel into a class based on the relational information regarding the color component;
    second extracting means for extracting pixel signals of a plurality of second pixels associated with the target pixel from the composite signal;
    target-pixel-signal converting means for converting a pixel signal of the target pixel into a component signal by processing the pixel signals of the plurality of second pixels using predetermined coefficients associated with the class; and
    display means for displaying the pixel signal of the target pixel, having been converted into the component signal.

11. An image displaying method comprising:
    a first extracting step of extracting pixel signals of a plurality of first pixels associated with a target pixel from a composite signal;
    a relational-information generating step of generating relational information regarding a color component between the plurality of first pixels and the target pixel;
    a classification step of classifying the target pixel into a class based on the relational information regarding the color component;
    a second extracting step of extracting pixel signals of a plurality of second pixels associated with the target pixel from the composite signal;

a target-pixel-signal converting step of converting a pixel signal of the target pixel into a component signal by processing the pixel signals of the plurality of second pixels using predetermined coefficients associated with the class; and a display step of displaying the pixel signal of the target pixel, having been converted into the component signal.

12. A recording medium having recorded thereon a computer-readable program comprising:

a first extracting-control step of controlling extraction of pixel signals of a plurality of first pixels associated with a target pixel from a composite signal;

a relational-information generating-control step of controlling generation of relational information regarding a color component between the plurality of first pixels and the target pixel;

a classification-control step of controlling classification of the target pixel into a class based on the relational information regarding the color component;

a second extracting-control step of controlling extraction of pixel signals of a plurality of second pixels associated with the target pixel from the composite signal;

a target-pixel-signal converting-control step of controlling conversion of a pixel signal of the target pixel into a component signal by controlling processing of the pixel signals of the plurality of second pixels using predetermined coefficients associated with the class; and a display-control step of controlling display of the pixel signal of the target pixel, having been converted into the component signal.

13. A program that is executed by a computer, the program comprising:

a first extracting-control step of controlling extraction of pixel signals of a plurality of first pixels associated with a target pixel from a composite signal;

a relational-information generating-control step of controlling generation of relational information regarding a color component between the plurality of first pixels and the target pixel;

a classification-control step of controlling classification of the target pixel into a class based on the relational information regarding the color component;

a second extracting-control step of controlling extraction of pixel signals of a plurality of second pixels associated with the target pixel from the composite signal;

a target-pixel-signal converting-control step of controlling conversion of a pixel signal of the target pixel into a component signal by controlling processing of the pixel signals of the plurality of second pixels using predetermined coefficients associated with the class; and a display-control step of controlling display of the pixel signal of the target pixel, having been converted into the component signal.

14. A coefficient calculating apparatus comprising:

composite-signal generating means for generating a composite signal from an input image signal;

first extracting means for extracting pixel signals of a plurality of first pixels associated with a target pixel from the composite signal;

relational-information generating means for generating relational information regarding a color component between the plurality of first pixels and the target pixel;

classification means for classifying the target pixel into a class based on the relational information regarding the color component;

second extracting means for extracting pixel signals of a plurality of second pixels associated with the target pixel from the composite signal; and calculating means for calculating coefficients associated with the class, based on the pixel signals of the plurality of second pixels and the input image signal.

15. A coefficient calculating apparatus according to claim 14, further comprising coefficient-data storing means for storing coefficient data including coefficients that have been calculated.

16. A coefficient calculating method comprising:

a composite-signal generating step of generating a composite signal from an input image signal;

a first extracting step of extracting pixel signals of a plurality of first pixels associated with a target pixel from the composite signal;

a relational-information generating step of generating relational information regarding a color component between the plurality of first pixels and the target pixel;

a classification step of classifying the target pixel into a class based on the relational information regarding the color component;

a second extracting step of extracting pixel signals of a plurality of second pixels associated with the target pixel from the composite signal; and a calculating step of calculating coefficients associated with the class, based on the pixel signals of the plurality of second pixels and the input image signal.

17. A recording medium having recorded thereon a computer-readable program comprising:

a composite-signal generating-control step of controlling generation of a composite signal from an input image signal;

a first extracting-control step of controlling extraction of pixel signals of a plurality of first pixels associated with a target pixel from the composite signal;

a relational-information generating-control step of controlling generation of relational information regarding a color component between the plurality of first pixels and the target pixel;

a classification-control step of controlling classification of the target pixel into a class based on the relational information regarding the color component;

a second extracting-control step of controlling extraction of pixel signals of a plurality of second pixels associated with the target pixel from the composite signal; and a calculating-control step of controlling calculation of coefficients associated with the class, based on the pixel signals of the plurality of second pixels and the input image signal.

18. A program that is executed by a computer, the computer comprising:

a composite-signal generating-control step of controlling generation of a composite signal from an input image signal;

a first extracting-control step of controlling extraction of pixel signals of a plurality of first pixels associated with a target pixel from the composite signal;

a relational-information generating-control step of controlling generation of relational information regarding a color component between the plurality of first pixels and the target pixel;

a classification-control step of controlling classification of the target pixel into a class based on the relational information regarding the color component;

a second extracting-control step of controlling extraction of pixel signals of a plurality of second pixels associated with the target pixel from the composite signal; and a calculating-control step of controlling calculation of coefficients associated with the class, based on the pixel signals of the plurality of second pixels and the input image signal.

19. An apparatus for detecting a part where picture quality is degraded, the apparatus comprising:

first color-component-pixel-signal extracting means for extracting a pixel signal of a first color-component pixel that includes a first color component of a target pixel from a composite signal;

second color-component-pixel-signal extracting means for extracting a pixel signal of a second color-component pixel that includes a second color component of an adjacent pixel that is adjacent to the target pixel from the composite signal;

first correlation-information generating means for generating first correlation information between the pixel signal of the first color-component pixel and a pixel signal of the target pixel;

second correlation-information generating means for generating second correlation information between the pixel signal of the second color-component pixel and a pixel signal of the adjacent pixel;

relational-information generating means for generating relational information regarding a color component between a plurality of pixels and the target pixel; and determining means for determining whether degradation in picture quality occurs at the target pixel or in a predetermined region including the target pixel, based on the relational information regarding the color component.

20. An apparatus according to claim 19, further comprising comparing means for comparing the first correlation information and the second correlation information with predetermined threshold values that are set for the first correlation information and the second correlation information, respectively, wherein the determining means determines that degradation in picture quality occurs at the target pixel or in the predetermined region including the target pixel if, in results of the comparisons by the comparing means, at least one of the first correlation information and the second correlation information is larger than the associated one of the predetermined threshold values respectively set for the first correlation information and the second correlation information.

21. A method for detecting a part where picture quality is degraded, the method comprising:

a first color-component-pixel-signal extracting step of extracting a pixel signal of a first color-component pixel that includes a first color component of a target pixel from a composite signal;

a second color-component-pixel-signal extracting step of extracting a pixel signal of a second color-component pixel that includes a second color component of an adjacent pixel that is adjacent to the target pixel from the composite signal;

a first correlation-information generating step of generating first correlation information between the pixel signal of the first color-component pixel and a pixel signal of the target pixel;

a second correlation-information generating step of generating second correlation information between the pixel signal of the second color-component pixel and a pixel signal of the adjacent pixel;

a relational-information generating step of generating relational information regarding a color component between a plurality of pixels and the target pixel; and a determining step of determining whether degradation in picture quality occurs at the target pixel or in a predetermined region including the target pixel, based on the relational information regarding the color component.

22. A recording medium having recorded thereon a computer-readable program comprising:

a first color-component-pixel-signal extracting-control step of controlling extraction of a pixel signal of a first color-component pixel that includes a first color component of a target pixel from a composite signal;

a second color-component-pixel-signal extracting-control step of controlling extraction of a pixel signal of a second color-component pixel that includes a second color component of an adjacent pixel that is adjacent to the target pixel from the composite signal;

a first correlation-information generating-control step of controlling generation of first correlation information between the pixel signal of the first color-component pixel and a pixel signal of the target pixel;

a second correlation-information generating-control step of controlling generation of second correlation information between the pixel signal of the second color-component pixel and a pixel signal of the adjacent pixel;

a relational-information generating-control step of controlling generation of relational information regarding a color component between a plurality of,-pixels and the target pixel; and a determining-control step of controlling determination as to whether degradation in picture quality occurs at the target pixel or in a predetermined region including the target pixel, based on the relational information regarding the color component.

23. A program that is executed by a computer, the program comprising:

a first color-component-pixel-signal extracting-control step of controlling extraction of a pixel signal of a first color-component pixel that includes a first color component of a target pixel from a composite signal;

a second color-component-pixel-signal extracting-control step of controlling extraction of a pixel signal of a second color-component pixel that includes a second color component of an adjacent pixel that is adjacent to the target pixel from the composite signal;

a first correlation-information generating-control step of controlling generation of first correlation information between the pixel signal of the first color-component pixel and a pixel signal of the target pixel;

a second correlation-information generating-control step of controlling generation of second correlation information between the pixel signal of the second color-component pixel and a pixel signal of the adjacent pixel;

a relational-information generating-control step of controlling generation of relational information regarding a color component between a plurality of pixels and the target pixel; and a determining-control step of controlling determination as to whether degradation in picture quality occurs at the target pixel or in a predetermined region including the target pixel, based on the relational information regarding the color component.

24. An apparatus for detecting a part where picture quality is degraded, the apparatus comprising:

first color-component-pixel-signal extracting means for extracting a pixel signal of a first color-component pixel that includes a first color component of a target pixel from a composite signal;

second color-component-pixel-signal extracting means for extracting a pixel signal of a second color-component pixel that includes a second color component of an adjacent pixel that is adjacent to the target pixel from the composite signal;

first virtual-pixel-signal generating means for generating a pixel signal of a first virtual pixel associated with the target pixel, by using the pixel signal of the first color-component pixel that is at a predetermined-position relative to the target pixel;

second virtual-pixel-signal generating means for generating a pixel signal of a second virtual pixel associated with the adjacent pixel, by using the pixel signal of the second color-component pixel that is at a predetermined position relative to the adjacent pixel;

first correlation-information generating means for generating first correlation information between the pixel signal of the first virtual pixel and a pixel signal of the target pixel;

second correlation-information generating means for generating second correlation information between the pixel signal of the second virtual pixel and a pixel signal of the adjacent pixel;

relational-information generating means for generating relational information regarding a color component between a plurality of pixels and the target pixel, based on the first correlation information and the second correlation information; and determining means for determining whether degradation in picture quality occurs at the target pixel or in a predetermined region including the target pixel, based on the relational information regarding the color component.

25. An apparatus according to claim 24, wherein the first virtual-pixel-signal generating means generates the pixel signal of the first virtual pixel associated with the target pixel by using the pixel signal of the first color-component pixel that is at a predetermined position relative to the target pixel and that is in phase with or in opposite phase with the pixel signal of the target pixel.

26. An apparatus according to claim 24, further comprising comparing means for comparing the first correlation information and the second correlation information with predetermined threshold values that are set for the first correlation information and the second correlation information, respectively, wherein the determining means determines that degradation in picture quality occurs at the target pixel or in the predetermined region including the target pixel if, in results of the comparisons by the comparing means, at least one of the first correlation information and the second correlation information is larger than the associated one of the predetermined threshold values respectively set for the first correlation information and the second correlation information in results of comparison by the comparing means.

27. An apparatus according to claim 26, wherein the first virtual-pixel-signal generating means generates the pixel signal of the first virtual pixel associated with the target pixel by linear interpolation using the pixel signal of the first color-component pixel that is at a predetermined position relative to the target pixel, and wherein the second virtual-pixel-signal generating means generates the pixel signal of the second virtual pixel associated with the adjacent pixel by linear interpolation using the pixel signal of the second color-component pixel that is at a predetermined position relative to the adjacent pixel.

28. An apparatus according to claim 24, wherein the first virtual-pixel-signal generating means comprises:

third extracting means for extracting pixel signals of a plurality of third pixels associated with the first virtual pixel from the composite signal;

third correlation-information generating means for generating third correlation information between the first color-component pixel and the first virtual pixel; and first classification means for classifying the first virtual pixel into a first class based on the third correlation information;

the first virtual-pixel-signal generating means generating the pixel signal of the first virtual pixel by processing the pixel signals of the plurality of third pixels using predetermined coefficients associated with the first class, and wherein the second virtual-pixel-signal generating means comprises:

fourth extracting means for extracting pixel signals of a plurality of fourth pixels associated with the second virtual pixel from the composite signal;

fourth correlation-information generating means for generating fourth correlation information between the second color-component pixel and the second virtual pixel; and second classification means for classifying the second virtual pixel into a second class based on the fourth correlation information;

the second virtual-pixel-signal generating means generating the pixel signal of the second virtual pixel by processing the pixel signals of the plurality of fourth pixels using predetermined coefficients associated with the second class.

29. A method for detecting a part where picture quality is degraded, the method comprising:

a first color-component-pixel-signal extracting step of extracting a pixel signal of a first color-component pixel that includes a first color component of a target pixel from a composite signal;

a second color-component-pixel-signal extracting step of extracting a pixel signal of a second color-component pixel that includes a second color component of an adjacent pixel that is adjacent to the target pixel from the composite signal;

a first virtual-pixel-signal generating step of generating a pixel signal of a first virtual pixel associated with the target pixel, by using the pixel signal of the first color-component pixel that is at a predetermined position relative to the target pixel;

a second virtual-pixel-signal generating step of generating a pixel signal of a second virtual pixel associated with the adjacent pixel, by using the pixel signal of the second color-component pixel that is at a predetermined position relative to the adjacent pixel;

a first correlation-information generating step of generating first correlation information between the pixel signal of the first virtual pixel and a pixel signal of the target pixel;

a second correlation-information generating step of generating second correlation information between the pixel signal of the second virtual pixel and a pixel signal of the adjacent pixel;

a relational-information generating step of generating relational information regarding a color component between a plurality of pixels and the target pixel, based on the first correlation information and the second correlation information; and a determining step of determining whether degradation in picture quality occurs at the target pixel or in a predetermined region including the target pixel, based on the relational information regarding the color component.

30. A recording medium having recorded thereon a computer readable program comprising:

a first color-component-pixel-signal extracting-control step of controlling extraction of a pixel signal of a first color-component pixel that includes a first color component of a target pixel from a composite signal;

a second color-component-pixel-signal extracting-control step of controlling extraction of a pixel signal of a second color-component pixel that includes a second color component of an adjacent pixel that is adjacent to the target pixel from the composite signal;

a first virtual-pixel-signal generating-control step of controlling generation of a pixel signal of a first virtual pixel associated with the target pixel, by using the pixel signal of the first color-component pixel that is at a predetermined position relative to the target pixel;

a second virtual-pixel-signal generating-control step of controlling generation of a pixel signal of a second virtual pixel associated with the adjacent pixel, by using the pixel signal of the second color-component pixel that is at a predetermined position relative to the adjacent pixel;

a first correlation-information generating-control step of controlling generation of first correlation information between the pixel signal of the first virtual pixel and a pixel signal of the target pixel;

a second correlation-information generating-control step of controlling generation of second correlation information between the pixel signal of the second virtual pixel and a pixel signal of the adjacent pixel;

a relational-information generating-control step of controlling generation of relational information regarding a color component between a plurality of pixels and the target pixel, based on the first correlation information and the second correlation information; and a determining-control step of controlling determination as to whether degradation in picture quality occurs at the target pixel or in a predetermined region including the target pixel, based on the relational information regarding the color component.

31. A program that is executed by a computer, the program comprising:

a first color-component-pixel-signal extracting-control step of controlling extraction of a pixel signal of a first color-component pixel that includes a first color component of a target pixel from a composite signal;

a second color-component-pixel-signal extracting-control step of controlling extraction of a pixel signal of a second color-component pixel that includes a second color component of an adjacent pixel that is adjacent to the target pixel from the composite signal;

a first virtual-pixel-signal generating-control step of controlling generation of a pixel signal of a first virtual pixel associated with the target pixel, by using the pixel signal of the first color-component pixel that is at a predetermined position relative to the target pixel;

a second virtual-pixel-signal generating-control step of controlling generation of a pixel signal of a second virtual pixel associated with the adjacent pixel, by using the pixel signal of the second color-component pixel that is at a predetermined position relative to the adjacent pixel;

a first correlation-information generating-control step of controlling generation of first correlation information between the pixel signal of the first virtual pixel and a pixel signal of the target pixel;

a second correlation-information generating-control step of controlling generation of second correlation information between the pixel signal of the second virtual pixel and a pixel signal of the adjacent pixel;

a relational-information generating-control step of controlling generation of relational information regarding a color component between a plurality of pixels and the target pixel, based on the first correlation information and the second correlation information; and a determining-control step of controlling determination as to whether degradation in picture quality occurs at the target pixel or in a predetermined region including the target pixel, based on the relational information regarding the color component.

* * * * *